US012222673B2

(12) United States Patent
Yoshimura et al.

(10) Patent No.: US 12,222,673 B2
(45) Date of Patent: Feb. 11, 2025

(54) IMAGE FORMING APPARATUS AND PROCESS CARTRIDGE INCLUDING PROTRUSION TO RECEIVE A FORCE FOR MOVING DEVELOPING ROLLER

(71) Applicant: CANON KABUSHIKI KAISHA, Tokyo (JP)

(72) Inventors: Akira Yoshimura, Suntou-gun (JP); Tomio Noguchi, Suntou-gun (JP); Yukio Kubo, Kawasaki (JP); Masaaki Sato, Yokohama (JP); Satoshi Nishiya, Yokohama (JP); Yosuke Kashiide, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/226,362

(22) Filed: Jul. 26, 2023

(65) Prior Publication Data

US 2023/0367260 A1 Nov. 16, 2023

Related U.S. Application Data

(62) Division of application No. 17/991,946, filed on Nov. 22, 2022, now Pat. No. 11,754,970, which is a (Continued)

(30) Foreign Application Priority Data

Sep. 7, 2012 (JP) ................................. 2012-196872
Jul. 11, 2013 (JP) ................................. 2013-145903

(51) Int. Cl.
*G03G 21/00* (2006.01)
*G03G 21/18* (2006.01)

(52) U.S. Cl.
CPC ..... *G03G 21/1842* (2013.01); *G03G 21/1821* (2013.01); *G03G 21/1825* (2013.01); *G03G 2221/1861* (2013.01)

(58) Field of Classification Search
CPC ........... G03G 21/1821; G03G 21/1825; G03G 21/1842; G03G 2221/1861; G03G 2221/1869
(Continued)

(56) References Cited

U.S. PATENT DOCUMENTS 5,331,373 A 7/1994 Nomura et al.
5,452,056 A 9/1995 Nomura et al.
(Continued)

FOREIGN PATENT DOCUMENTS

CN 1369750 A 9/2002
CN 1444114 A 9/2003
(Continued)

OTHER PUBLICATIONS

Written Opinion of the International Searching Authority and International Search Report in PCT/JP2013/074773.
(Continued)

*Primary Examiner* — Robert B Beatty
(74) *Attorney, Agent, or Firm* — Venable LLP

(57) ABSTRACT

A process cartridge includes a photosensitive drum and a developing roller for developing a latent image on the photosensitive drum. The process cartridge also includes a protrusion having a surface configured to receive a force to move a frame supporting the developing roller from the first position in which the developing roller contacts the photosensitive drum to the second position in which the developing roller is spaced apart from the photosensitive drum. The process cartridge is configured such that, when the frame is in the first position and the process cartridge is oriented with the photosensitive drum and the protrusion positioned at a bottom side of the process cartridge, (i) a rotational axis of the photosensitive drum is lower than a rotational axis of the developing roller, and (ii) as viewed in
(Continued)

a direction of the rotational axis of the photosensitive drum, the surface of the protrusion extends in a direction that is perpendicular to a part of a surface at the bottom side of the process cartridge that extends away from the photosensitive drum and away from the protrusion.

24 Claims, 30 Drawing Sheets

Related U.S. Application Data division of application No. 17/470,123, filed on Sep. 9, 2021, now Pat. No. 11,599,058, which is a division of application No. 16/720,694, filed on Dec. 19, 2019, now Pat. No. 11,156,954, which is a division of application No. 16/439,908, filed on Jun. 13, 2019, now Pat. No. 10,591,868, which is a division of application No. 16/170,272, filed on Oct. 25, 2018, now Pat. No. 10,401,788, which is a division of application No. 15/808,042, filed on Nov. 9, 2017, now Pat. No. 10,168,664, which is a division of application No. 15/209,039, filed on Jul. 13, 2016, now Pat. No. 9,836,020, which is a division of application No. 14/421,269, filed as application No. PCT/JP2013/074773 on Sep. 6, 2013, now Pat. No. 9,429,906.

(58) Field of Classification Search
USPC .......................................... 399/111, 112, 113
See application file for complete search history.

(56) References Cited

U.S. PATENT DOCUMENTS

| | | | |
|---|---|---|---|
| 5,528,341 | A | 6/1996 | Shishido et al. |
| 5,585,889 | A | 12/1996 | Shishido et al. |
| 5,870,654 | A | 2/1999 | Sato et al. |
| 5,911,096 | A | 6/1999 | Batori et al. |
| 5,940,658 | A | 8/1999 | Yokoi et al. |
| 5,966,566 | A | 10/1999 | Odagawa et al. |
| 5,974,288 | A | 10/1999 | Sato |
| 6,075,957 | A | 6/2000 | Batori et al. |
| 6,104,894 | A | 8/2000 | Sato et al. |
| 6,131,007 | A | 10/2000 | Yamaguchi et al. |
| 6,185,390 | B1 | 2/2001 | Higeta et al. |
| 6,188,856 | B1 | 2/2001 | Sato |
| 6,381,420 | B1 | 4/2002 | Sato et al. |
| 6,640,066 | B2 | 10/2003 | Sato |
| 6,714,749 | B2 | 3/2004 | Sato et al. |
| 6,895,199 | B2 | 5/2005 | Sato et al. |
| 6,898,399 | B2 | 5/2005 | Morioka et al. |
| 6,937,832 | B2 | 8/2005 | Sato et al. |
| 7,068,965 | B2 | 6/2006 | Yoshino et al. |
| 7,149,457 | B2 | 12/2006 | Miyabe et al. |
| 7,155,140 | B2 | 12/2006 | Arimitsu et al. |
| 7,155,141 | B2 | 12/2006 | Sato et al. |
| 7,158,736 | B2 | 1/2007 | Sato et al. |
| 7,200,349 | B2 | 4/2007 | Sato et al. |
| 7,218,882 | B2 | 5/2007 | Toba et al. |
| 7,224,925 | B2 | 5/2007 | Sato et al. |
| 7,283,766 | B2 | 10/2007 | Arimitsu et al. |
| 7,349,657 | B2 | 3/2008 | Sato et al. |
| 7,412,193 | B2 | 8/2008 | Sato et al. |
| 7,486,907 | B2 | 2/2009 | Noguchi et al. |
| 7,499,663 | B2 | 3/2009 | Sato et al. |
| 7,509,071 | B2 | 3/2009 | Yoshimura et al. |
| 7,567,769 | B2 | 7/2009 | Noguchi et al. |
| 7,570,900 | B2 | 8/2009 | Chadani et al. |
| 7,660,549 | B2 | 2/2010 | Noguchi et al. |
| 7,660,550 | B2 | 2/2010 | Mori et al. |
| 7,689,146 | B2 | 3/2010 | Sato et al. |
| 7,715,746 | B2 | 5/2010 | Tanabe et al. |
| 7,715,752 | B2 | 5/2010 | Sakurai et al. |
| 7,720,408 | B2 | 5/2010 | Ueno et al. |
| 7,751,737 | B2 | 7/2010 | Ishida et al. |
| 7,761,024 | B2 | 7/2010 | Imaizumi et al. |
| 7,773,911 | B2 | 8/2010 | Kawamura |
| 7,778,570 | B2 | 8/2010 | Numagami et al. |
| 7,813,668 | B2 | 10/2010 | Ueno et al. |
| 7,860,433 | B2 | 12/2010 | Toba et al. |
| 7,869,740 | B2 | 1/2011 | Yoshimura et al. |
| 7,894,733 | B2 | 2/2011 | Tanabe et al. |
| 7,899,364 | B2 | 3/2011 | Chadani et al. |
| 7,907,866 | B2 | 3/2011 | Imaizumi et al. |
| 7,937,020 | B2 | 5/2011 | Sakurai et al. |
| 7,953,340 | B2 | 5/2011 | Tanabe et al. |
| 7,983,589 | B2 | 7/2011 | Sato et al. |
| 8,145,095 | B2 | 3/2012 | Sakurai et al. |
| 8,150,293 | B2 | 4/2012 | Numagami et al. |
| 8,165,494 | B2 | 4/2012 | Yoshimura et al. |
| 8,175,487 | B2 | 5/2012 | Imaizumi et al. |
| 8,213,831 | B2 | 7/2012 | Toba et al. |
| 8,238,787 | B2 | 8/2012 | Tani |
| 8,301,054 | B2 | 10/2012 | Tanabe et al. |
| 8,369,743 | B2 | 2/2013 | Maeshima et al. |
| 8,417,144 | B2 | 4/2013 | Numagami et al. |
| 8,442,412 | B2 | 5/2013 | Imaizumi et al. |
| 8,463,157 | B2 | 6/2013 | Sakurai et al. |
| 8,565,639 | B2 | 10/2013 | Nittani et al. |
| 8,583,001 | B2 | 11/2013 | Kubo et al. |
| 8,588,646 | B2 | 11/2013 | Yoshimura et al. |
| 8,688,003 | B2 | 4/2014 | Maeshima et al. |
| 8,712,284 | B2 | 4/2014 | Toba et al. |
| 8,843,023 | B2 | 9/2014 | Fujinaka et al. |
| 8,862,014 | B2 | 10/2014 | Imaizumi et al. |
| 8,918,014 | B2 | 12/2014 | Yoshimura et al. |
| 8,971,760 | B2 | 3/2015 | Yoshimura et al. |
| 9,002,230 | B2 | 4/2015 | Imaizumi et al. |
| 2002/0110386 | A1 | 8/2002 | Kanno et al. |
| 2003/0185587 | A1 | 10/2003 | Kawai et al. |
| 2005/0047822 | A1 | 3/2005 | Hashimoto et al. |
| 2006/0216061 | A1 | 9/2006 | Yamaguchi |
| 2006/0228132 | A1 | 10/2006 | Chadani et al. |
| 2007/0009282 | A1 | 1/2007 | Sato et al. |
| 2007/0071495 | A1 | 3/2007 | Hashimoto et al. |
| 2007/0160386 | A1 | 7/2007 | Kawamura |
| 2007/0160388 | A1 | 7/2007 | Yoshimura et al. |
| 2007/0166070 | A1 | 7/2007 | Sato |
| 2007/0280730 | A1 | 12/2007 | Okabe et al. |
| 2008/0138109 | A1 | 6/2008 | Anan et al. |
| 2008/0138115 | A1 | 6/2008 | Chadani et al. |
| 2008/0253803 | A1 | 10/2008 | Nittani et al. |
| 2009/0003875 | A1 | 1/2009 | Toba et al. |
| 2009/0074447 | A1 | 3/2009 | Choi et al. |
| 2009/0074454 | A1 | 3/2009 | Sato et al. |
| 2009/0297214 | A1 | 12/2009 | Chadani et al. |
| 2009/0324283 | A1 | 12/2009 | Mushika et al. |
| 2010/0080615 | A1 | 4/2010 | Kikuchi |
| 2010/0166453 | A1 | 7/2010 | Okabe |
| 2010/0209138 | A1 | 8/2010 | Tani |
| 2011/0020031 | A1 | 1/2011 | Sato et al. |
| 2011/0280620 | A1 | 11/2011 | Chadani et al. |
| 2011/0311272 | A1 | 12/2011 | Nittani et al. |
| 2012/0128387 | A1 | 5/2012 | Kim et al. |
| 2012/0294647 | A1 | 11/2012 | Tani |
| 2013/0209137 | A1 | 8/2013 | Hayashi et al. |
| 2013/0308971 | A1 | 11/2013 | Kashiide et al. |
| 2014/0072327 | A1 | 3/2014 | Hayashi et al. |
| 2014/0178097 | A1 | 6/2014 | Maeshima et al. |
| 2015/0078780 | A1 | 3/2015 | Yoshimura et al. |
| 2015/0093146 | A1 | 4/2015 | Sato et al. |
| 2015/0139684 | A1 | 5/2015 | Nakazawa et al. |

FOREIGN PATENT DOCUMENTS

| | | | |
|---|---|---|---|
| CN | 1591236 | A | 3/2005 |
| CN | 101147102 | A | 3/2008 |
| CN | 101286035 | A | 10/2008 |
| CN | 101361025 | A | 2/2009 |
| CN | 101371202 | A | 2/2009 |
| CN | 101558361 | A | 10/2009 |

(56) References Cited

FOREIGN PATENT DOCUMENTS

| | | | |
|---|---|---|---|
| CN | 101592912 | A | 12/2009 |
| CN | 101620405 | A | 1/2010 |
| CN | 101770193 | A | 7/2010 |
| CN | 101807036 | A | 8/2010 |
| CN | 101950149 | A | 1/2011 |
| CN | 103698993 | A | 4/2014 |
| EP | 0 586 046 | A2 | 3/1994 |
| EP | 1703341 | A2 | 9/2006 |
| JP | H07-234552 | A | 9/1995 |
| JP | H09-297441 | A | 11/1997 |
| JP | 2001-337511 | A | 12/2001 |
| JP | 2003-280313 | A | 10/2003 |
| JP | 2004-264791 | A | 9/2004 |
| JP | 2005-043538 | A | 2/2005 |
| JP | 2005-068896 | A | 3/2005 |
| JP | 2006-267602 | A | 10/2006 |
| JP | 2006-293048 | A | 10/2006 |
| JP | 2007-193125 | A | 8/2007 |
| JP | 2007-213024 | A | 8/2007 |
| JP | 2007-248618 | A | 9/2007 |
| JP | 2008-170944 | A | 7/2008 |
| JP | 2008-170965 | A | 7/2008 |
| JP | 4280769 | A | 6/2009 |
| JP | 101715570 | A | 5/2010 |
| JP | 2010-190977 | A | 9/2010 |
| JP | 2012-027449 | A | 2/2012 |
| JP | 2012-058627 | A | 3/2012 |
| JP | 2012-137798 | A | 7/2012 |
| JP | 2012-137798 | A1 | 7/2012 |
| JP | 2013-114201 | A | 6/2013 |
| RU | 2 372 635 | C2 | 7/2008 |
| RU | 2 383 442 | C1 | 3/2010 |
| RU | 2 430 396 | C1 | 9/2011 |

OTHER PUBLICATIONS

Office Action in Taiwanese Patent Application No. 102132195, dated Jul. 16, 2015 (with English translation).
Office Action in Korean Patent Application No. 10-2015-7008101, dated Apr. 18, 2016.
Office Action in Russian Patent Application No. 2015112592, dated May 27, 2016 (with English translation).
Notice of Allowance in Korean Patent Application No. 10-2015-7008101, dated Oct. 6, 2016.
Notice of Allowance in Korean Patent Application No. 10-2016-7022607, dated Oct. 26, 2016.
Decision on Grant in Russian Patent Application No. 2015112592, mailed Feb. 14, 2017 (with English translation).
May 9, 2017 Office Action in Japanese Patent Application No. 2013-145903.
Office Action in Taiwanese Patent Application No. 104139176, mailed Oct. 25, 2017 (with English translation).
English translation of Japanese Laid-Open No. 2001-337551.
Extended European Search Report in European Patent Application No. 17 18 4206.5, issued Dec. 13, 2017.
Extended European Search Report in European Patent Application No. 17 18 4209.9, issued Dec. 15, 2017.
Extended European Search Report in European Patent Application No. 17 18 4211.5, issued Dec. 17, 2017.
Extended European Search Report in European Patent Application No. 17 18 4218.0, issued Dec. 17, 2017.
Office Action in Korean Patent Application No. 10-2017-7000215, dated Jan. 29, 2018.
Decision on Grant in Russian Patent Application No. 2017121306, mailed Mar. 26, 2018 (with English translation).
Jul. 2, 2018 Office Action in Chinese Patent Application No. 201380045835.2 (with English translation).
Office Action in Japanese Patent Application No. 2017-166000, dated Aug. 28, 2018.
Notice of Allowance in Korean Patent Applicaiton No. 10-2017-7000215, mailed Oct. 19, 2018.
Office Action in Russian Patent Application No. 2018119506, dated Mar. 18, 2019 (with English translation).
Notice of Allowance in Korean Patent Application No. 10-2017-7002151, mailed May 3, 2019.
Notice of Allowance in Korean Patent Application No. 10-2019-7002151, mailed May 3, 2019.
Notice of Allowance in Taiwanese Patent Application No. 107135571, mailed Jun. 21, 2019.
Notice of Allowance in Taiwanese Patent Application No. 107143723, mailed Sep. 24, 2019.
Nov. 27, 2019 Notice of Allowance in Korean Patent Application No. 10-2019-7022799.
Office Action in Brazilian Patent Application No. BR 11 2015 000 884-4, dated Dec. 31, 2019 (with partial English translation).
Jan. 8, 2020 Notice of Allowance in Taiwanese Patent Application No. 108134026.
Dec. 31, 2019 Office Action in Brazilian Patent Application No. 112015000884-4.
Jun. 24, 2020 Notice of Allowance in Korean Patent Application No. 10-2020-7005780.
Extended European Search Report dated Apr. 14, 2020 in counterpart EP Application No. 19209705.3.
Extended European Search Report dated Apr. 14, 2020 in counterpart EP Application No. 19209701.2.
Jun. 29, 2020 Decision to Grant in Russian Patent Application No. 2020112170 (with English translation).
Notice of Acceptance dated Sep. 1, 2020 in counterpart Russian Application No. 2018119506/28, with English translation thereof.
Office Action dated Dec. 10, 2020 in counterpart Korean Application No. 10-2020-7027426, together with English translation thereof.
Oct. 29, 2021 Office Action in Chinese Patent Application Pub. No. 201911250222.8 (with English translation).
Dec. 3, 2021 Office Action in Chinese Patent Application Pub. No. 201911250225.1 (with English translation).
Sep. 30, 2020 Office Action in Chinese Patent Application No. 201811394501.7 (with English translation).
Oct. 9, 2020 Office Action in Chinese Patent Application No. 201811394495.5 (with English translation).
Mar. 3, 2021 Notice of Allowance in Taiwanese Patent Application No. 109139048.
Jun. 23, 2021 Notice of Allowance in Chinese Patent Application No. 201811394501.7.
Jun. 30, 2021 Decision to Grant in Russian Patent Application No. 2020135971 (with English translation).
Aug. 18, 2021 Notice of Allowance in Korean Patent Application No. 10-2020-7027426.
Jul. 29, 2022 Notice of Allowance in Chinese Patent Application No. 201911250222.8.
Jan. 18, 2022 Office Action in Brazilian Patent Application Pub. No. BR122020006517-6 (with English translation).
Feb. 17, 2022 Communication in European Patent Application Pub. No. 19 209 705.3.
Oct. 18, 2022 Office Action in Chinese Patent Application No. 201911250954.7.
Jan. 13, 2023 Notice off Allowance in Chinese Patent Application No. 201911250955.1.
May 24, 2023 Notice of Allowance in Chinese Patent Application No. 201811394502.1.
May 14, 2024 Office Action in Japanese Patent Application No. 2023-051519 (with English translation).
May 14, 2024 Office Action in Japanese Patent Application No. 2023-051819 (with English translation).
Oct. 31, 2024 Search Report in European Patent Application No. 24 185 260.7.

IMAGE FORMING APPARATUS AND PROCESS CARTRIDGE INCLUDING PROTRUSION TO RECEIVE A FORCE FOR MOVING DEVELOPING ROLLER

TECHNICAL FIELD

The present invention relates to an image forming apparatus, and a process cartridge which is removably installable in an image forming apparatus.

BACKGROUND ART

In this specification, an image forming apparatus is an apparatus which forms an image on recording medium. Some examples of an image forming apparatus are an electrophotographic copying machine, an electrophotographic printer (laser printer, LED printer, etc.) and the like.

Recording medium is medium across which an image is formed with the use of an electrophotographic image formation process. Some examples of recording medium are recording paper, OHP sheet, label, and the like.

A process cartridge is a cartridge in which an electrophotographic photosensitive component, and means for processing the electrophotographic photosensitive component, are disposed together, and which is removably installable in the main assembly of an image forming apparatus.

In the field of an image forming apparatus which employs an electrophotographic image formation process, it is a common practice to employ a process cartridge system, which integrally places an electrophotographic photosensitive component (which hereafter may be referred to simply as photosensitive drum), and means for processing the photosensitive component, in a cartridge which is removably installable in the main assembly of the image forming apparatus.

A process cartridge system enables a user of an image forming apparatus to maintain the apparatus by himself or herself, that is, without relying on a service person. Thus, it can drastically improve an electrophotographic image forming apparatus in terms of maintenance. Therefore, it is widely in use in the field of an electrophotographic image forming apparatus.

A conventional process cartridge is made up of a photosensitive drum unit and a development unit. The photosensitive drum unit has a cleaning unit frame by which the photosensitive drum is held. The development unit has: a development roller as a means for developing the latent image on the photosensitive drum; a development blade; and toner as developer.

There have been known image forming apparatuses of the so-called inline type. An ordinary image forming apparatus of the inline type employs process cartridges, which correspond to four primary colors, more specifically, yellow, magenta, and cyan and black, of which a full-color image is to be synthetically formed. Each cartridge has a photosensitive drum, and a development unit. Thus, an ordinary image forming apparatus of the inline type forms a full-color image by layering yellow, magenta, cyan and black monochromatic images.

During an image forming operation, a development roller is kept pressed toward the photosensitive drum. In the case of an image forming apparatus which employs a development method which places a development roller in contact with a photosensitive drum to develop the latent image on the photosensitive drum, the development roller is kept pressed upon the peripheral surface of the photosensitive drum.

Thus, if an image forming apparatus which employs a development roller having an elastic layer is left unattended for a substantial length of time in such a condition that the elastic layer of the development roller remains in contact with the peripheral surface of the photosensitive drum, it is possible for the elastic layer of the development roller to permanently deform. Thus, if an image forming apparatus which employs a development roller having an elastic layer is used after it has been unattended for a substantial length of time, it is possible that the latent image on the photosensitive drum will be nonuniformly developed.

Further, if a development roller remains in contact with a photosensitive drum while no image is formed, it is possible for the developer on the development roller will unnecessarily adhere to the photosensitive drum, regardless of whether the development roller has an elastic layer or not. Further, if the photosensitive drum and development roller are rotated in contact with each other even when the development roller is not used for development, it is possible that the photosensitive drum, development roller, and developer will be prematurely deteriorated by the friction between the photosensitive drum and development roller.

Thus, various proposals have been made to prevent the above described problems. One of the proposals is disclosed in Japanese Laid-open Patent Application No 2007-213024. According to this patent application, the image forming apparatus is provided with a mechanism which acts on each process cartridge so that while no image is formed, the photosensitive drum and development roller in the process cartridge in the apparatus main assembly are kept separated from each other. More specifically, the process cartridges are mounted in the drawer with which the main assembly of the image forming apparatus is provided, so that as the drawing is pushed into the main assembly, the process cartridges are properly positioned for image formation, in the main assembly of the image forming apparatus, and also, so that while the drawer is pushed into, or pulled out of the main assembly, for the installation or removal of the process cartridge, into, or from, the main assembly, the abovementioned mechanism for separating (disengaging) the development roller from the photosensitive drum is kept retracted from the process cartridge installation/removal path, in order to prevent the mechanism from interfering with the process cartridges.

SUMMARY OF THE INVENTION

The present invention is one of the results of further development of the above described prior art. Thus, an object of the present invention is to simplify in structure the mechanism for separating (disengaging) the developer carrying component and image bearing component of a process cartridge, to provide a combination of an image forming apparatus and a process cartridge, which is substantially more inexpensive and smaller in size than the combination in accordance with the prior art.

According to an aspect of the present invention, there is provided an image forming apparatus for forming an image on a recording material, said image forming apparatus comprising a mounting portion for detachably mounting a process cartridge, said process cartridge including a first unit having an image bearing member, and a second unit having a developer carrying member, said second unit being movable between a contact position in which said developer carrying member contacts said image bearing member and a spaced position in which said developer carrying member is spaced from said image bearing member; an engageable member engageable with a force receiving portion provided on said second unit; wherein said engageable member is movable between a first position for maintaining said second unit in the spaced position by engaging with said force receiving portion, a second position for permitting movement of said second unit from the spaced position to the contact position in image forming operation; and a third position for permitting said process cartridge to be mounted, by being pressed by said process cartridge to retract, when said process cartridge is mounted to said mounting portion.

According to another aspect of the present invention, there is provided an image forming apparatus for forming an image on a recording material, said image forming apparatus comprising a process cartridge, said process cartridge including a first unit having an image bearing member, and a second unit having a developer carrying member, said second unit being movable between a contact position in which said developer carrying member contacts said image bearing member and a spaced position in which said developer carrying member is spaced from said image bearing member; an engageable member engageable with a force receiving portion provided on said second unit; wherein said engageable member is movable between a first position for maintaining said second unit in the spaced position by engaging with said force receiving portion; a second position for permitting movement of said second unit from the spaced position to the contact position in image forming operation, and a third position for permitting said process cartridge to be mounted, by being pressed by said process cartridge to retract, when said process cartridge is mounted to a main assembly of said image forming apparatus.

According to a further aspect of the present invention, there is provided a process cartridge detachably mountable to a main assembly of the apparatus of image forming apparatus, said process cartridge comprising a first unit including an image bearing member; a second unit including a developer carrying member, said second unit being movable between a contact position in which said developer carrying member contacts said image bearing member and a spaced position in which said developer carrying member is spaced from said image bearing member; a force receiving portion provided on said second unit and engageable with an engageable member provided in said main assembly of the apparatus to receive from said engageable member a force for moving said second unit from the contact position to the spaced position; and an urging portion, provided on said second unit, for urging the engageable member to move the engageable member to a retracted position in which movement of said process cartridge is permitted, when said process cartridge is mounted to the main assembly of the apparatus.

According to a further aspect of the present invention, there is provided a process cartridge detachably mountable to a main assembly of the apparatus of image forming apparatus, said process cartridge comprising a first unit including an image bearing member; a second unit including a developer carrying member, said second unit being movable between a contact position in which said developer carrying member contacts said image bearing member and a spaced position in which said developer carrying member is spaced from said image bearing member; and a force receiving portion provided on said second unit and engageable with an engageable member provided in said main assembly of the apparatus to receive from said engageable member a force for moving said second unit from the contact position to the spaced position, wherein said engageable member and said force receiving portion are pulled from each other by engagement therebetween.

According to a further aspect of the present invention, there is provided a process cartridge comprising a first unit including an image bearing member; a second unit including a developer carrying member, said second unit being rotatably connected with said first unit so as to be movable between a contact position in which said developer carrying member contacts said image bearing member and a spaced position in which said developer carrying member is spaced from said image bearing member; and a projected portion provided at an end portion of said second unit with respect to an axial direction of said developer carrying member, said projected portion projected in a direction crossing with the axial direction away from said developer carrying member, wherein said projected portion is provided with a recess or opening, in which a force receiving portion for receiving a force for moving said second unit from the contact position to the spaced position, and wherein as seen in a direction along the axial direction of said developer carrying member, said force receiving portion facing a side where said developer carrying member is provided.

Another object of the present invention is to provide a combination of an image forming apparatus and a process cartridge installable in the main assembly of the image forming apparatus, which ensures that when the process cartridge is installed into the main assembly of the image forming apparatus, the process cartridge engaging component of the main assembly of the image forming apparatus retracts to allow the process cartridge to be properly installed in the main assembly.

These and other objects, features, and advantages of the present invention will become more apparent upon consideration of the following description of the preferred embodiments of the present invention, taken in conjunction with the accompanying drawings.

Figure 6:
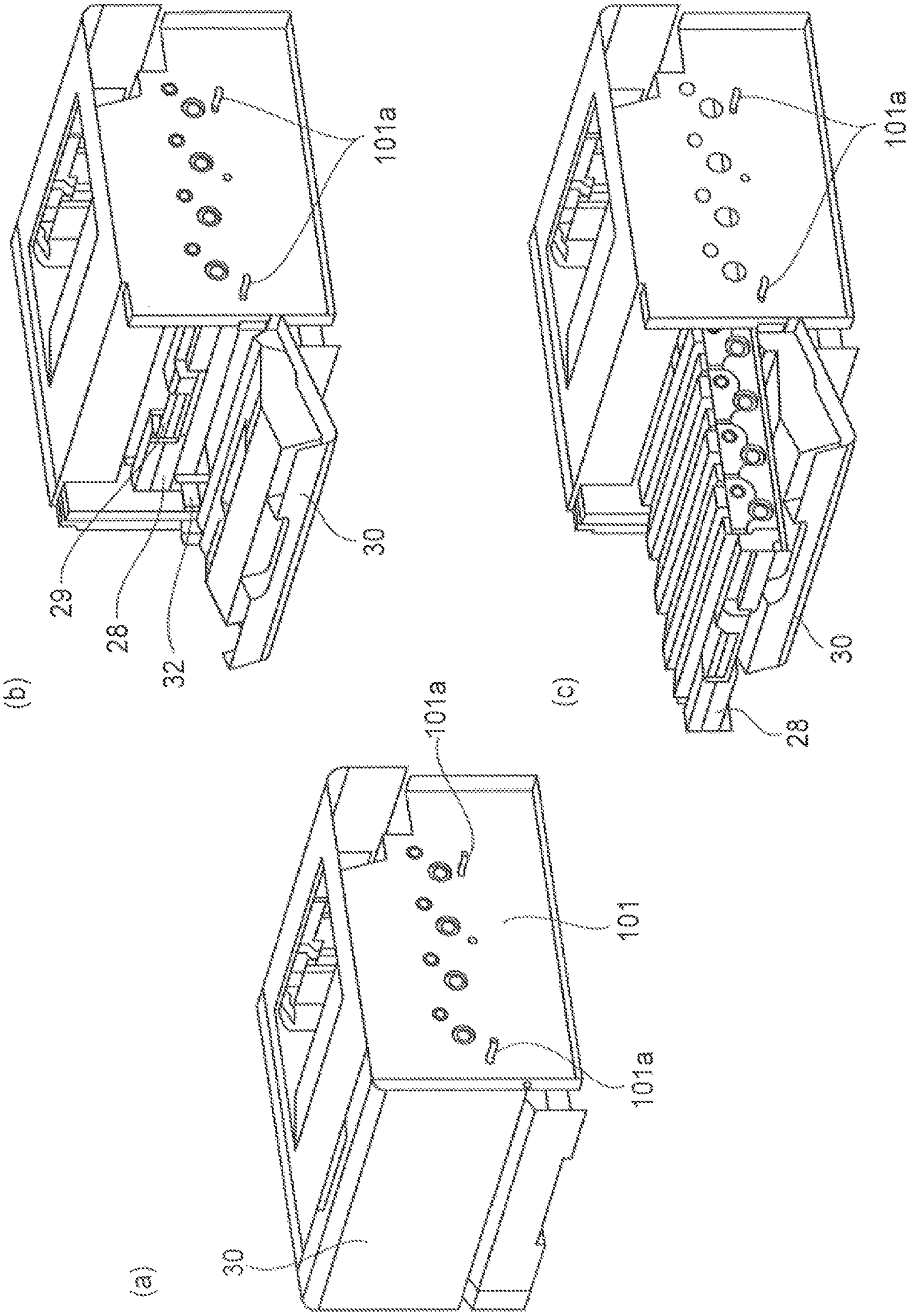

Parts (a) and (b) of FIG. 6 are perspective views of the image forming apparatus in the first embodiment, when the door of the apparatus is closed and open, respectively. Part (c) of FIG. 6 is a perspective view of the image forming apparatus, the cartridge tray of which is in its outermost position.

Figure 7:
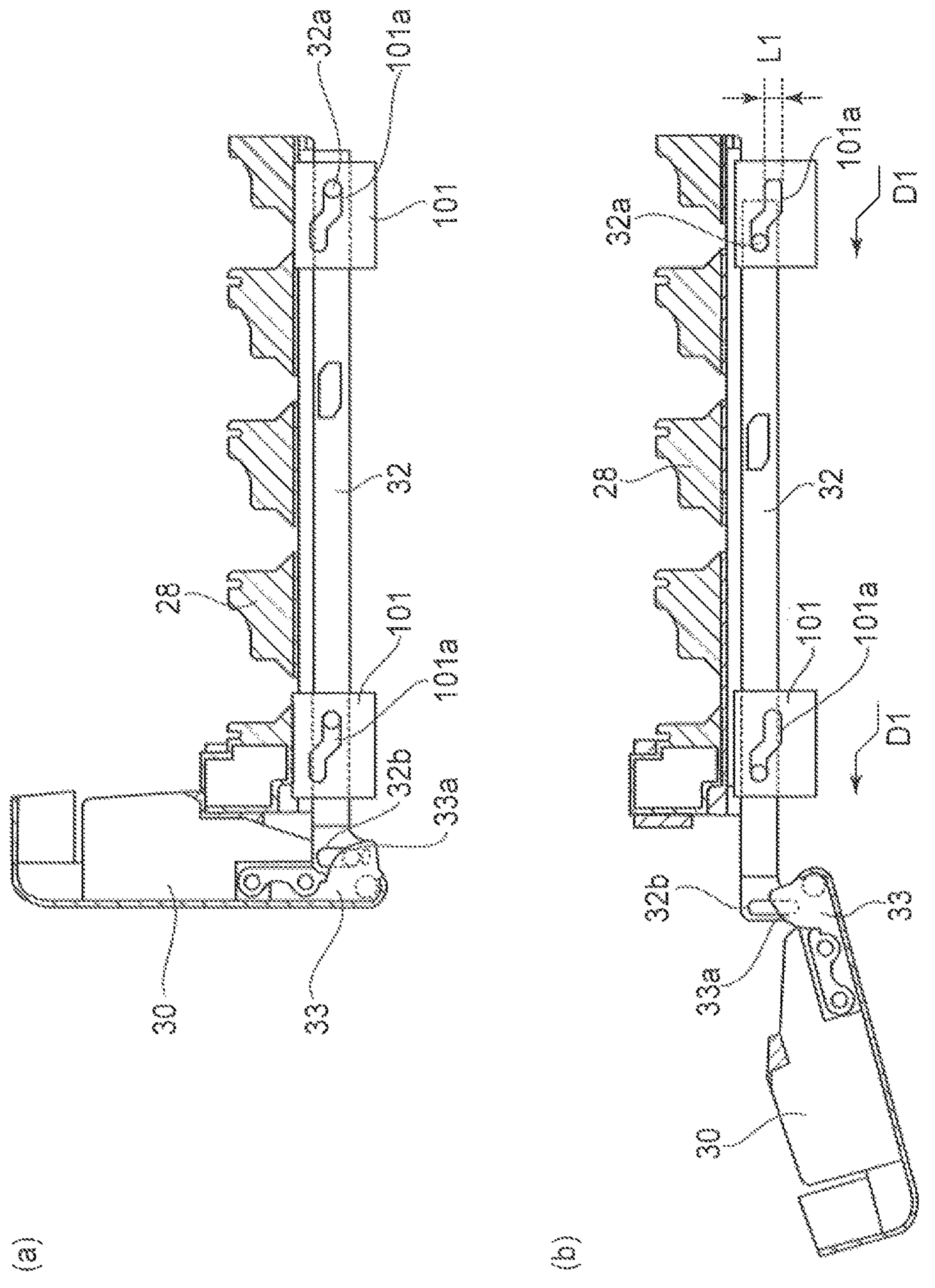

Parts (a) and (b) of FIG. 7 are sectional views of a combination of the door, cartridge tray, process cartridges, etc., when the door is open, and closed, respectively.

Figure 8:
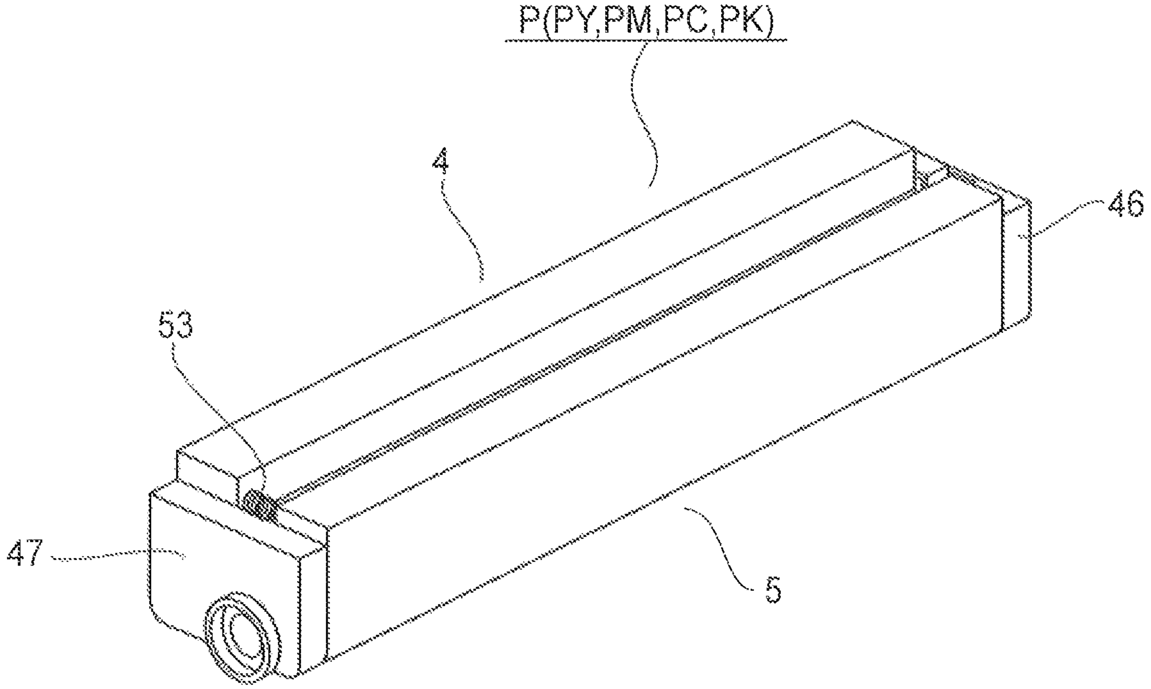

FIG. 8 is a perspective view of one of the process cartridges in the first embodiment.

Figure 9:
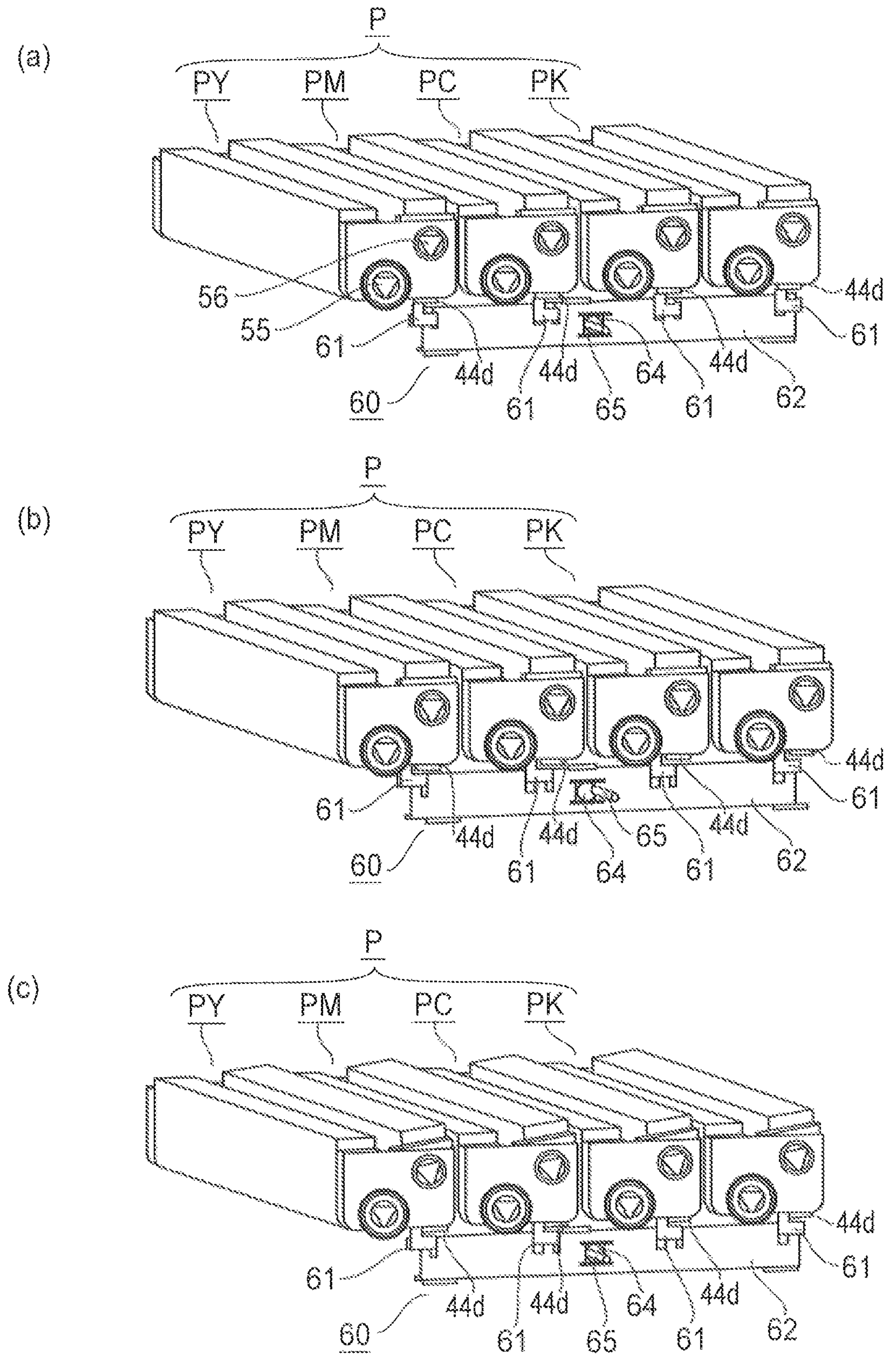

Parts (a) and (b) of FIG. 9 are perspective views of a combination of the process cartridges, development roller spacing members, moving member, immediately after the installation of the process cartridges into the apparatus main assembly, and when the development unit is in the contact position, respectively. Part (c) of FIG. 9 is a perspective view of the development unit when the unit is in the separation position.

Figure 10:
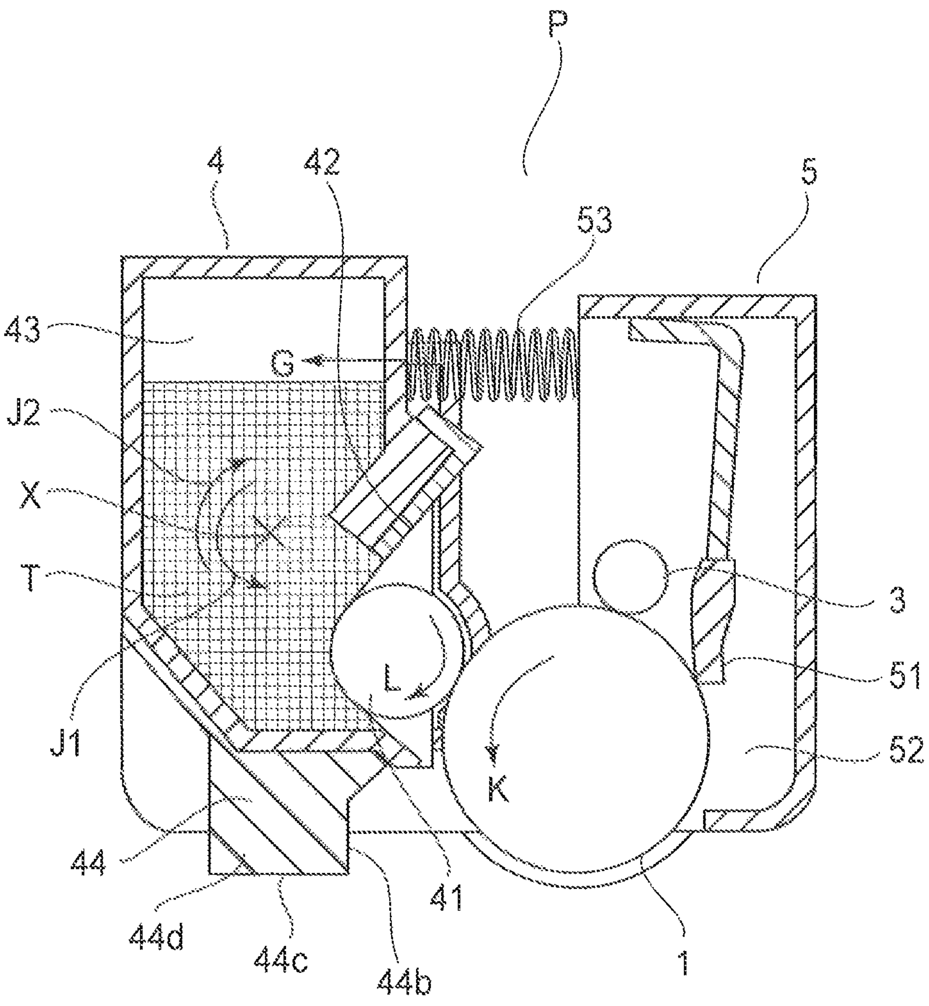

FIG. 10 is a sectional view of one of the process cartridges in the first embodiment.

Figure 11:
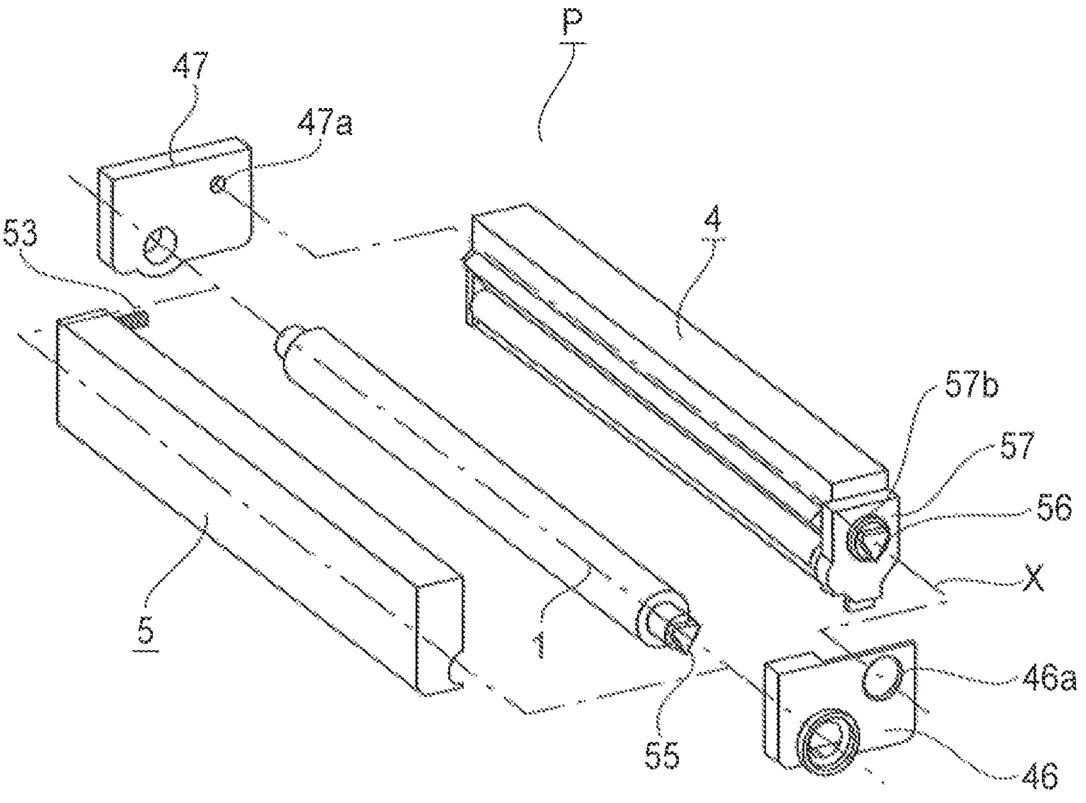

FIG. 11 is a sectional view of one of the process cartridges in the first embodiment.

Figure 12:
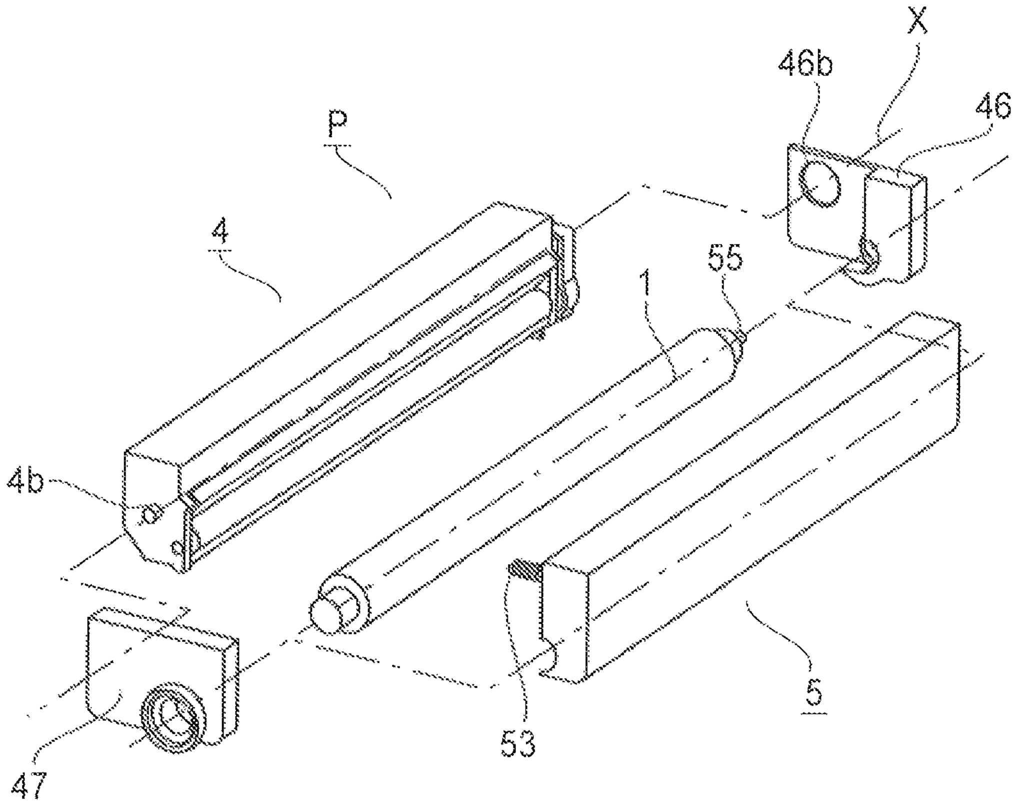

FIG. 12 is a sectional view of one of the process cartridges in the first embodiment.

Figure 13:
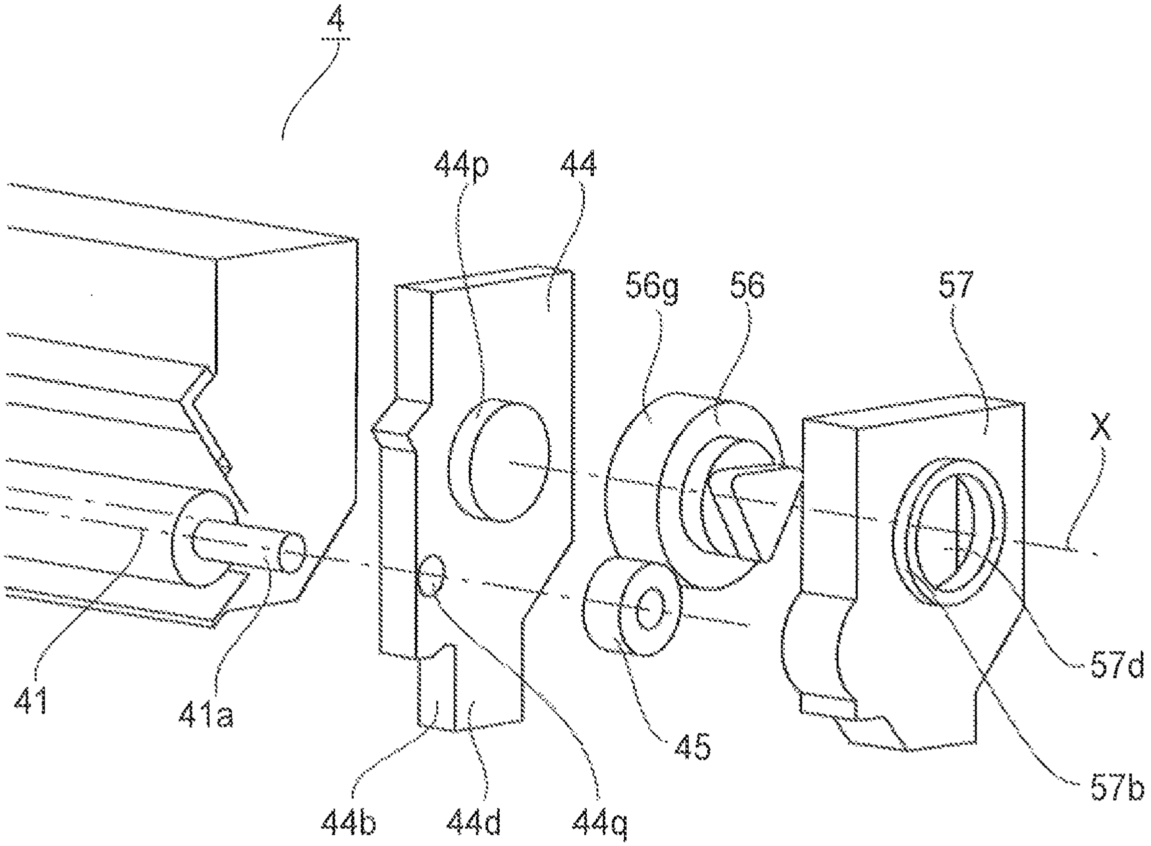

FIG. 13 is a sectional view of one of the process cartridges in the first embodiment.

Figure 14:
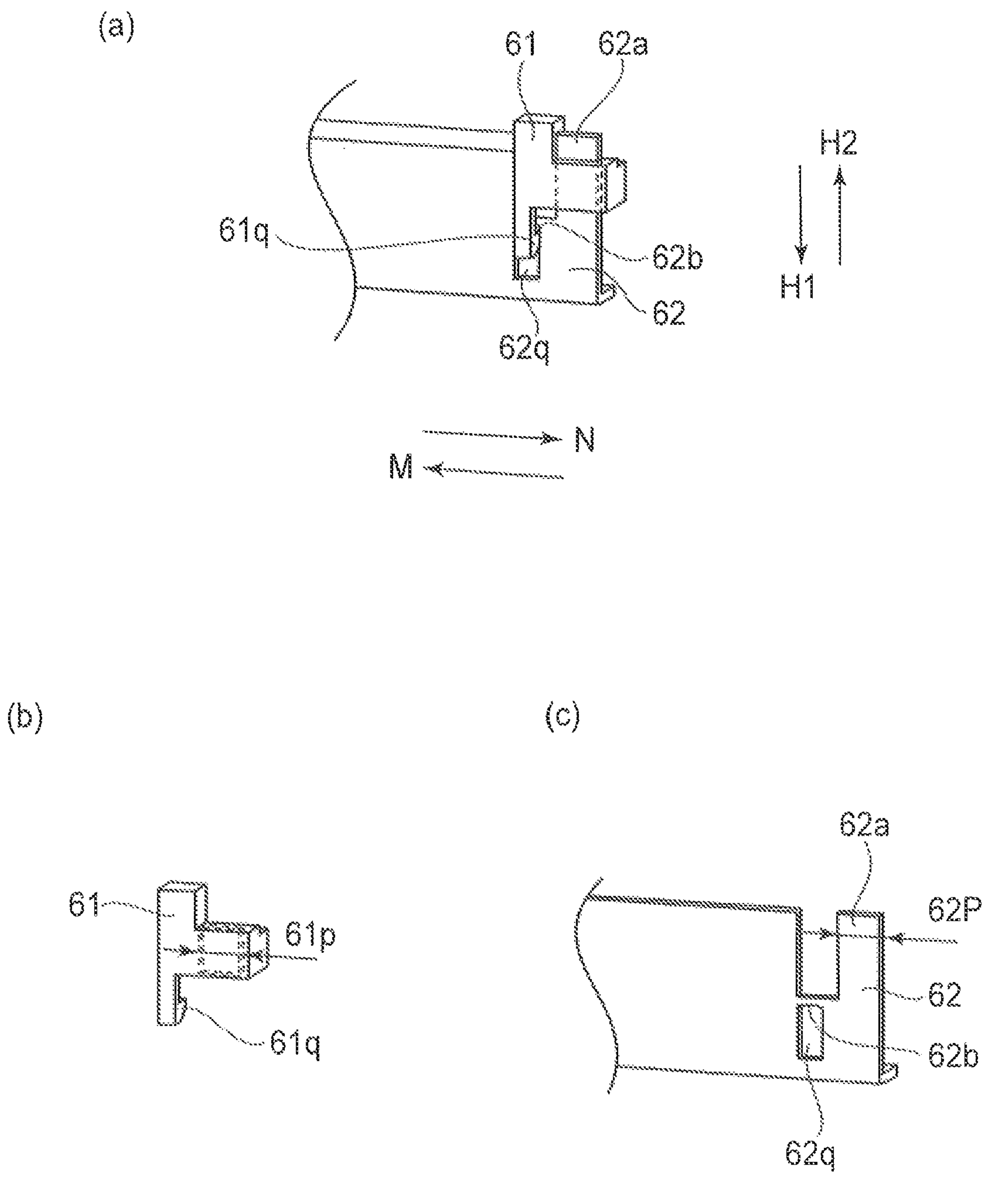

Part (a) of FIG. 14 is a drawing of a combination of a moving member 62 and a spacing member 61, and Part (b) of FIG. 14 is a drawing of the spacing member 61. Part (c) of FIG. 14 is a drawing of the moving member 62.

Figure 15:
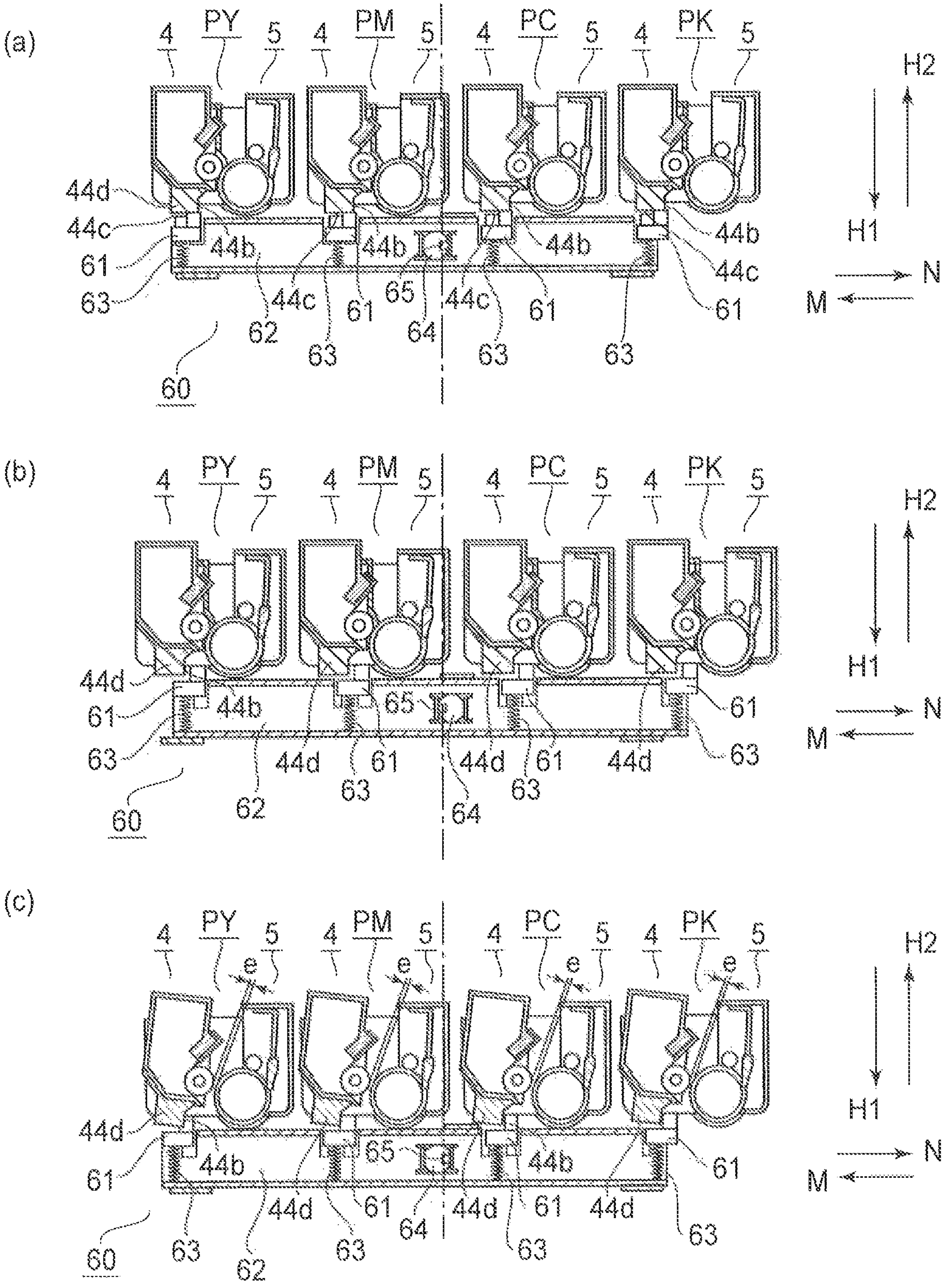

Part (a) and (b) of FIG. 15 are sectional views of a combination of process cartridges, spacing member 61, and moving member 62, etc., when the process cartridges are being installed or removed, and when the development unit is in its contact position. Part (c) of FIG. 15 is a sectional view of the combination, when the development unit is in the separation position.

Figure 16:
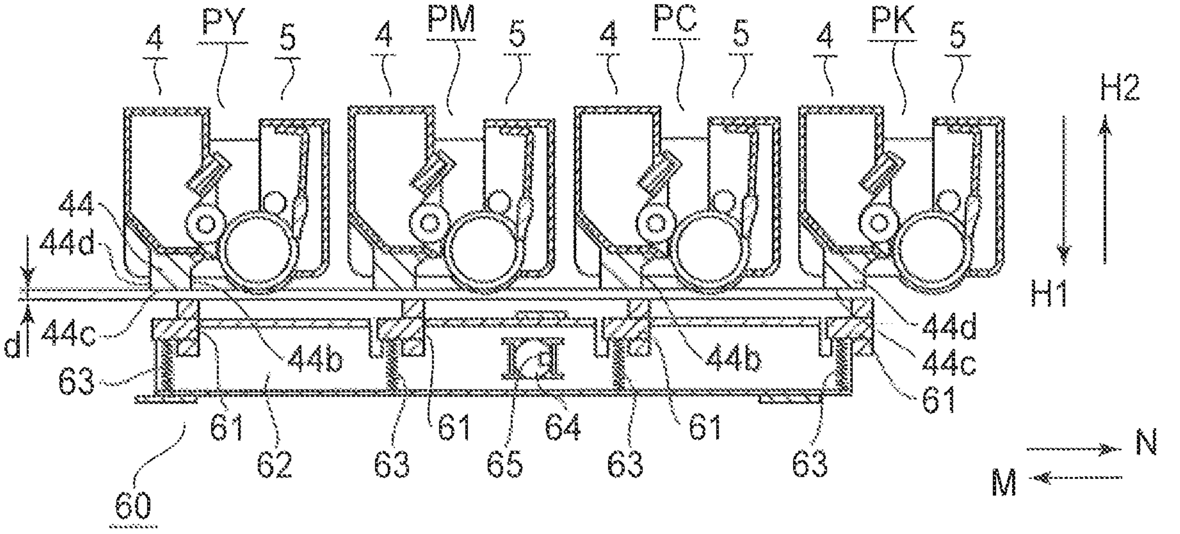

FIG. 16 is a sectional view of the combination of the process cartridge and separation mechanism, in the first embodiment, and shows the relationship between the cartridges and separation mechanism.

Figure 17:
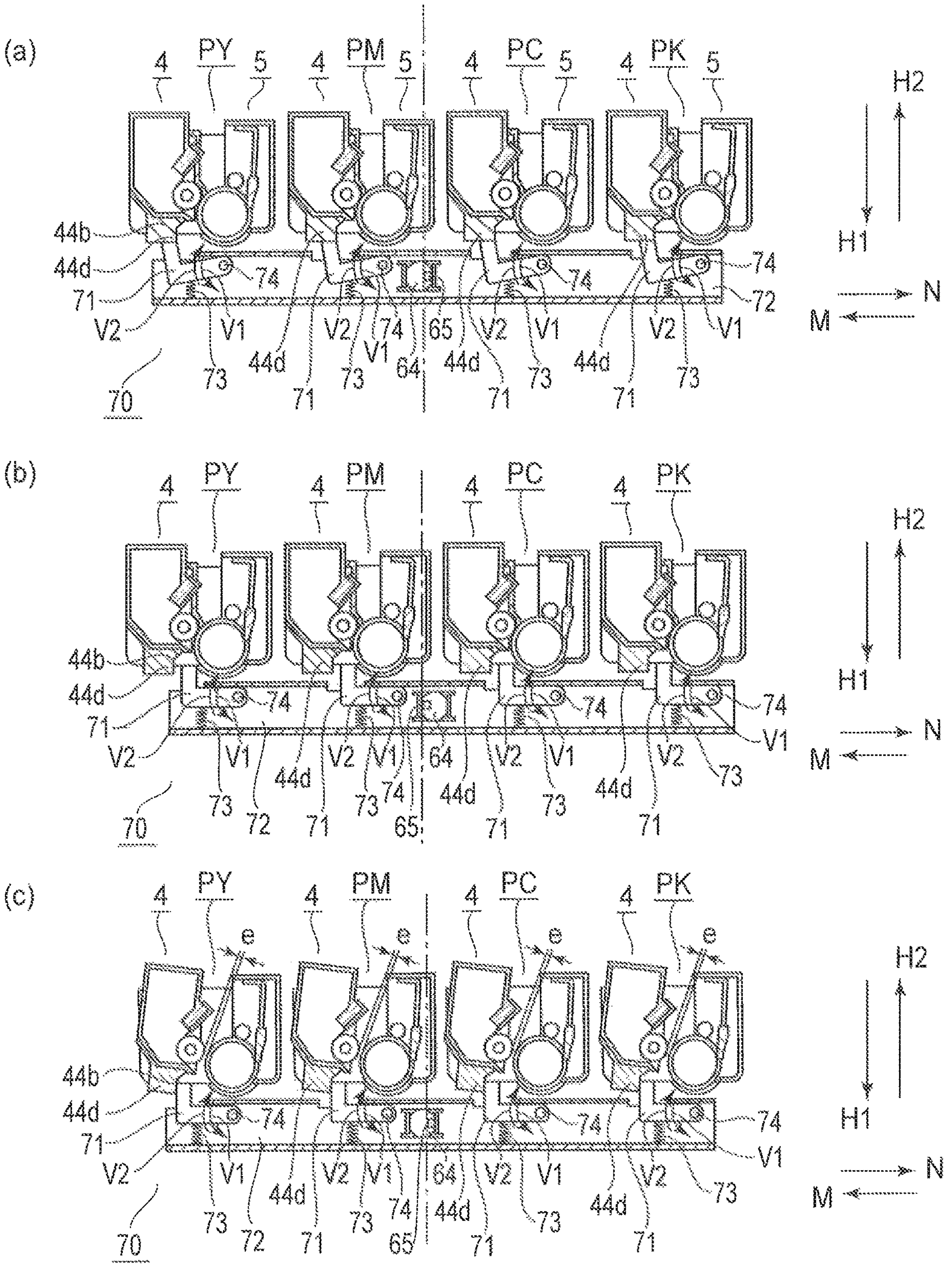

Parts (a) and (b) of FIG. 17 are sectional views of a combination of the process cartridges and development roller disengagement mechanism, immediately after installation of the process cartridges, and when the development unit is in its contact position. Part (c) of FIG. 17(*c*) is a sectional view of the combination of the process cartridges and development roller disengagement mechanism, when the development unit is in the separation position.

Figure 18:
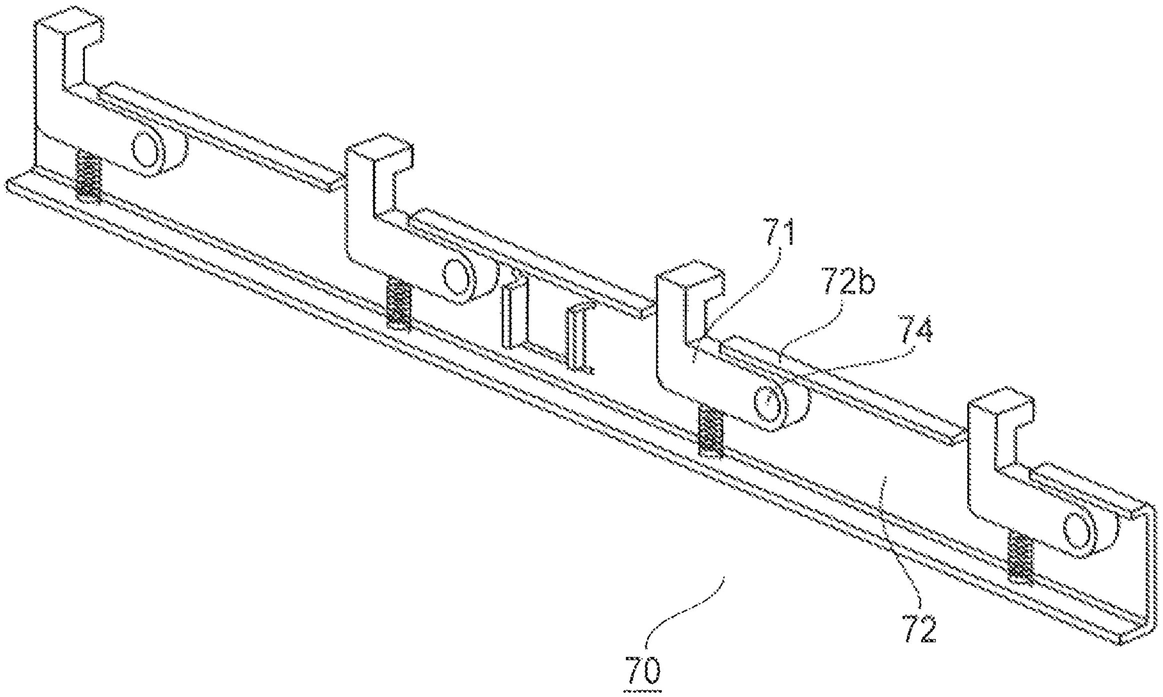

FIG. 18 is an enlarged view of a combination of the spacing member, and the moving member, in the second embodiment of the present invention.

Figure 19:
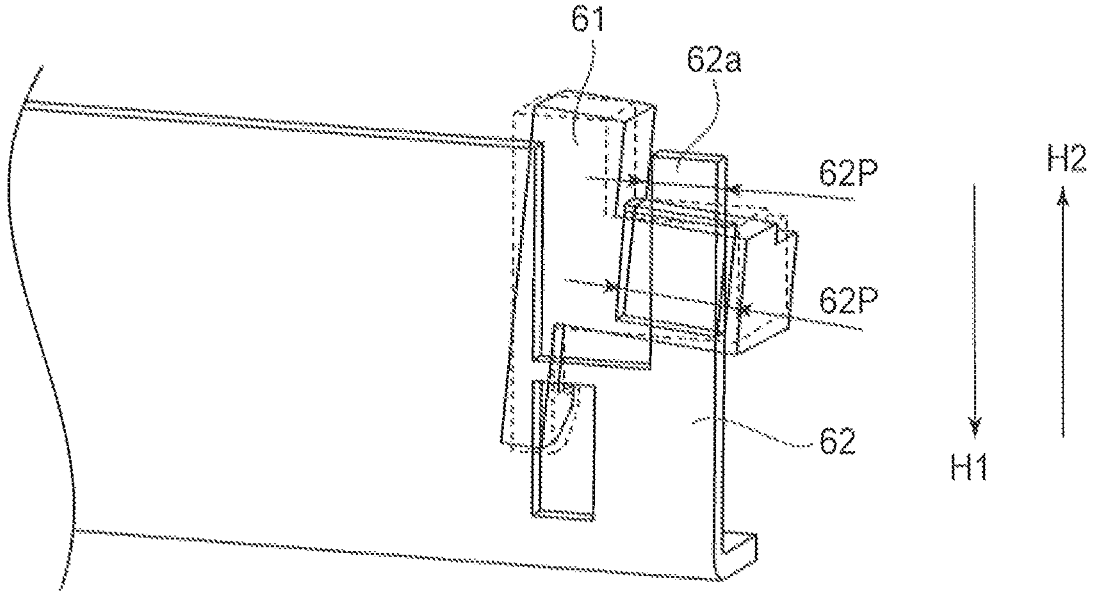

FIG. 19 is an enlarged view of the combination of the spacing member and moving member in the second embodiment.

Figure 20:
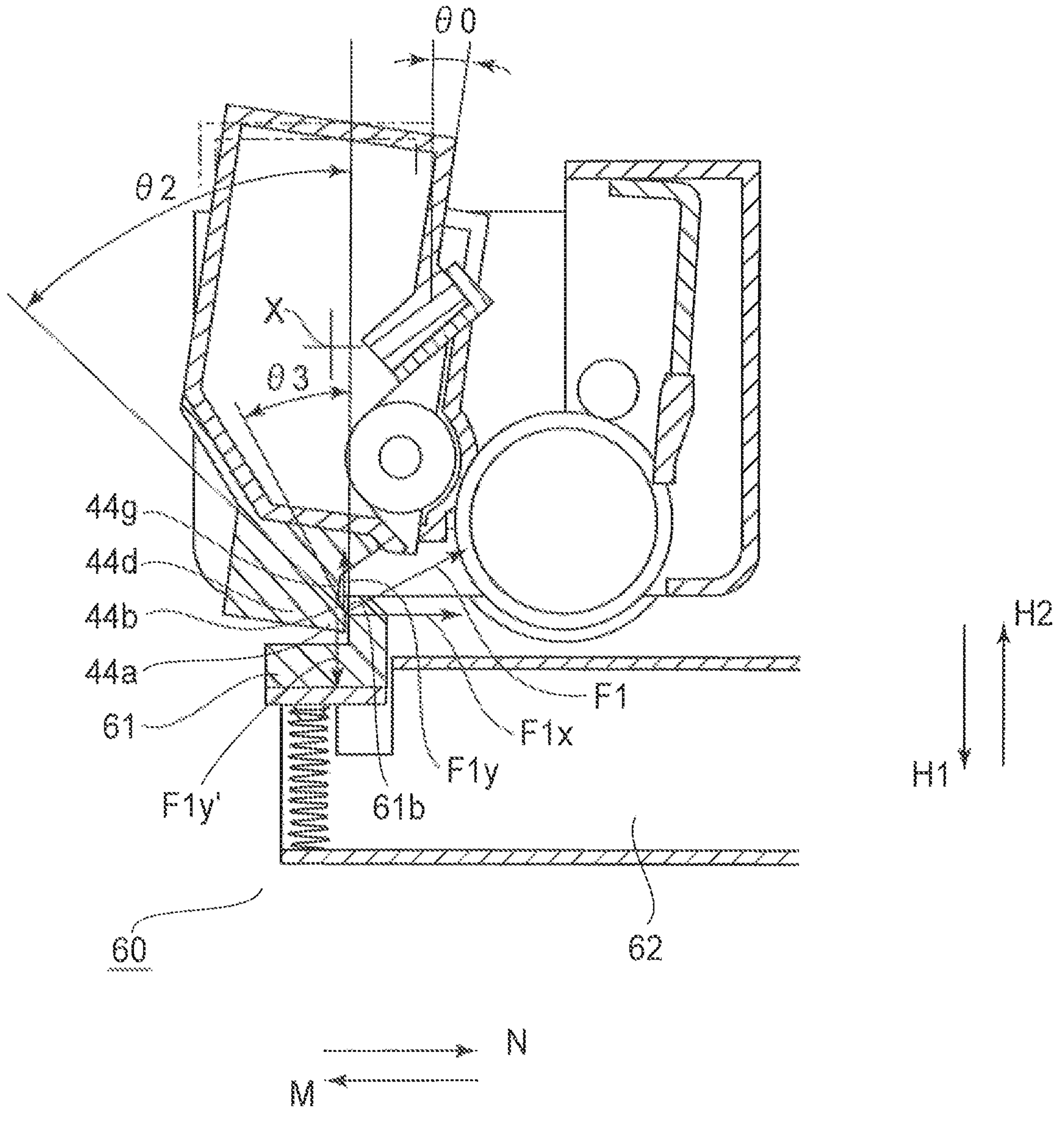

FIG. 20 is a sectional view of a combination of one of the process cartridges and development roller disengagement mechanism, in the third embodiment of the present invention. It shows the relationship between the two components.

Figure 21:
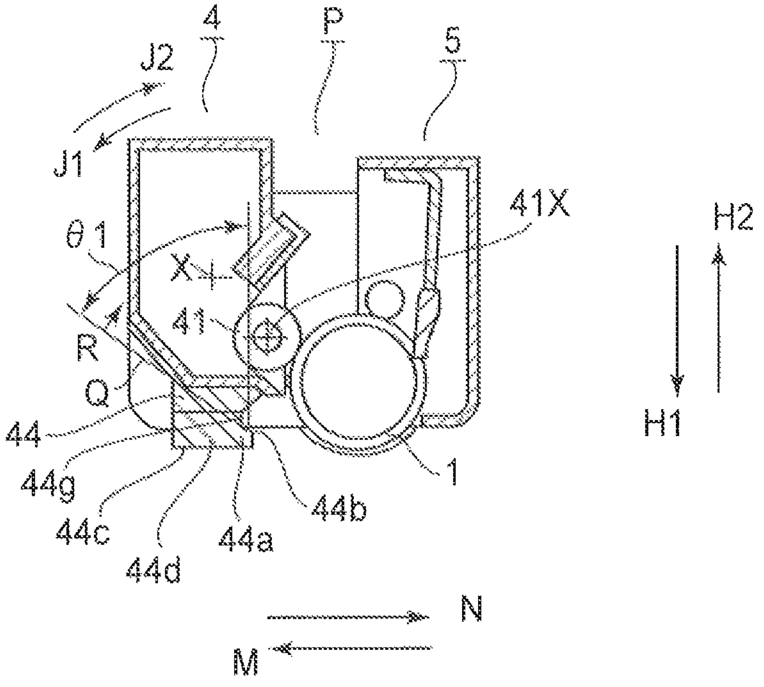

FIG. 21 is a sectional view of the process cartridge in the third embodiment.

Figure 22:
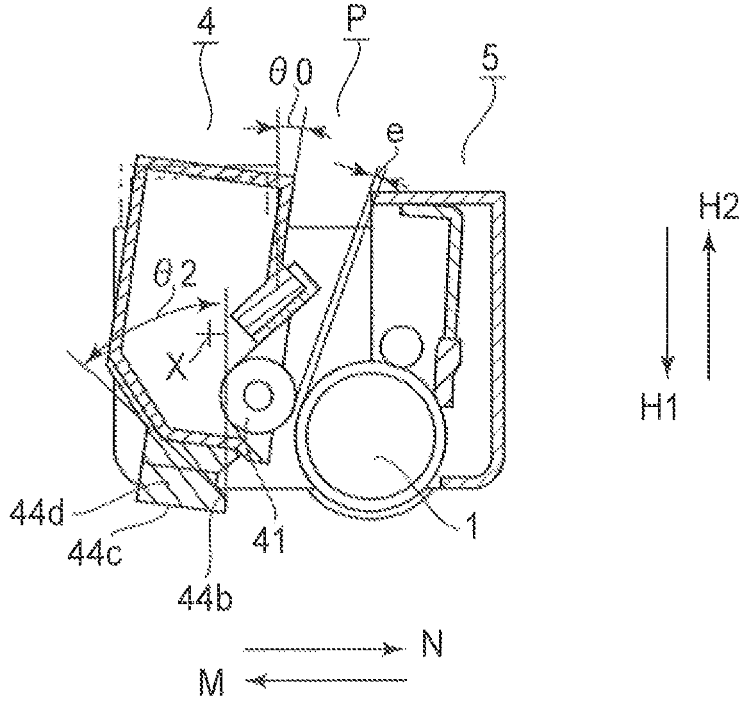

FIG. 22 is a sectional view of the process cartridge in the third embodiment.

Figure 23:
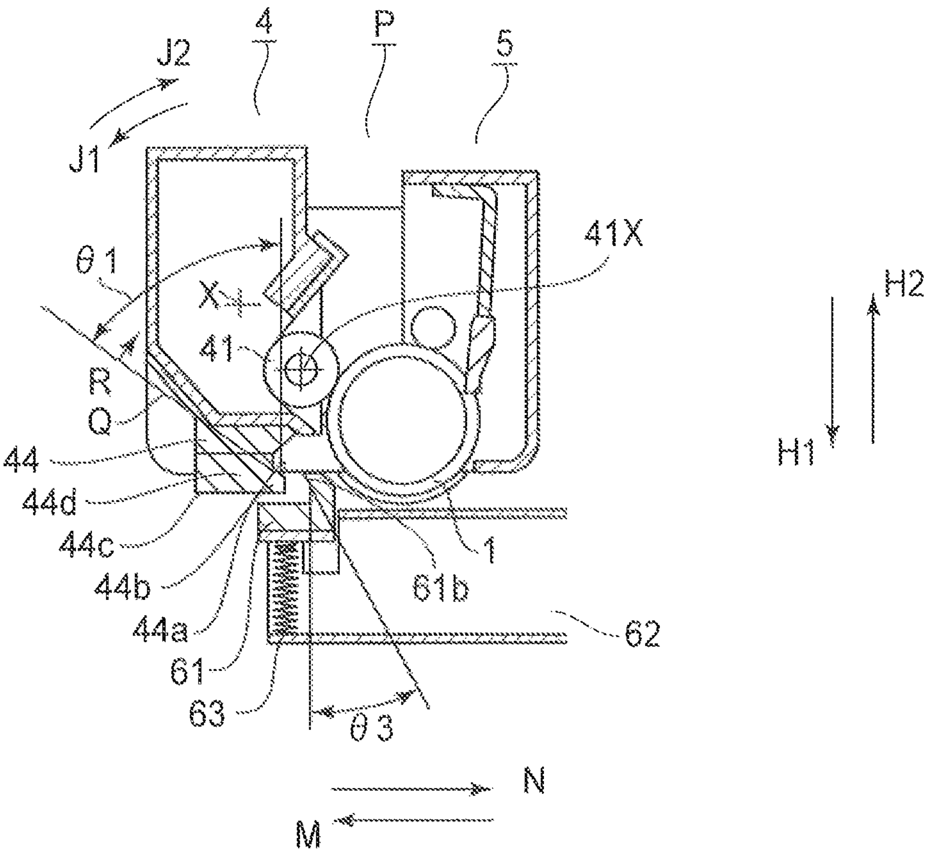

FIG. 23 is a sectional view of a combination of one of the process cartridges and development roller disengagement mechanism, in the third embodiment of the present invention. It shows the relationship between the two components.

Figure 24:
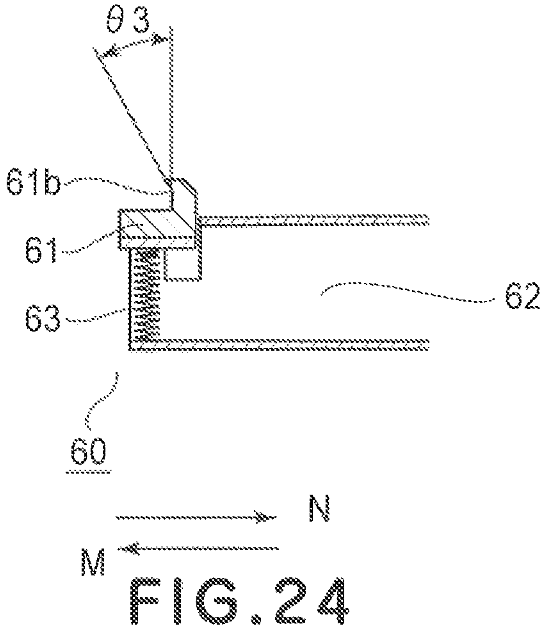

FIG. 24 is a sectional view of the development roller disengagement mechanism in the third embodiment.

Figure 25:
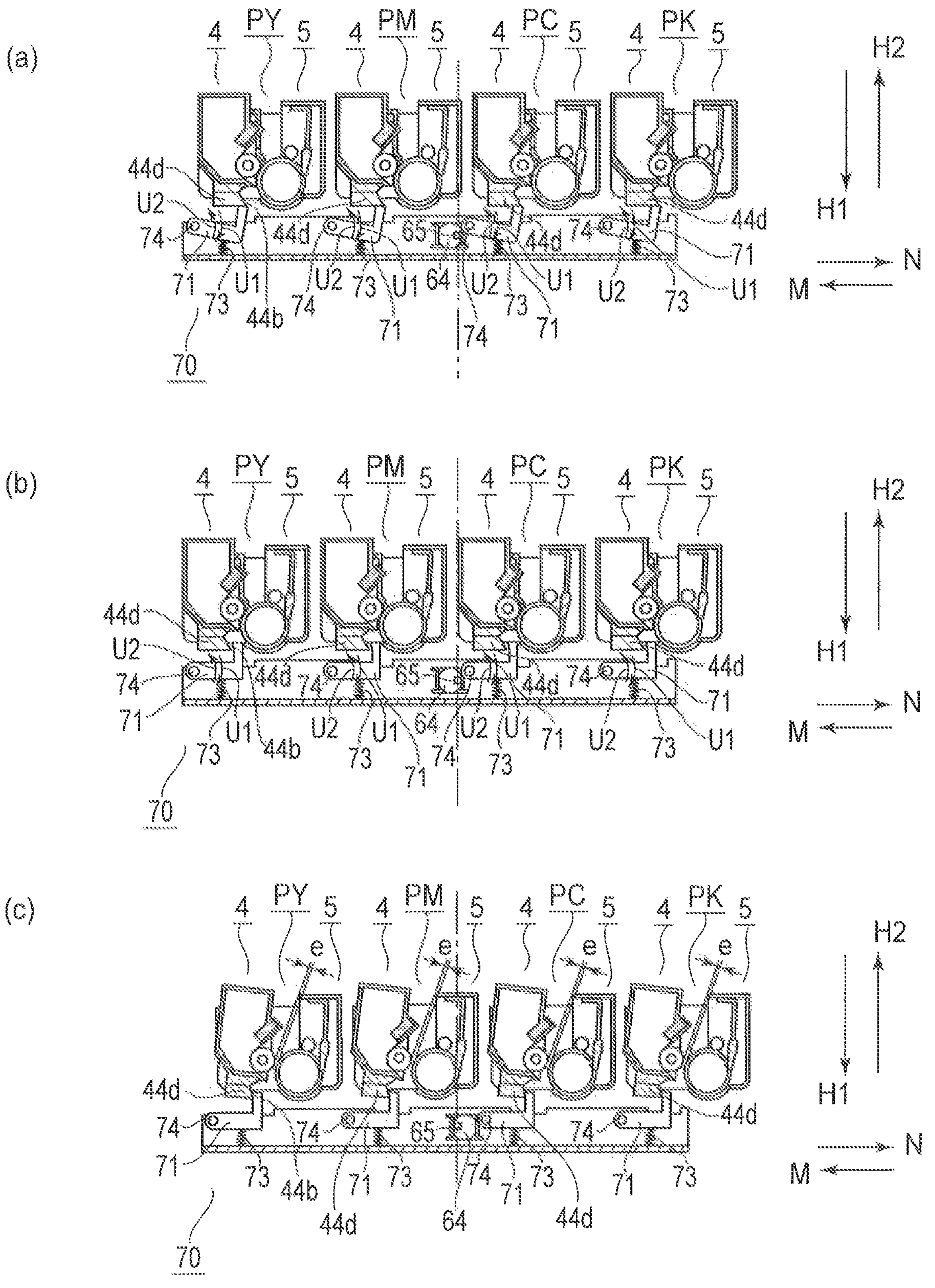

Parts (a) and (b) of FIG. 25 are sectional views of a combination of the process cartridges and development roller disengagement mechanism, immediately after the installation of the process cartridges, and when the development unit is in its contact position. Part (c) of FIG. 25 is a sectional view of the combination, when the development unit is in the separation position.

Figure 26:
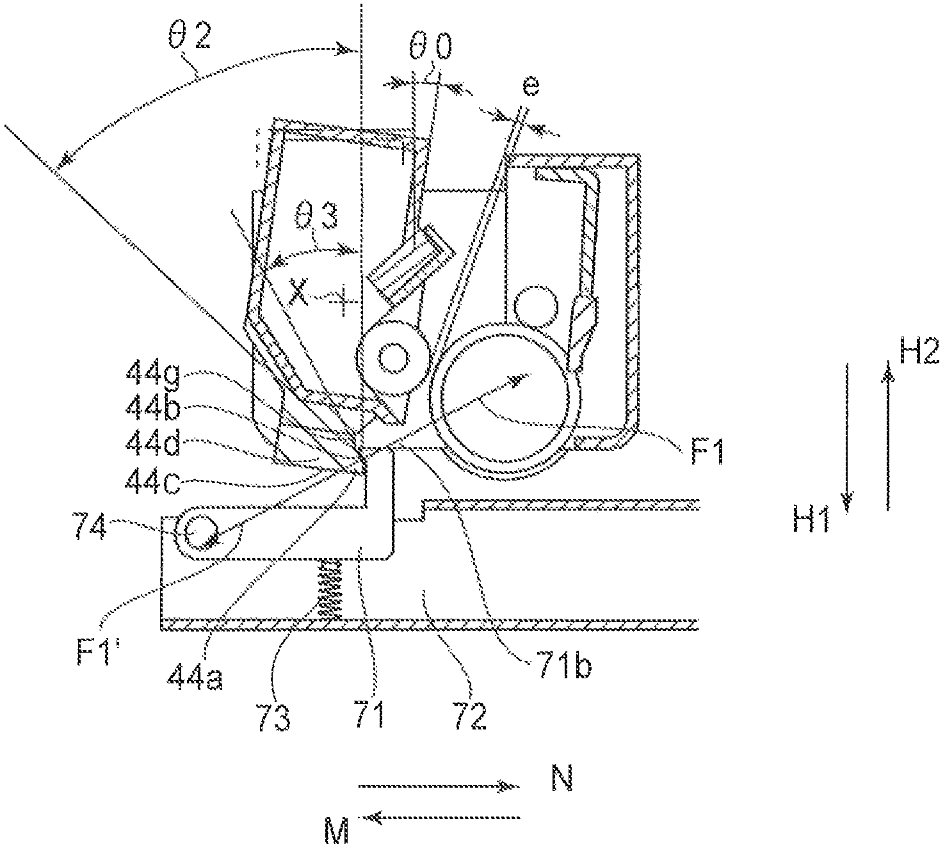

FIG. 26 is a sectional view of the combination of the process cartridge and development roller disengagement mechanism, in the fourth embodiment, and shows the relationship between the cartridges and disengagement mechanism.

Figure 27:
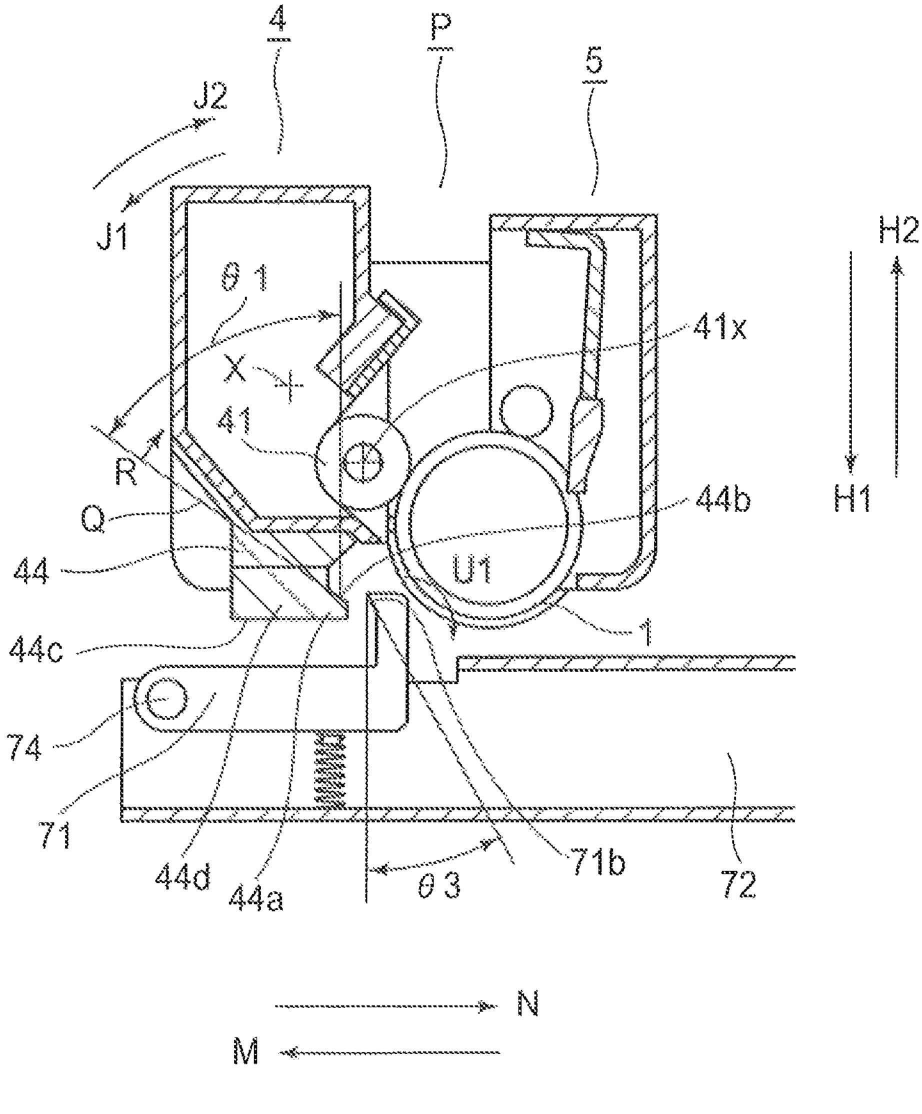

FIG. 27 is a sectional view of the development roller disengagement mechanism in the fourth embodiment.

Figure 28:
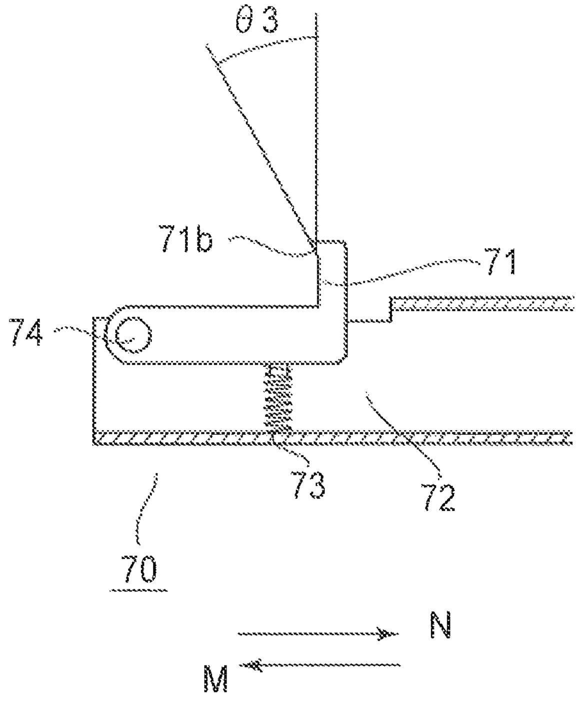

FIG. 28 is a sectional view of a combination of the process cartridge and development roller disengagement mechanism in the fourth embodiment. It shows the relationship between the two components.

Figure 29:
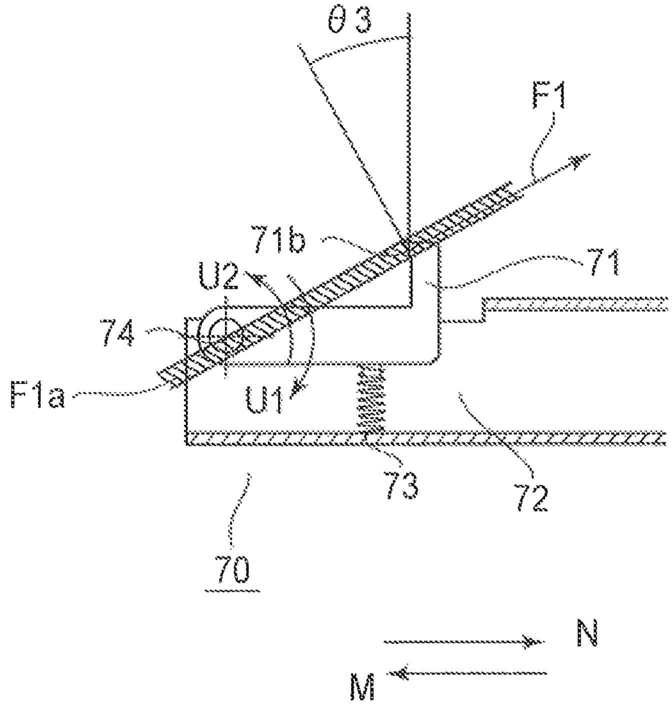

FIG. 29 is a sectional view of the development roller disengagement mechanism in the fourth embodiment.

Figure 30:
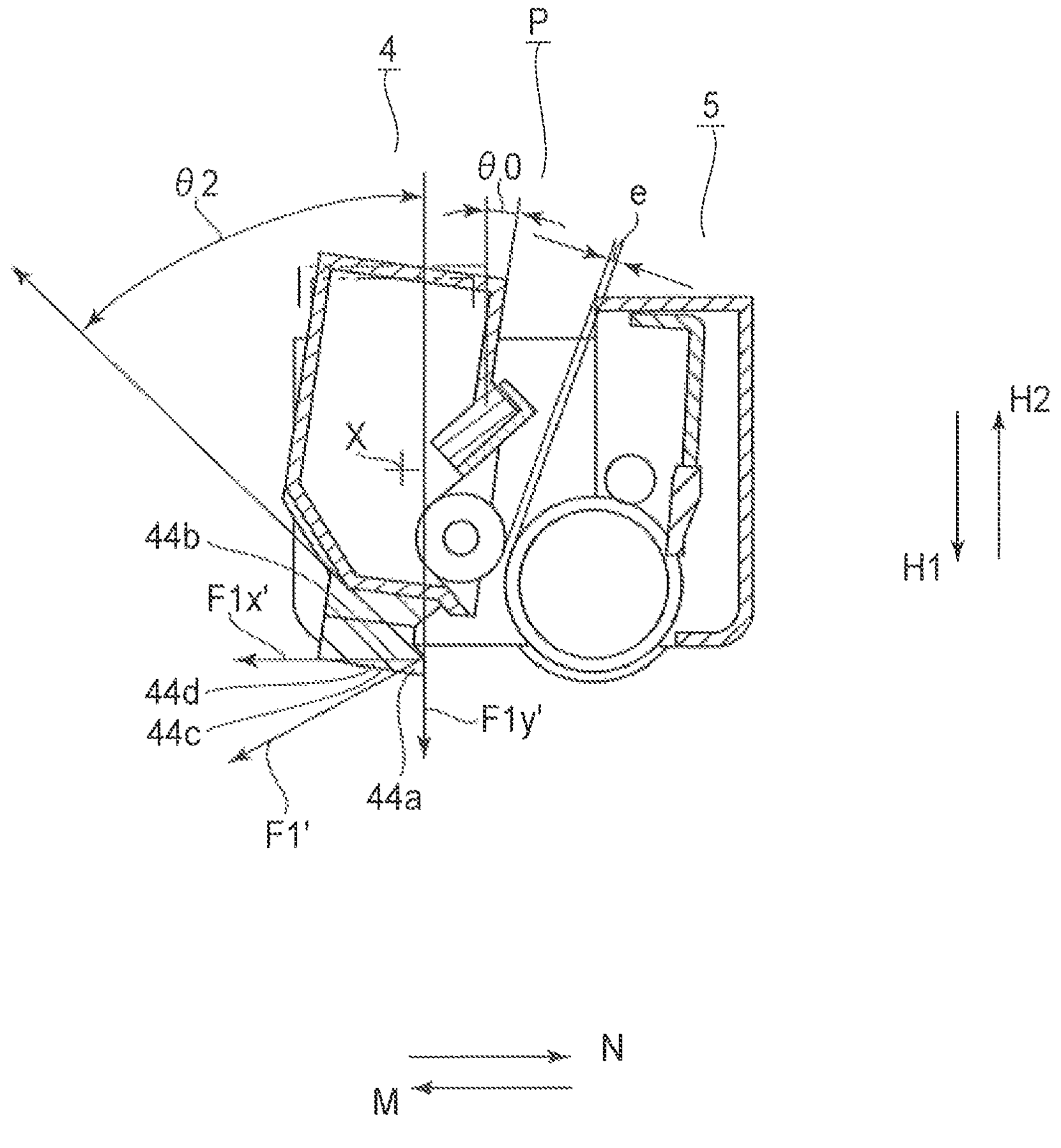

FIG. 30 is a sectional view of one of the process cartridges in the fourth embodiment.

Figure 31:
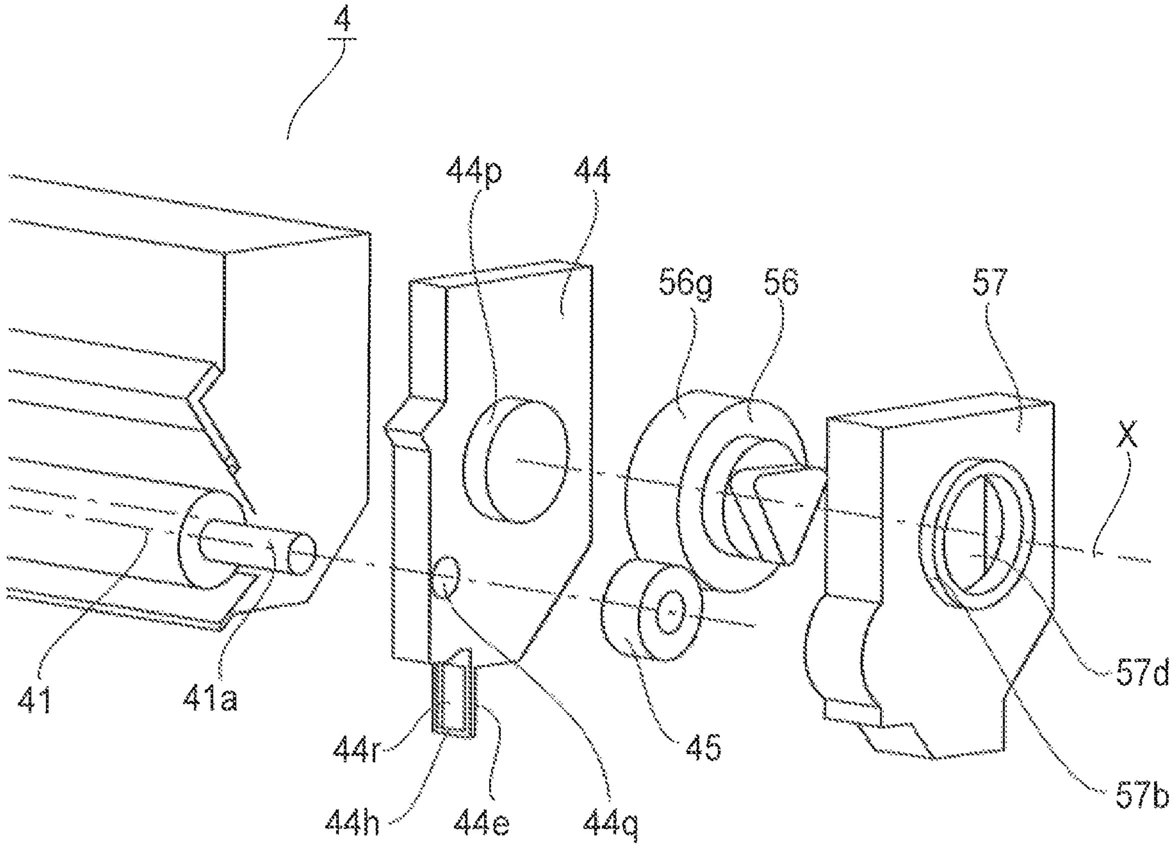

FIG. 31 is a perspective view of one of the process cartridge in the fifth embodiment of the present invention.

Figure 32:
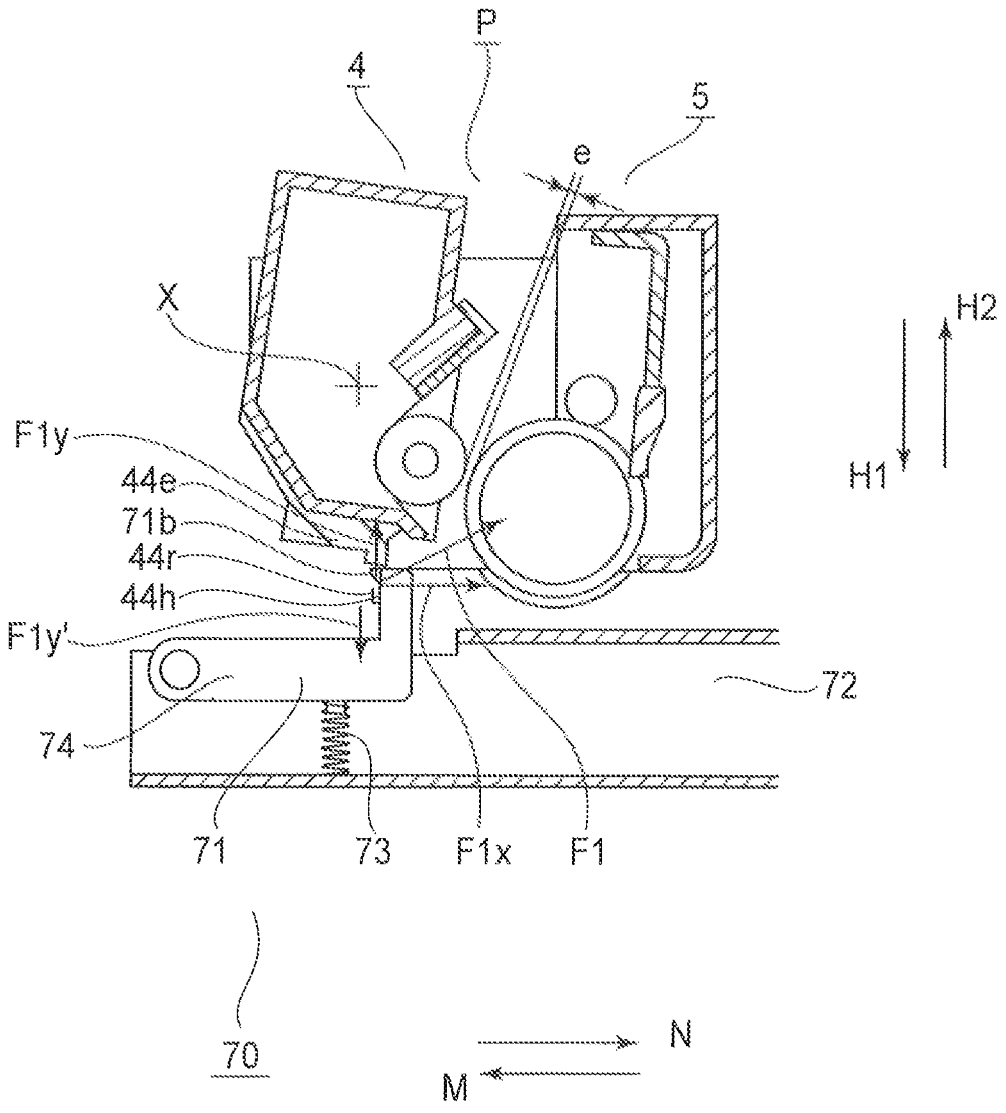

FIG. 32 is a sectional view of the process cartridge and development roller disengagement mechanism in the fifth embodiment. It shows the relationship between the two components.

Figure 33:
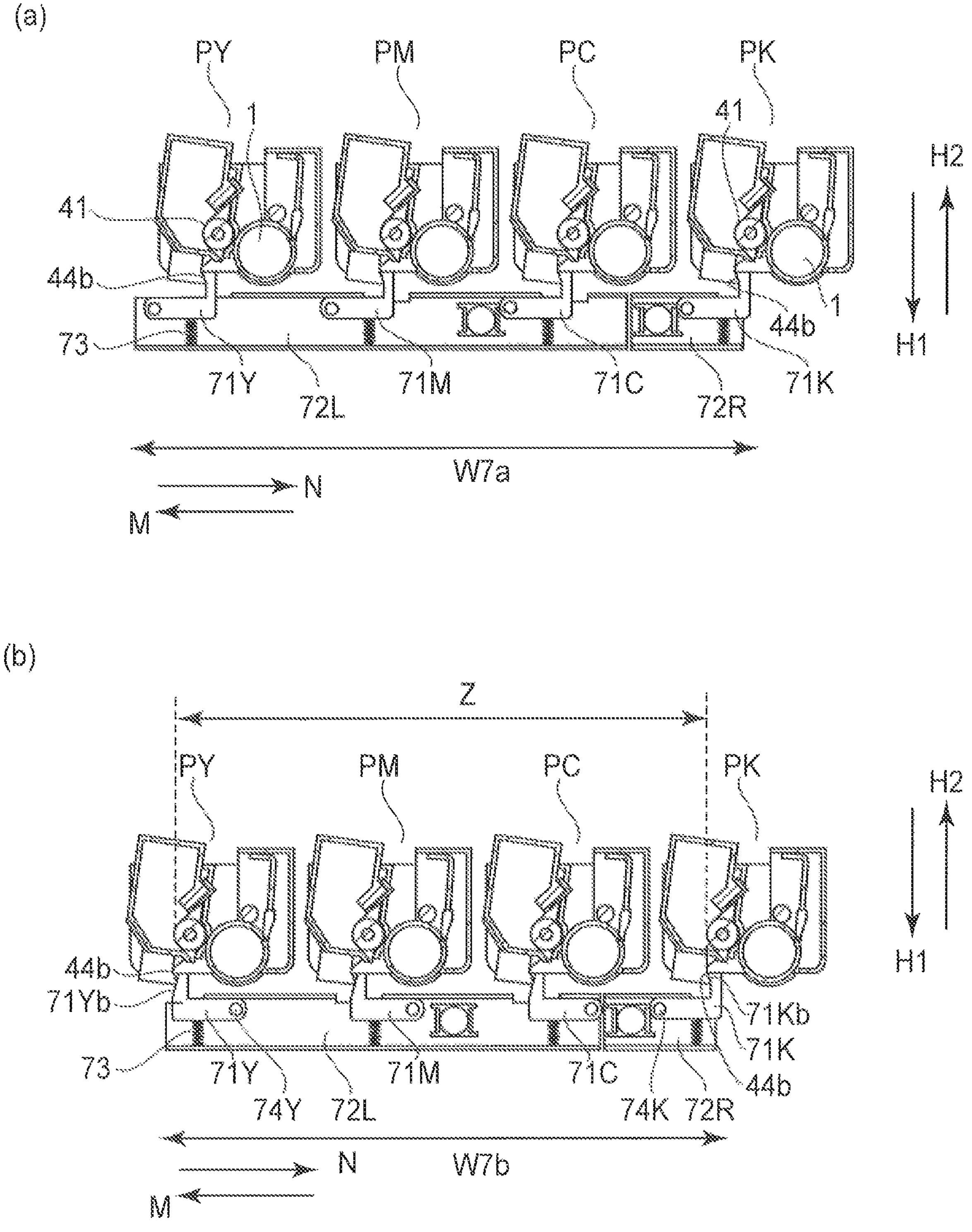

Parts (a) and (b) of FIG. 33 are drawings for describing the structure of the development roller disengagement mechanism in the sixth embodiment of the present invention.

Figure 34:
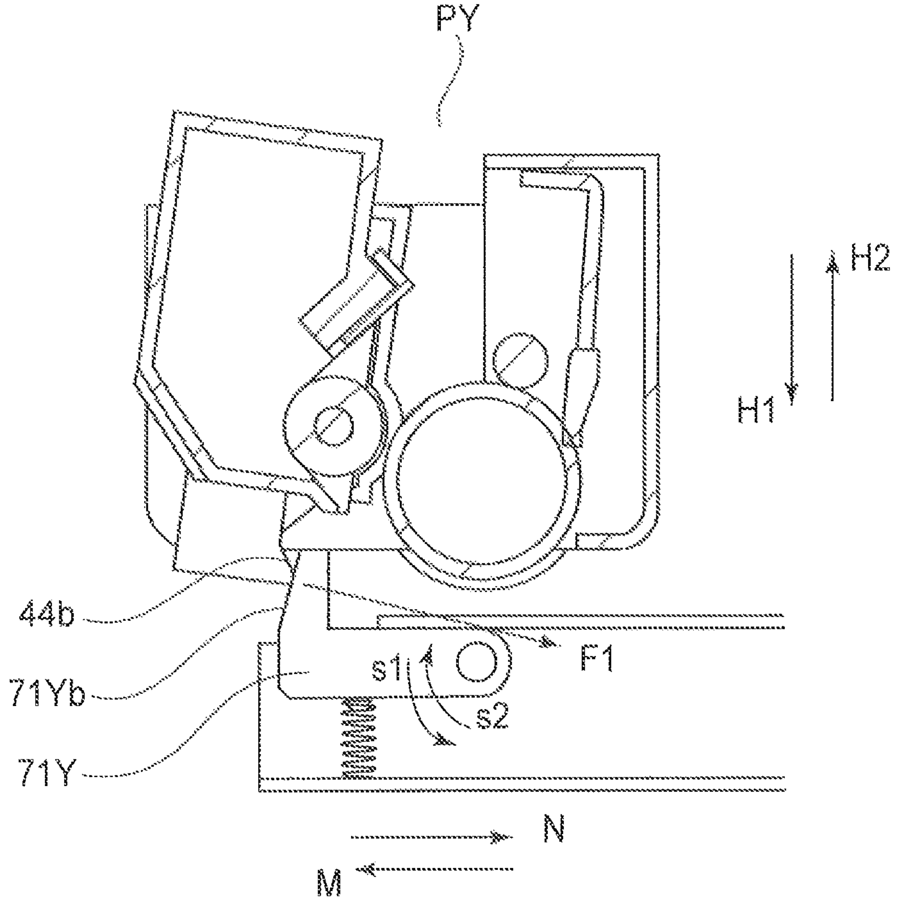

FIG. 34 is a drawing for describing the structure of the development roller disengagement mechanism in the sixth embodiment.

Figure 35:
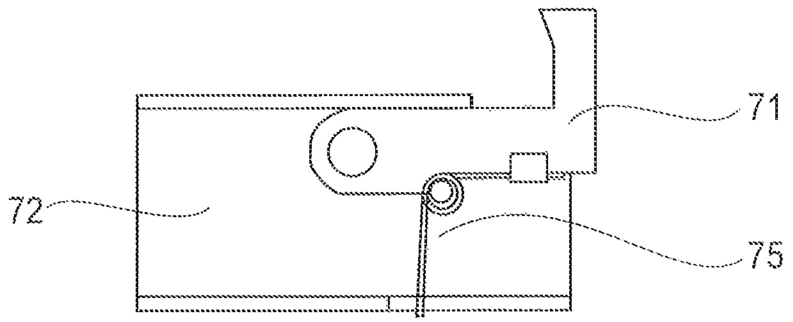

FIG. 35 is a drawing for describing the structure of the development roller disengagement mechanism in the sixth embodiment.

DESCRIPTION OF THE EMBODIMENTS

Hereinafter, the image forming apparatuses in accordance with the present invention are described in detail with reference to FIGS. 1-35.

Embodiment 1

FIGS. 1-5 are drawings of the image forming apparatus A in this embodiment, which is a laser beam printer. First, the overall structure of this laser beam printer, and its functions, are described. Incidentally, in each of the following embodiments of the present invention, the image forming apparatus A is a full-color image forming apparatus in which four process cartridges are removably installable. However, the number of process cartridges installable in the image forming apparatus is not limited to four. It is to be set as necessary.

[General Description of Image Forming Apparatus]

Figure 2:
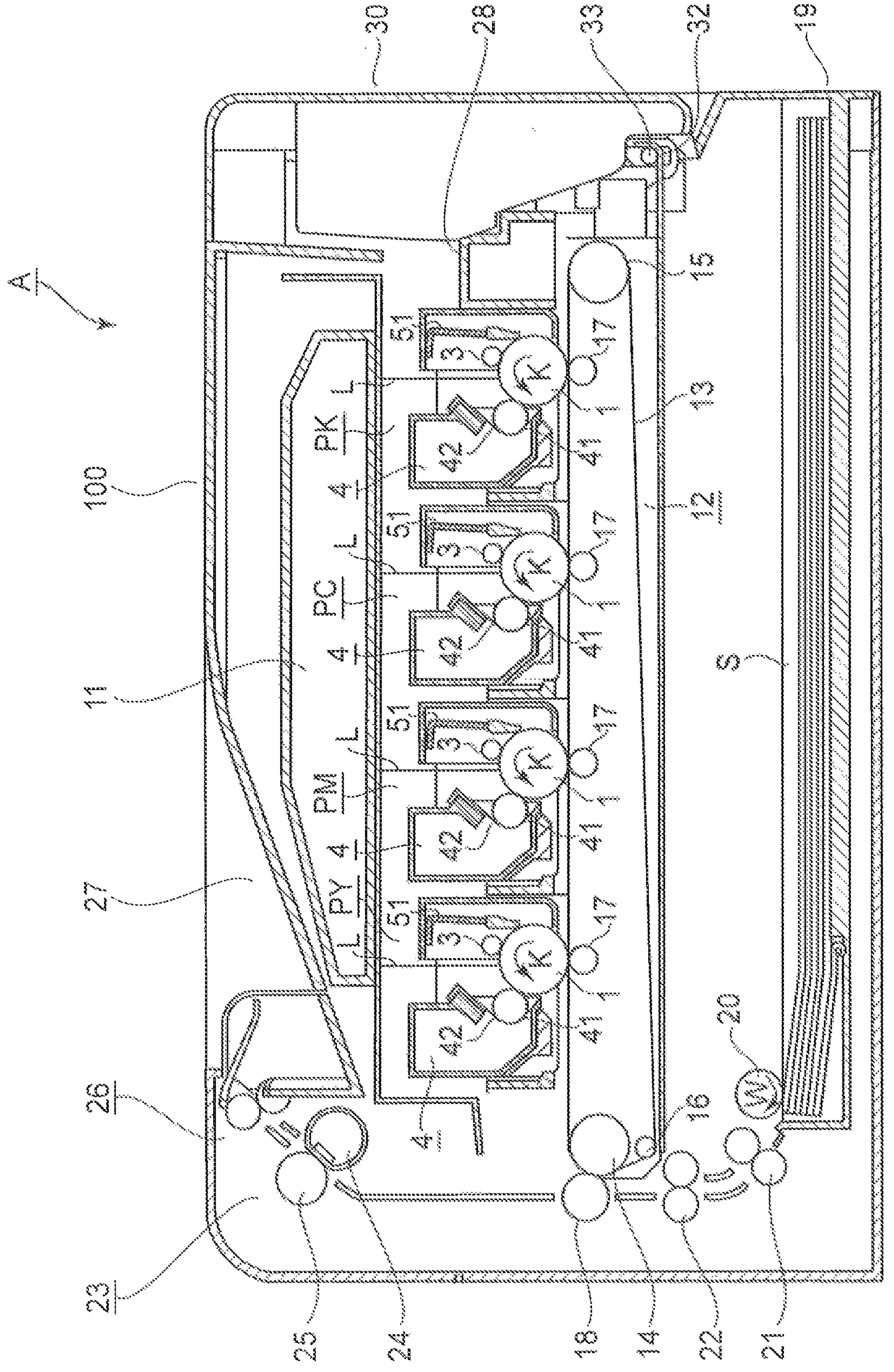
FIG. 2 is a sectional view of the image forming apparatus in the first embodiment.

FIG. 2 is a sectional view of the image forming apparatus A in this embodiment. It shows the general structure of the apparatus A. There are disposed a laser scanner 11, an intermediary transfer belt 13, a fixation film 24, a pressure roller 25, a sheet feeder tray 19, a sheet feeder roller 20, etc., in the main assembly (which hereafter may be referred to simply apparatus main assembly) 100 of the apparatus A.

The image forming apparatus A employs four process cartridges P (PY, PM, PC and PK), that is, the first, second, third and fourth process cartridges PY, PM, PC and PK, which are horizontally aligned in parallel in the main assembly 100. Each of the first to fourth process cartridges P (PY, PM, PC and PK) is provided with its own electrophotographic image formation system, which is similar to that of the other process cartridges P, except for the color of the developer its uses.

Each of the first to fourth process cartridges P (PY, PM, PC and PK) has a development unit 4 equipped with a development roller 41 for developing the electrostatic latent image on the peripheral surface of the photosensitive drum 1.

The first process cartridge PY contains yellow (Y) developer in its development unit 4. It forms a yellow developer image on the peripheral surface of the photosensitive drum 1.

The second process cartridge PM contains magenta (M) developer in its development unit 4. It forms a magenta developer image on the peripheral surface of the photosensitive drum 1.

The third process cartridge PC contains cyan (C) developer in its development unit 4. It forms a magenta developer image on the peripheral surface of the photosensitive drum 1.

The fourth process cartridge PK contains black (B) developer in its development unit 4. It forms a black developer image on the peripheral surface of the photosensitive drum 1.

Figure 1:
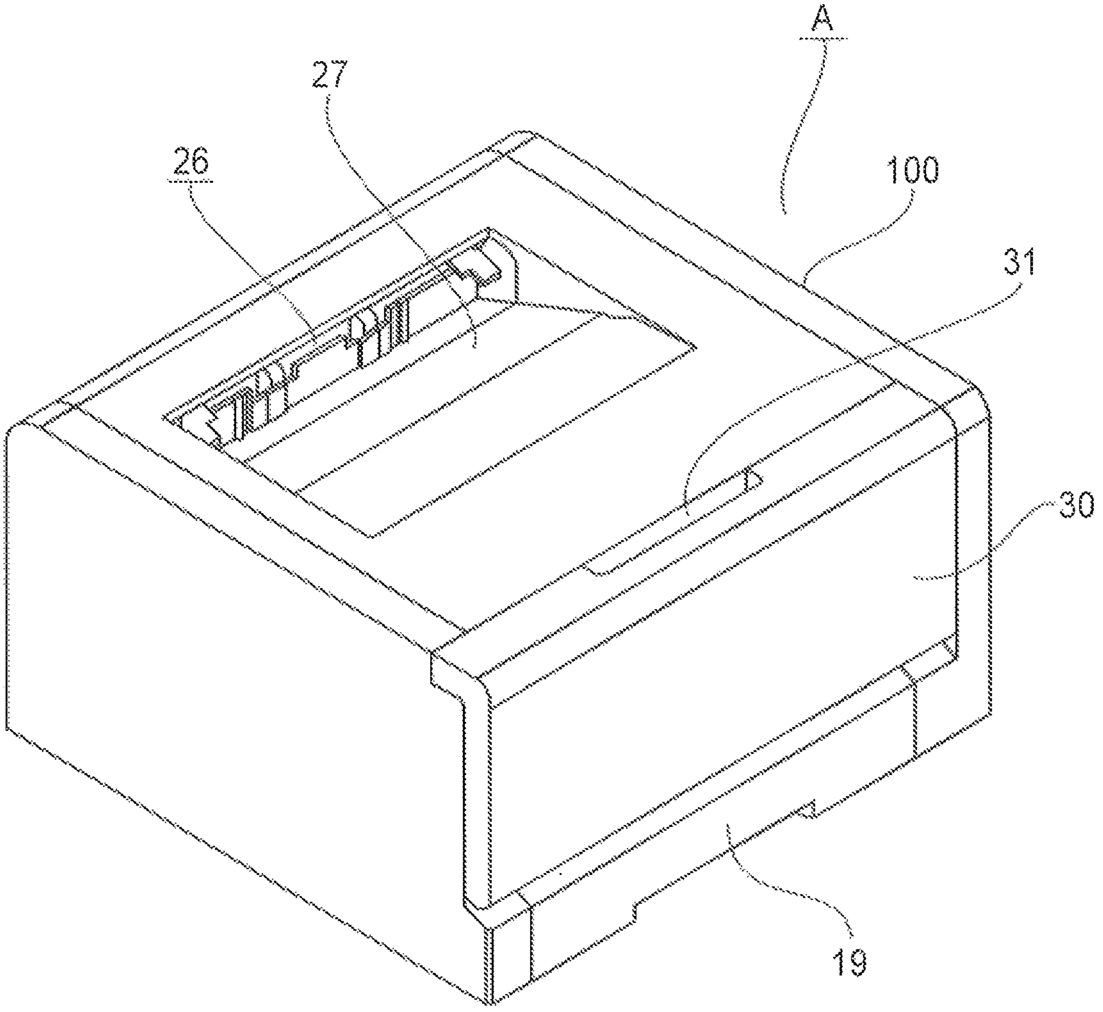
FIG. 1 is a perspective view of the image forming apparatus in the first embodiment of the present invention.

The stacked sheets S of recording paper (recording medium) in the sheet feeder tray 19 are fed one by one into the apparatus main assembly 100 by the sheet feeder roller 20 which rotates in the counterclockwise direction (indicated by arrow mark W) in FIG. 1. Then, each sheet S is sent to the area of contact (which hereafter may be referred to simply as nip) between a belt driver roller 14 and a secondary transfer roller 18.

The photosensitive drum 1 is being rotated in the counterclockwise direction (indicated by arrow mark K) in FIG. 1. As it is rotated, an electrostatic latent image is formed on the peripheral surface of the photosensitive drum 1 by a beam L of laser light emitted by the laser scanner 11. Then, the electrostatic latent image is developed by the development roller 41 into a toner image (developer image).

The photosensitive drum 1 is an image bearing component which bears an image (toner image). The development roller 41 is a developer bearing component which bears the developer (toner) for developing an electrostatic latent image.

The toner image formed on the photosensitive drum 1 is transferred onto the intermediary transfer belt 13 as the intermediary transfer component. In a case where a multicolor image is formed, the electrostatic latent images formed on the photosensitive drums 1, one for one, are developed into yellow, magenta, cyan and black toner images. Then, the toner images are sequentially transferred onto the intermediary transfer belt 13.

Next, the toner images on the intermediary transfer belt 13 are conveyed to the nip between the belt driver roller 14 and secondary transfer roller 18, in which they are transferred onto a sheet S of recording paper sent to the nip. In this embodiment, the toner image on the photosensitive drum 1 is temporarily transferred onto the intermediary transfer belt 13, and then, is transferred from the intermediary transfer belt 13 onto the sheet S of recording paper. However, the present invention is also compatible to an image forming apparatus structured so that the toner image is directly transferred from the photosensitive drum 1 onto the sheet S of recording paper. Such an image forming apparatus is provided with a conveyer belt (sheet conveying component), instead of the intermediary transfer belt 13, which is for conveying the sheet S of recording paper, onto which yellow, magenta, cyan and black toner images are sequentially transferred directly from the photosensitive drums 1 while the sheet S is conveyed by the conveyer belt.

After the transfer of the toner images onto the sheet S of recording paper, the sheet S is sent to the nip between the fixation film 24 and a pressure roller 25, in which they are fixed to the sheet S by the heat and pressure applied to the sheet S and toner images thereon, in the nip. After the fixation of the toner images to the sheet S, the sheet S is discharged by a pair of discharge rollers 26 into a delivery tray 27.

[General Description of Process Cartridge Replacement Method]

Figure 3:
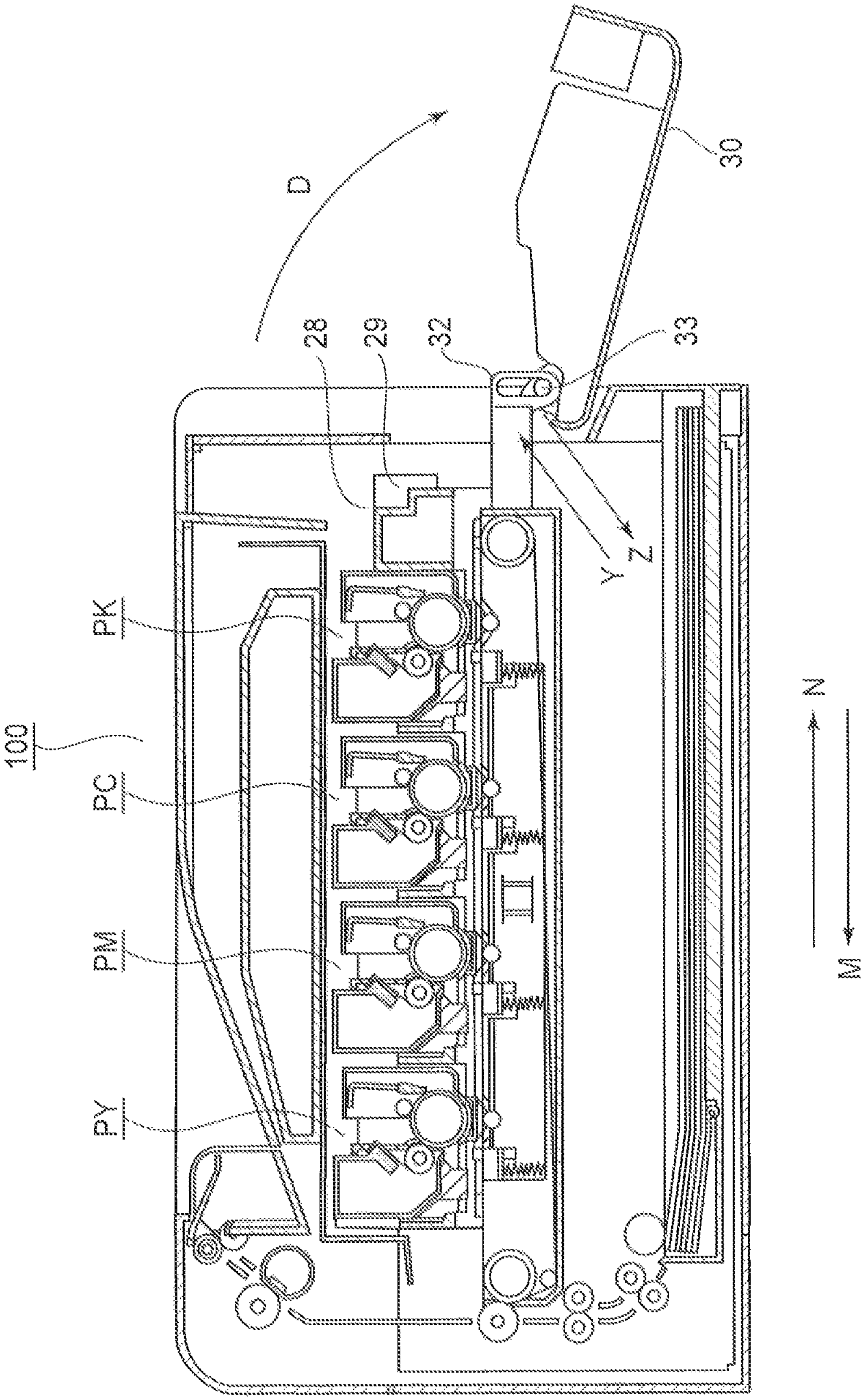
FIG. 3 is a sectional view of the image forming apparatus in the first embodiment.
Figure 4:
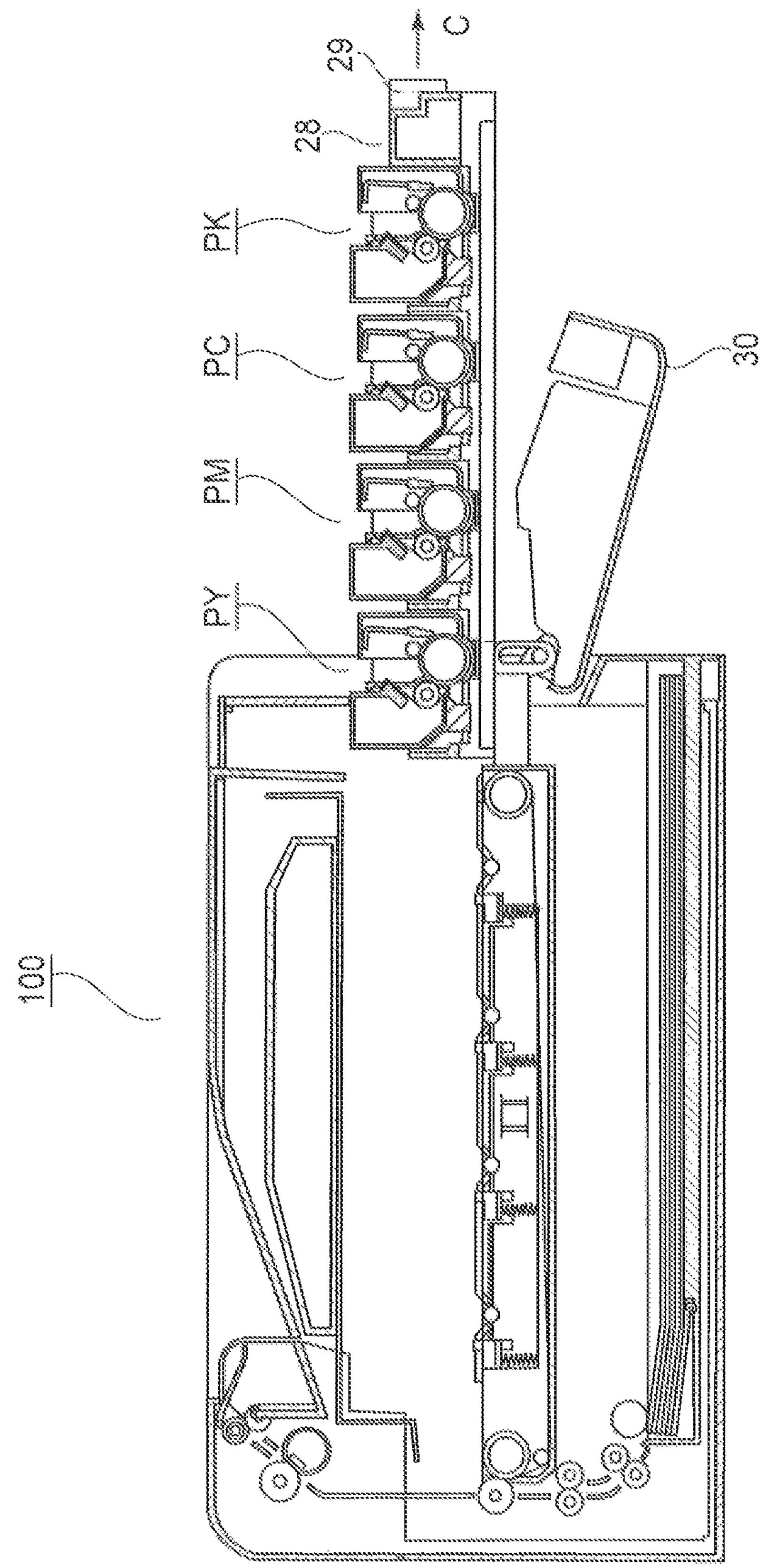
FIG. 4 is a sectional view of the image forming apparatus in the first embodiment.
Figure 5:
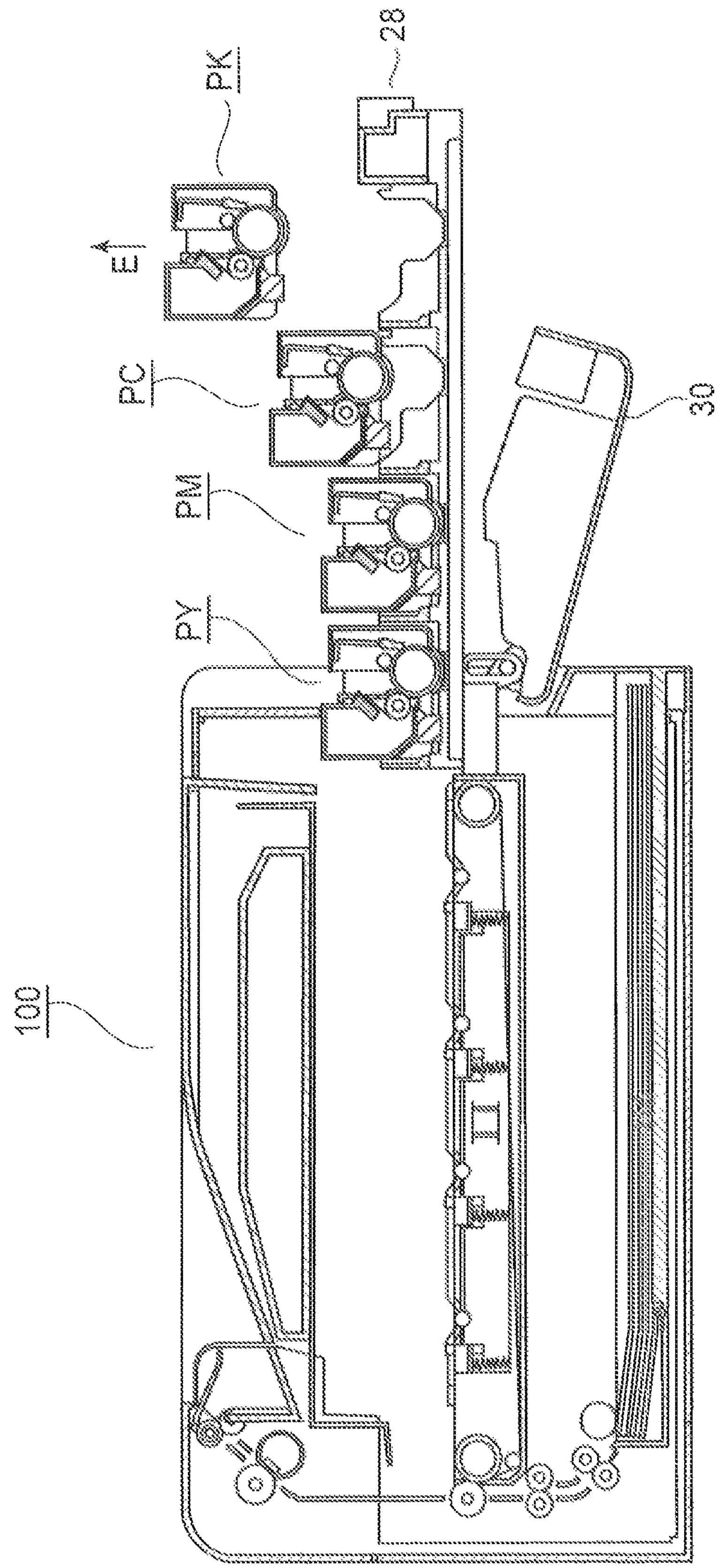
FIG. 5 is a sectional view of the image forming apparatus in the first embodiment.

FIGS. 3-5 are drawings for describing the method for replacing a process cartridge in the main assembly 100, in this embodiment.

Next, the method for replacing a process cartridge P in this laser beam printer is described.

In the following description of the embodiments of the present invention, a component which moves while holding the process cartridges PY, PM, PC and PK is referred to as a cartridge tray 28. The cartridge tray 28 is a component on which the process cartridges PY, PM, PC and PK are mounted. It is disposed in the apparatus main assembly 100 so that it is supported by a cartridge tray supporting component (which hereafter may be referred to simply as tray supporting component) 32, being enabled to be slid in the horizontal direction of FIG. 3 (indicated by arrow mark M or N).

Referring to FIG. 3, the internal space of the apparatus main assembly 100 is the process cartridge space. In order for the process cartridges P to be installed in the apparatus main assembly 100, they have to be mounted in the cartridge tray 28, and then, the cartridge tray 28 has to be moved into the process cartridge space in the apparatus main assembly 100. Further, the apparatus main assembly 100 and process cartridges P are structured so that the process cartridges P are removably installable into the cartridge space in the apparatus main assembly 100. Hereafter, the structure of the apparatus main assembly 100, and the structure of the process cartridge, are described in detail.

The apparatus main assembly 100 is provided with a door 30. FIG. 3 shows the image forming apparatus when the door 30 is wide open. The door 30 is a component which exposes or covers the opening of the apparatus main assembly 100, through which the cartridge tray 28 is moved out, or into, the apparatus main assembly 100. As the door 30 is opened in the direction indicated by an arrow mark D in FIG. 3, it becomes possible for a user to access the handhold 29 of the cartridge tray 28 (which hereafter may be referred to simply as handhold 29).

The door 30 is provided with a connection arm 33, which keeps the door 30 and tray supporting component 32 in connection to each other. That is, the connection arm 33 and tray holding component 32 makeup a means for moving the cartridge tray 28; they are moved by the opening or closing movement of the door 30. That is, as the door 30, which is remaining closed (FIG. 2) is opened, the above described connection arm 33 is pulled by the door 30 rightward in the diagonally upward direction (indicated by arrow mark Y), while upwardly moving the cartridge tray 28 (FIG. 3). Thus, the photosensitive drums 1 are separated from the intermediary transfer belt 13, making it possible for the cartridge tray 28 to be pulled out of the apparatus main assembly 100. Thus, a user can pull the cartridge tray 28 out of the apparatus main assembly 100, by pulling the cartridge tray 28 by the handhold 29.

As the cartridge tray 28 is pulled out of the apparatus main assembly 100, the cartridges P on the cartridge tray 28 are also moved out of the apparatus main assembly 100 while being moved in the direction which is intersectional to the axial line of the photosensitive drum 1.

Next, the mechanism which moves the cartridge tray 28 by being moved by the movement of the opening or closing of the door 30 is described in detail.

FIG. 6 is a perspective view of the image forming apparatus. FIG. 6(*a*) shows the state of the image forming apparatus when the door 30 is remaining completely closed, and FIG. 6, part (b), shows the state of the image forming apparatus when the door 30 is wide open. FIG. 6, part (c), shows the state of the image forming apparatus immediately after the cartridge tray 28 has just been moved out of the apparatus main assembly 100. FIG. 7 is an enlarged view of a combination of the door 30, cartridge tray 28. More specifically, FIG. 7, part (a), shows the state of the combination before the door 30 is opened, and FIG. 7 part (b), shows the state of the combination when the door 30 is fully open.

Referring to FIG. 7, part (a), the connection arm 33 is attached to the door 30, and the boss 33*a* with which the connection arm 33 is provided, is in engagement with a groove 32*b* with which the tray supporting component 32 is provided. Thus, the tray supporting component 32 is moved by the opening or closing movement of the door 30. That is, the tray supporting component 32 is provided with a boss 32*a*, which is fitted in a groove 101*a* with which the lateral plate 101 of the apparatus main assembly 100 is provided. Thus, the door 30, which is remaining fully closed, is opened (FIG. 7, part (a)), the tray supporting component 32 moves in the direction indicated by an arrow mark D1 shown in FIG. 7, part (a), while following the groove 101*a* of the lateral plate 101.

The groove 101*a* of the lateral plate 101 is stair-stepped, and has a single step. Thus, as the tray supporting component 32 is moved, not only does it horizontally move, but also, upward by a distance L1, causing thereby the cartridge tray 28 to move upward by the distance L1. Thus, if the process cartridges P are in the cartridge tray 28, the photosensitive drum 1 in each process cartridge is separated from the intermediary transfer belt 13.

It is when the photosensitive drums 1 (process cartridges P) are not in contact with the intermediary transfer belt 13 that a user is to pull the cartridge tray 28 outward of the apparatus main assembly 100 by the handhold 29 shown in FIG. 6, part (b). As the user pulls the cartridge tray 28, the cartridge tray 28 comes out of the apparatus main assembly 100, and moves to its outermost position, as shown in FIG. 6, part (c).

FIG. 4 is a sectional view of the image forming apparatus immediately after the cartridge tray 28 has just been pulled all the way out of the apparatus main assembly 100 in the direction indicated by an arrow mark C. When the image forming apparatus is in the state shown in FIG. 4, the process cartridges PY, PM, PC and PL are exposed upward, being enabled to be upwardly (indicated by arrow mark E) moved out of the cartridge tray 28, as shown in FIG. 5.

The procedure for installing the process cartridges P into the apparatus main assembly 100 is opposite to the above-described procedure for removing the process cartridges P from the apparatus main assembly 100. That is, first, the cartridge tray 28 is to be pulled out of the apparatus main assembly 100 as far as it can be. Then, the process cartridges P are to be mounted into the cartridge tray 28. Then, the cartridge tray 28 is to be pushed into the apparatus main assembly 100. As the cartridge tray 28 is pushed into the apparatus main assembly 100, it is moved into the cartridge space in the apparatus main assembly 100 while being moved in the direction intersectional to the axial line of each photosensitive drum 1, and therefore, the process cartridges P in the cartridge tray 28 are moved along with the cartridge tray 28 into the process cartridge space in the apparatus main assembly 100.

Then, the door 30 is to be closed after the placement of the cartridge tray 28 in the apparatus main assembly 100. As the door 30 is closed, the cartridge tray 28 is lowered, while being moved leftward (direction indicated by arrow mark Z in FIG. 3) by the movement of the door 30 through the connection arm 33. Thus, the cartridge tray 28 also is moved downward, causing the photosensitive drum 1 in each process cartridge P to be placed in contact with the intermediary transfer belt 13. That is, the closing of the door 30 causes the cartridge tray 28 to be properly positioned for image formation in the apparatus main assembly 100. That is, the photosensitive drum 1 in each process cartridge P is placed in contact with the intermediary transfer belt 13, being readied for image formation (FIG. 2).

In this embodiment, the image forming apparatus is structured so that the movement (opening or closing) of the door 30 switches the image forming apparatus in the state of contact between the photosensitive drum 1 and intermediary transfer belt 13 (movement places the photosensitive drum 1 in contact with the intermediary transfer belt 13, or separates the photosensitive drum 1 from the intermediary transfer belt 13). However, the present invention is also compatible with an image forming apparatus having a belt for conveying a sheet S of recording medium, instead of the intermediary transfer belt 13. In a case where the present invention is applied to an image forming apparatus having a sheet conveyance belt, the apparatus has only to be structured so that the state of contact between the photosensitive drum 1 and sheet conveyance belt is changed by the movement (opening or closing) of the door 30.

FIG. 8 is an external perspective view of one of the process cartridges PY, PM, PC and PK. The process cartridges PY, PM, PC and PK have four electrophotographic image formation systems, one for one, which are the same except for the color of the toner they contain, and the initial amount of the toner therein.

In this embodiment, the direction parallel to the axial line of the photosensitive drum 1 is referred to as the leftward or rightward direction (lengthwise direction). The process cartridge P is in the form of a rectangle box, the lengthwise direction of which is parallel to the leftward and rightward directions of the photosensitive drum 1. The photosensitive drum 1 is rotatably supported by the right and left end walls 46 and 47 of the cleaning unit 5, in terms of the lengthwise direction of the process cartridge P. It is from the right end of the process cartridge P that the process cartridge P is driven. The process cartridge P is provided with a drum coupling 55 (FIG. 9) and a development roller coupling 56, which are for providing the photosensitive drum 1 and development roller 41, respectively, in the process cartridge P, with rotational force. The detailed description of this structural arrangement will be given later. Further, the left end of the process cartridge P is provided with electrical contacts (unshown). Hereafter, the left side of the process cartridge P, which is provided with the drum coupling 55 and development roller coupling 56, to which the cartridge driving force is transmitted from the apparatus main assembly 100 is referred to as the drive side. The left side of the process cartridge P, that is, the opposite side of the process cartridge P from the drive side, is referred to as the non-drive side.

FIG. 10 is a sectional view of the process cartridge P at a plane perpendicular to the axial line of the photosensitive drum 1. The driving force from the apparatus main assembly 100 is transmitted to the drum coupling 55 and development roller coupling 56 (FIG. 9) of the process cartridge P to drive the photosensitive drum 1 and development roller 41. As the driving force is transmitted, the photosensitive drum 1 is rotated in the counterclockwise direction (indicated by arrow mark K in FIG. 10) at a preset speed, whereas the development roller 41 is rotated in the clockwise direction (indicated by arrow mark L in FIG. 10) at a preset speed.

In this embodiment, the process cartridge P is made up of a cleaning unit 5 and a development unit 4, which are connected to each other in such a manner that they are allowed to rotationally move relative to each other. The cleaning unit 5, which may be referred to as the first unit (photosensitive drum unit), holds the photosensitive drum 1. The development unit 4, which may be referred to as the second unit, holds the development roller 41. As shown in FIG. 10, a part of a surface of the cleaning unit 5, which is at a bottom side of the process cartridge, extends away from the photosensitive drum 1 and away from the protrusion that includes the force bearing surface 44*b*. As also shown in FIG. 10, the cleaning unit constitutes a frame that includes a sidewall having an edge, and the protrusion extends in a direction that is parallel to the edge of the sidewall.

The cleaning unit 5 is provided with a charging device 3, which is of the so-called contact type. That is, the charging device 3, which is a component for charging the photosensitive drum 1, is placed in contact with the photosensitive drum 1, and is rotated by the rotation of the photosensitive drum 1. The cleaning unit 5 is also provided with a cleaning blade 51, which is a blade formed of elastic rubber. The cleaning blade 51 is positioned so that its cleaning edge remains in contact with the peripheral surface of the photosensitive drum 1. The cleaning blade 51 plays the role of removing the residual toner on the photosensitive drum 1, that is, the toner remaining on the photosensitive drum 1 after the transfer of a toner image from the photosensitive drum 1. After the removal of the transfer residual toner from the photosensitive drum 1 by the cleaning blade 51, the transfer residual toner is stored in the toner storage 52 in the cleaning unit 5.

The development unit 4 has the development roller 41 as a developing means, and a development blade 42. It has also a development chamber (developer storage changer) 43 which stores toner.

Referring to FIG. 10, the development blade 42 is disposed in the development chamber 43, one of its long edges being in contact with the development roller 41. The development blade 42 plays the role of regulating the toner borne on the peripheral surface of the peripheral surface of the development roller 41; it forms a thin layer of toner, on the peripheral surface of the development roller 41.

FIG. 13 shows some of the structural components of the development unit 4. Referring to FIG. 13, one of the lengthwise ends of the development unit 4 is provided with a bearing 44 which rotatably supports the development roller coupling 56 and development roller 41. The bearing 44 is fixed to the end wall of the development unit 4. To describe in detail, the bearing 44 is provided with the first section (surface of cylindrical hole) 44*p* and the second section (surface of cylindrical hole) 44*q*. The first sections 44*p* is in engagement with the development roller coupling 56, whereas the second section 44*q* is in engagement with the shaft 41*a* of the development roller 41. The peripheral surface 56*g* of the development roller coupling 56 is toothed, being enabled to mesh with the development roller gear 45. That is, the development unit 4 is structured so that as the driving force from the apparatus main assembly 100 is transmitted to the development unit 4, it is transmitted to the development roller 41 through the development roller coupling 56.

The development unit 4 is provided with a development unit cover 57, which is disposed on the outward side of the bearing 41 in terms of the lengthwise direction. That is, the development unit 4 is structured so that the development roller coupling 56 and development roller gear 45 are covered by the development unit cover 57. The cover 57 is provided with a cylindrical section 57*b* having a cylindrical hole 57*d*, through which the development roller coupling 56 is exposed from the development unit 4.

Referring to FIGS. 11 and 12, the development unit 4 and cleaning unit 5 are to be attached to each other in the following manner. First, on the drive side, the cylindrical section 57*b* of the development unit cover 57 is to be rotatably fitted in the support section 46*a* (hole) of the cover 46. On the other end, that is, on the non-drive side, the protrusion 4*b* with which the development unit 4 is provided is to be rotationally fitted in the hole 47*a* f the cover 47. After the completion of the above described steps, the development unit 4 is in connection to the cleaning unit 5 in such a manner that they are rotationally movable relative to each other. Hereafter, the axis about which the development unit 4 can be pivotally moved relative to the cleaning unit 5 will be referred to as a pivot (rotational axis) X. This pivot X is the line which connects the center of the hole 46*a* of the cover 46 on the drive side, and the center of the hole 47*a* of the cover 47, or the cover on the non-drive side.

The process cartridge P is structured so that the development unit 4 is kept pressed by the pressure from a compression spring 53, which is an elastic component, so that the development unit 4 is rotationally moved about the rotational axis X in the direction to cause the development roller 41 to be kept in contact with the photosensitive drum 1. To describe in greater detail, referring to FIG. 10, the development unit 4 is under the pressure generated in the direction indicated by an arrow mark in FIG. 50, by the resiliency of the compression spring 53. That is, the development unit 4 is under the moment which acts in the direction to press the development unit 4 in the direction indicated by an arrow mark J1. Thus, the development roller 41 is kept pressed upon the peripheral surface of the photosensitive drum 1 in such a manner that a preset amount of contact pressure is maintained between the peripheral surface of the development roller 41 and that of the photosensitive drum 1. Hereafter, the position of the development unit 4 relative to the cleaning unit 5 when the preset amount of contact pressure is maintained between the development roller 41 and photosensitive drum 1 will be referred to as the contact position of the development unit 4.

Referring again to FIG. 13, the development unit 4 is provided with the aforementioned bearing 44, which is located at the drive side end of the development unit 4 in terms of the direction (lengthwise direction) parallel to the axial line of the development roller 41. The bearing 44 is provided with a protrusion 44*d*, which protrudes in the opposite direction from the development roller 41, in the direction perpendicular to the axial line of the development roller 41. The protrusion 44*d* is provided with a force bearing surface 44*b*, with which a development roller disengagement mechanism 60 of the apparatus main assembly 100, comes into contact. It bears the force from the mechanism 60. The separation between the development roller 41 and photosensitive drum 1 is caused as the force bearing surface 44*b* catches the force from the development roller disengagement mechanism 60. The structures of the protrusion 44*d*, force bearing surface 44*b*, and development roller disengagement mechanism 60 will be described later in detail.

[Development Roller Disengagement Mechanism of Main Assembly of Image Forming Apparatus]

Next, referring to FIGS. 9, 14 and 15, the development roller disengagement mechanism 60, which is for disengaging (separating) the development roller 41 of the development unit 4 from the photosensitive drum 1 is described. FIG. 9 is a perspective view of the combination of the process cartridges P and development roller disengagement mechanism 60. It shows the relationship between the cartridges P and mechanism 60. FIG. 14 is an enlarged view of a part of the development roller disengagement mechanism 60 (which may be referred to simply as disengagement mechanism 60, or mechanism 60). More specifically, FIG. 14, part (a), shows the lengthwise end portion of the development roller disengagement mechanism 60 after the attachment of a spacing member 61 of the mechanism 60 to the moving member 62 of the spacing member 61, and FIG. 14, part (b), shows the spacing member 61 alone. FIG. 14, part (c), shows the moving member 62 alone.

As described above, the development unit 4 is under the pressure generated by the compression spring 53 with which the process cartridge P is provided. Thus, it is in its contact position, in which it keeps the development roller 41 in contact with the photosensitive drum 1. However, if the development roller 41 remains in contact with the photosensitive drum 1 for a substantial length of time, it is possible for the development roller 41 to be indented by the photosensitive drum 1. Therefore, it is desired that unless the image forming apparatus is being actually used for image formation, the development roller 41 is kept separated from the photosensitive drum 1. In this embodiment, therefore, the apparatus main assembly 100 is provided with the development roller disengagement mechanism 60 which disengages (separates) the development roller 41, and keeps disengaged (separated) the development roller 41, from the photosensitive drum 1.

Referring to FIGS. 9 and 14, the development roller disengagement mechanism 60 has the spacing member 61, and the moving member 62 for the spacing member 61. The moving member 62 is movable in the apparatus main assembly 100, and movably supports the spacing member 61.

The spacing member 61 (which hereafter may be referred to simply as spacing member 61) is in the form of a letter L. It is a component which engages with the process cartridge P. That is, the spacing member 61 presses on the force bearing surface 44*b* of the process cartridge P by engaging (coming into contact) with the force bearing surface 44*b*.

The spacing member 61 is allowed to move relative to its moving member 62 in the vertical direction (direction indicated by arrow marks H1, or direction indicated by arrow mark H2) of the apparatus main assembly 100. That is, referring to FIG. 14, the spacing member 61 is allowed to slide in the direction indicated by the arrow marks H1 or H2, by being supported by the supporting section (guiding section) 62*a* of the moving member 62. More concretely, the shaft section 62*p* of the moving member 62 is fitted in the hole 61*p* of the spacing member 61. Further, the holder engaging section 61*q* of the spacing member 61 is fitted in the hole 62*q* of the moving member 62. That is, the engagement of the holder engaging section 61*q* of the spacing member 61 into the hole 62*b*, as a pressing member regulating section, of the moving member 62 prevents the spacing member 61 from disengaging from the moving member 62.

Next, referring to FIG. 15, the spacing member 61 is kept pressed by a spring 63, which is an elastic component attached to the moving member 62, toward the position (which hereafter will be referred to as normal position) in which the spacing member 61 engages with the force bearing surface 44*b*. That is, the spring 63 functions as a component for keeping the spacing member 61 pressed toward the normal position for the spacing member 61.

The moving member 62 is on the underside of the process cartridges P (PY, PM, PC and PK). It is attached to the apparatus main assembly 100, being enabled to move relative to the apparatus main assembly 100. More specifically, the moving member 62 is provided with a circular cam 64, which is eccentrically attached to its shaft 65. As the shaft 65 of the cam 64 receives driving force from a driving force source (unshown) with which the apparatus main assembly 100 is provided, the cam 64 is rotated about the axial line of the shaft 65, causing thereby the moving member 62 to move in the roughly horizontal direction (leftward and rightward directions, indicated by arrow mark M and N, respectively).

The rotation of the cam 64 causes the moving member 62 to move between the position (which hereafter will be referred to as no-image-formation position), in which the moving member 62 keeps the development roller 41 separated from the photosensitive drum 1, and the position (which hereafter will be referred to as image formation position) in which the moving member 62 allows the development roller 41 to remain in contact with the photosensitive drum 1. One of the characteristic features of this embodiment is that as the process cartridges P are moved into the apparatus main assembly 100, the spacing member 61 supported by the moving member 62 is pressed by the corresponding process cartridge P, being thereby made to retract, as will be described later.

Next, the movements of the spacing member 61 which occur as the process cartridges P are installed into the apparatus main assembly 100, and the action of the development roller disengagement mechanism 60 which occur as the disengagement mechanism 60 separates the development roller 41 from the photosensitive drum 1, are described in detail in the order of their occurrence.

FIG. 16 is a sectional view of the process cartridges P and development roller disengagement mechanism 60 when the cartridge tray 28 which is holding the process cartridges P is pushed into the apparatus main assembly 100. As described above, when the door 30 is wide open, the cartridge tray 28 is in its uppermost position; it has moved upward (direction indicated by arrow mark H2) (up-and-rightward indicated by arrow mark Y in FIG. 3), leaving a gap d between the spacing member 61 and the protrusion 44*d* of the bearing 44. Thus, while the process cartridges P and development roller disengagement mechanism 60 are in the state described above, the movement of the cartridge tray 28 and process cartridges P in the horizontal direction (indicated by arrow mark M or N) does not cause the spacing member 61 and bearing 44 to interfere with each other.

The door 30 is to be closed after the insertion of the cartridge tray 28 and process cartridge P thereon into the apparatus main assembly 100. As the door 30 is closed, the process cartridges P are moved left-and-downward (indicated by arrow mark Z) by the closing movement of the door 30, causing the photosensitive drums 1 to come into contact with the intermediary transfer belt 13 (FIGS. 2 and 3) as described above, for the reason which will be given later. Further, the moving member 62 is in its no-image-formation position shown in FIGS. 9, part (a), and 15, part (a), and therefore, the development roller pressing members 61 supported by the moving member 62 are in their position in which they interfere with the process cartridges P, one for one.

However, the spacing member 61 is provided with the spring 63. Thus, the spacing member 61 interferes with the process cartridge P, being thereby pressed by the pressing surface 44*c* of the process cartridge P. Consequently, the spring 63 is compressed, allowing thereby the spacing member 61 to move in the direction which is roughly in parallel to the direction (indicated by arrow mark H) in which process cartridge P is being moved. That is, as the spacing member 61 is pressed by the pressing surface 44*c*, it retracts from its normal position (moves into retreat), allowing thereby the process cartridge P to pass by the spacing member 61, and be disposed in the preset position in the apparatus main assembly 100. The pressing surface 44*c* is a part of the end surface of the protrusion 44*d* of the development unit 4.

Next, the force bearing surface 44*b* of the protrusion 44*d* is to be engaged with the spacing member 61. Thus, the moving member 62 is moved rightward (indicated by arrow mark N in FIG. 15, part (a)) to the position (image formation position) in which the spacing member 61 does not interfere with the protrusion 44*d*. Next, referring to FIGS. 9, part (b), and 15, part (b), as the spacing member 61 is moved into the image formation position in which it does not interfere with the protrusion 44*d*, the spring 63 is allowed to extend. Thus, the spacing member 61 moves upward (indicated by arrow mark H2) to the position (normal position) in which the spacing member 61 can engage with the force bearing surface 44*b*.

Next, as the moving member 62 moves leftward (indicated by arrow mark M in FIG. 15, part (b)), the spacing member 61 engages with the force bearing surface 44*b* with which the protrusion 44*d* is provided. Then, as the moving member 62 is moved further leftward (indicated by arrow mark M), and returns to the no-image-formation position, the moving member 62 presses on the force bearing surface 44*b* through the spacing member 61. Thus, the moving member 62 moves the development unit 4 into the separation position in which a gap e is provided between the development roller 41 and photosensitive drum 1 as shown in FIGS. 9 part (c), and 15, part (c).

Referring to FIG. 14, the direction in which the spacing member 61 is moved relative to the moving member 62 is controlled by the guiding section 62*a*, which allows the spacing member 61 to move (slide) only in the direction indicated by the arrow mark H1, or H2. The moving direction (indicated by arrow mark H1 or H2) of the spacing member 61 is intersectional to the moving direction (indicated by arrow mark M or N) of the moving member 62. Therefore, even if the spacing member 61 is pressed by the force bearing surface 44*b* in the direction indicated by the arrow mark M or N while it is moved, it can remain engaged with the force bearing surface 44*b*, because it is supported by the guiding section 62*a*. Thus, it is ensured that the moving member 62 can move the development unit 4 into the separation position in which the development roller 41 is kept separated from the photosensitive drum 1. In particular, in this embodiment, the moving direction (indicated by arrow mark H1 or H2) of the spacing member 61 is made roughly intersectional to the moving direction of the moving member 62 (indicated by arrow mark M or N).

As the image forming apparatus is started up for image formation, the moving member 62 is moved into its image formation position shown in FIG. 15, part (b). Thus, the development unit 4 is moved form its separation position to the contact position by the force of the compression spring (FIG. 8), causing thereby the development roller 41 to be placed in contact with the photosensitive drum 1 (FIG. 15, part (b)). It is when the process cartridge P is in this condition (shown in FIG. 15, part (b), that the development roller 41 develops the electrostatic latent image formed on the photosensitive drum 1 with the use of developer.

As an image forming operation is ended, the moving member 62 is moved to its no-image-formation position, in which it keeps the development roller 41 separated from the photosensitive drum 1 (FIG. 15, part (c)) until the starting of the next image forming operation. Therefore, it is possible to prevent the development roller 41 from being deformed by the contact pressure between the development roller 41 and photosensitive drum 1.

[Three Positions of Spacing Member]

To summarize the detailed description of the first embodiment of the present invention given above, the spacing member 61 is placeable in three different positions (it is enabled to be in three different states).

(1) Shown in FIG. 15, part (c), is the state of the combination of the process cartridges P, spacing member 61, moving member 62, etc., in which the spacing member 61 is in its first position (in which it keeps development roller 41 separated from photosensitive drum 1). As the process cartridges P are installed into the apparatus main assembly 100, the spacing member 61 is moved into the first position, engaging thereby with the force bearing surface 44*b*. Thus, the spacing member 61 acts on the development unit 4 (presses on development unit 4), moving thereby the development unit 4 into the separation position, in which it keeps the development roller 41 separated from the photosensitive drum 1.

(2) Shown in FIG. 15, part (b), is the state of the combination of the process cartridges P, spacing member 61, moving member 62, etc., in which the spacing member 61 is in its second position (in which it does not acts on development unit 4). When the spacing member 61 is in its second position after the installation of the cartridges P into the apparatus main assembly 100, the spacing member 61 allows the development roller 41 to be in contact with the photosensitive drum 1. That is, when the spacing member 61 is in its second position, it does not press on the force bearing surface 44*b*, or is so much smaller in the amount of force it applies to the force bearing surface 44*b* that it does not affects the development unit 4. Thus, the development unit 4 is rotationally moved by the compression spring 53 (FIG. 10), causing the development roller 41 to move toward the photosensitive drum 1 and contact the photosensitive drum 1. That is, the development unit 4 is moved into the contact position.

(3) Shown in FIG. 15(*a*) is the state of the combination of the process cartridges P, spacing member 61, moving member 62, etc., in which the spacing member 61 is in the third position (into which it is retracted). As the process cartridges P are installed into the apparatus main assembly 100, each process cartridge P descents and collides with the corresponding spacing member 61. Thus, the spacing member 61 is pressed by the process cartridge P into its third position (retreat). That is, the spacing member 61 allows the process cartridge P to be installed all the way into the apparatus main assembly 100 by moving into the third position (retreat).

When the spacing member 61 is in the first position or second position, it is in the normal position (it has not retreated) relative to its moving member 62.

That is, that the spacing member 61 is in the first position (action position) means that the spacing member 61 is its normal position in terms of its positional relationship relative to the moving member 62, and also, that the moving member 62 is in its no-image-formation position. As the spacing member 61 is moved into the first position, it engages with the development unit 4 (acting on development unit 4), and presses on the development unit 4, moving thereby the development unit 4 into the separation position. Thus, the development roller 41 is separated from the photosensitive drum 1.

On the other hand, that the spacing member 61 is in its second position (inaction position) means that it is in its normal position in terms of its positional relationship relative to the moving member 62, and also, that the moving member 62 is in its image formation position. As the moving member 62 is moved away from the development unit 4, or reduced in the amount of force it applies to the development unit 4, it does not acts on the development unit 4. Therefore, the development unit 4 moves into the contact position, causing thereby the development roller 41 to come into contact with the photosensitive drum 1.

In comparison, when the spacing member 61 is in its retreat, it has retreated from the normal position, and the moving member 62 is in the no-image-formation position, and therefore, the development unit 4 is in the contact position.

Table 1 is the summary of the foregoing description of the three different positions of the spacing member 61, and those of the moving member 62.

TABLE 1

| | Positions of the spacing member | | |
|---|---|---|---|
| | Acting position | Non-acting position | Retracted position |
| Positions of the moving membe | Non-image-froming position | Image-forming-position | Non-image-forming-position |
| Positions of the spacing member reltive to the moving member | Noamal position | Normal position | Retracted position |
| Positions of the developing unit | Spaced position | Contact position | Contact position |
| FIGS. | (c) of FIG. 15 | (b) of FIG. 15 | (a) of FIG. 15 |

The image forming apparatus in this embodiment is structured so that as soon as an image forming operation is ended, the moving member 62 is moved into the no-image-formation position, in which it keeps the development roller 41 separated from the photosensitive drum 1. Therefore, the moving member 62 is in the no-image-formation position even when the process cartridge P is installed into the apparatus main assembly 100. While the process cartridge P is installed into the apparatus main assembly 100, the development unit 4 is kept by the resiliency of the compression spring 53, in the position in which it keeps the development roller 41 in contact with the photosensitive drum 1. Thus, as the process cartridge P is moved into the apparatus main assembly 100, the protrusion 44*d* of the development unit 4 comes into contact with the spacing member 61 (FIG. 15, part (a)). However, as the spacing member 61 is pressed by the pressing surface 44*c* with which the protrusion 44*d* is provided, it is allowed to move from its normal position (action position: FIG. 16) into the third position (retreat: FIG. 15, part (a)). Therefore, the spacing member 61 does not interfere with the movement of the process cartridge P. That is, it is ensured that the process cartridges P are properly installed into the apparatus main assembly 100.

On the other hand, as the process cartridges P are moved out of the apparatus main assembly 100 while the spacing member 61 is in the third position (retreat: FIG. 15, part (a)), the spacing member 61 is moved back into the normal position (action position: FIG. 16) by the resiliency of the spring 63. That is, the opening of the door 30 (FIG. 30) causes the process cartridges P to move upward in the direction indicated by the arrow mark H2, allowing thereby the spacing member 61 to be moved by the spring 63 in the direction indicated by the arrow mark H2.

To summarize the foregoing description of this embodiment, the image forming apparatus in this embodiment is structured so that the spacing member 61 which engages with the force bearing surface 44*b* of the process cartridge P is movably supported by the moving member 62, and also, that the spacing member 61 is pushed away into the third position (retreat). Thus, not only is the image forming apparatus in this embodiment simpler in its mechanism for causing the spacing member 61 to retract, but also, in the structure of its development roller disengagement mechanism 60, structure of the apparatus main assembly 100, and structure of the process cartridge P. Further, the spacing member 61 has to be made to retract only by a distance large enough to allow the process cartridges P to move with no interference from the spacing member 61. In other words, the space necessary to allow the spacing member 61 to retract does not need to be large. Thus, it is possible to reduce the apparatus main assembly 100 in size.

As the development roller moving member 62 is made to shuttle between its no-image-formation position and image formation position, it moves the spacing member 61 which is in its third position (retreat: FIG. 15, part (a)), to the first position (action position: 15, part (c)) by way of the second position (inaction position: 15, part (b)). That is, it can separate the development roller 41 from the photosensitive drum 1 by causing the spacing member 61 to engage with the development unit 4. Thus, it is possible to prevent the development roller 41 from being deformed by the photosensitive drum 1. Further, it is possible to prevent the toner on the development roller 41 from adhering to the photosensitive drum 1 while no image is formed.

Further, the development roller 41 and photosensitive drum 1 do not rub each other when no image is formed. Therefore, the photosensitive drum 1, development roller 41, and/or the toner on the development roller 41 are less likely to deteriorate. Therefore, the process cartridge P in this embodiment is longer in service life.

Incidentally, in the case of the development roller disengagement mechanism 60, the four spacing members 61 are attached to the same moving member 62 in such a manner that they correspond in position to the four process cartridges P in terms of the horizontal direction (indicated by arrow mark M or N in FIG. 15). Thus, moving the single moving member 62 can simultaneously separate four development roller 41 from the four photosensitive drums 1, one for one.

However, this embodiment is not intended to limit the present invention in terms of the structure of the development roller disengagement mechanism 60. For example, the present invention is also compatible with an image forming apparatus, the apparatus main assembly 100 of which is provided with a development roller disengagement mechanism 60 (spacing member 61 and moving member 62) dedicated to the process cartridge PK, that is, the cartridge for forming a black toner image, and a development roller disengagement mechanism 60 (spacing member 61 and moving member 62) for dealing with the process cartridge PY, PM and PC, that is, the process cartridges other than the process cartridge PK. In a case where such an image forming apparatus is used to form a black-and-white image, it is possible to separate the development roller 41 from the photosensitive drum 1 only in the process cartridges (PY, PM and PC), that is, the cartridges P other than the process cartridge (PK). Such a structural arrangement will be described in the description of the sixth embodiment of the present invention.

Further, the image forming apparatus in this embodiment is a color image forming apparatus. It employs multiple (four) process cartridges, and is provided with the same number of spacing member 61 as the number of the process cartridges P it employs. However, this embodiment is not intended to limit the present invention in terms of the number of the process cartridges and that of the spacing member 61. That is, the present invention is also applicable to a monochromatic image forming apparatus which employs only one process cartridge; the above described development roller disengagement mechanism 60 can be employed by a monochromatic image forming apparatus (in such a case, number of spacing member 61 is only one).

Embodiment 2

This embodiment is a modification of the first embodiment in terms of the spacing member (engaging component) with which the development roller disengagement mechanism is provided. More specifically, the image forming apparatus in this embodiment is structured so that the spacing member 71 retracts by rotationally moving relative to the moving member 72. In the following description of this embodiment, description is centered around the sections of the image forming apparatus, which are different in structural arrangement from the counterparts of the image forming apparatus in the first embodiment; the portions of the image forming apparatus in this embodiment, which are similar to the counterparts of the image forming apparatus in the first embodiment are not described.

Referring to FIG. 17, the spacing member 71 is supported by the spacing member holder 72 so that it can be rotationally moved about the pressing member support shaft (pivot) 74 with which the moving member 72 is provided. Further, the spacing member 71 is kept under the pressure from the spring 73, being positioned so that it can engage with the force bearing surface 44*b*. Also in this embodiment, the spacing member 71 is enabled to take three different positions (action position, inaction position, and retreat).

FIG. 7, part (a), shows the state of a combination of the process cartridges P (PY, PM, PC and PK) when the process cartridges P are in their image formation positions in the apparatus main assembly. In this state, the spacing member holder 72 is in the no-image-formation position, and the spacing member 71 supported by the moving member 72 is in the position in which it interferes with the process cartridge P. Thus, as the process cartridge P is moved into the apparatus main assembly 100, the spacing member 71 interferes with the protrusion 44*d* of the process cartridge P, being thereby pressed downward (indicated by arrow mark H1). Thus, the spacing member 71 pivots in the counterclockwise direction (indicated by arrow mark V1 in FIG. 17, part (a)) about the pressing member support shaft 74, to the position in which it ensures that the process cartridge P is allowed to be inserted all the way into the apparatus main assembly 100. That is, the spacing member 71 is moved into its retreat.

In order for the spacing member 71 which is in the position shown in FIG. 17 part (a), to engage with the force bearing surface 44*b*, the spacing member holder 72 has to be moved rightward (indicated by arrow mark N) to the position (image formation position) in which it prevents the spacing member 71 from interferes with the protrusion 44*d*. Referring to FIG. 17, part (b), as the spacing member 71 is moved to the position in which it does not interferes with the protrusion 44*d*, it is rotationally moved clockwise (indicated by arrow mark V2) about the support shaft 74 by the force of the spring 73, to the normal position (inaction position) in which it can engage with the force bearing surface 44*b*.

Then, as the moving member 72 is moved leftward (indicated by arrow mark M) from its image formation position shown in FIG. 17, part (b), the spacing member 71 engages with the force bearing surface 44*b*. Then, the moving member 72 is moved further leftward (indicated by arrow mark M) while being in engagement with the force bearing surface 44*b*. As the spacing member 71 is moved, it moves the development unit 4 to the position (separation position) which provides the gap e between the development roller 41 and photosensitive drum 1. Thereafter, the spacing member 71 keeps the development roller 41 separated from the photosensitive drum 1 from the time of the completion of an image forming operation to the starting of the next image forming operation (FIGS. 17, part (c)). FIG. 17, part (c) shows the state of the combination of the spacing member 71, moving member 72, process cartridges P, etc., after the movement of the spacing member 71 into its action position.

Next, referring to FIG. 18, the moving member 72 has a rotation control section 72*b* which stops (controls) the rotational movement f the spacing member 71, and keeps the spacing member 71 in the normal position (action position). Thus, as the moving member 72 is moved leftward (indicated by arrow mark M in FIG. 17, part (b)), the spacing member 71 moves with the moving member 72 while remaining in engagement with the force bearing surface 44*b*. Thus, the force bearing surface 44*b* is pressed by the spacing member 71, causing the development unit 4 into the separation position. That is, the spacing member 71 moves the development unit 4 into the separation position, and keeps it in the separation position.

To summarize the forgoing description of the second embodiment, as the spacing member holder 72 is made to shuttle between the image formation position and no-image-formation position, the spacing member 71 is made to engage with the force bearing surface 44*b*, and the development unit 4 is moved into the separation position (FIG. 17, part (c)).

In this embodiment, the spacing member 71 is rotatably attached to the moving member 72. Therefore, there is virtually no play between the spacing member 71 and moving member 72. Therefore, this embodiment is stabler in terms of the movement of the spacing member than the first embodiment in which the movement of the spacing member is linear (FIG. 15). To describe in greater detail, in a case where the developer unit pressing member is linearly moved like the spacing member 61 in the first embodiment, the spacing member 61 is attached to its moving member 62 in such a manner that the guide section 62*a* of the moving member 62 fits into the hole 61*p* with which the spacing member 61 is provided (FIG. 14). Thus, if the dimension of the hole 61*p* of the spacing member 61 does not perfectly match the dimension of the guide section 62*a* (62*p*), there is a certain amount of play between the spacing member 61 and its moving member 62. If this play is substantial, the spacing member 61 may tilt relative to the section 62*p* of the guide section 62*a*. If the spacing member 61 tilts relative to the section 62*p*, it is possible that the movement of the spacing member 61 relative to its moving member 62 in terms of the direction indicated by the arrow mark H1 or H2 will become unstable. In this embodiment, however, the spacing member 71 is rotatably attached to its holder 72. Therefore, the spacing member 71 is stabler in movement than the spacing member 61 in the first embodiment.

On the other hand, the first embodiment, in which the spacing member 61 (FIG. 14) is linearly moved, is smaller in the amount of the space necessary for the movement of the pressing member than the second embodiment in which the spacing member 71 is rotationally moved. Therefore, the development roller disengagement mechanism in the first embodiment can be smaller than that in the second embodiment. Therefore, the image forming apparatus in the first embodiment can be smaller in size than that in the second embodiment. The instability in the movement of the spacing member relative to the guide, such as the above described instability of the spacing member 61 relative to the guide 62*a* in the first embodiment, can be controlled by strictly controlling in dimension the spacing member, moving member, etc.

In other words, the mechanism for moving the development roller disengaging components (61, 71) should be selected according to the functions of which the image forming apparatus 100 and its development roller disengagement mechanism (60, 70) are required.

Embodiment 3

This embodiment is a modification of the first embodiment in terms of the spacing member (61), protrusion (44*d*), and force bearing surface (44*b*) of the development roller disengagement mechanism 60. The description of this embodiment will centered around the structural arrangement of the image forming apparatus in this embodiment, which is different from that in the first embodiment; the structural components and their function, which are same as the counterparts in the first embodiment will not be described.

Referring to FIG. 20, in this embodiment, the protrusion 44*d* is provided with a sub-protrusion and a recess 44*g*, which are for ensuring that the spacing member 61 engages with the force bearing surface 44*b*. The force bearing surface 44*b* is a part of the recess 44*g* of the protrusion 44*d*. The force bearing surface 44*b* and the protrusion contacting surface 61*b* of the spacing member 61 are tilted at a preset angle to ensure that the spacing member 61 engages with the protrusion 44*d*. The detailed description of this setup will be given later.

Before the starting of the description of the functions of the abovementioned components and the parts thereof, the force bearing surface 44*b* of the protrusion 44*d*, and spacing member 61, in this embodiment, are described in detail about their shape and positioning. Referring to FIG. 21, when the development roller 41 is in contact with the photosensitive drum 1, the force bearing surface 44*b* of the protrusion 44*d* is tilted by an angle θ1 relative to the direction perpendicular to the direction (indicated by arrow mark M or N) of the movement of the moving member 62.

Show in FIG. 22 is the state of the process cartridge P after the development unit 4 of the process cartridge P, which was in the state shown in FIG. 21, was rotationally moved clockwise (indicated by arrow mark J2) about the axial line (pivot) X by an angle of θ0, which is the angle by which the development unit 4 is rotatable. In FIG. 22, there is a gap e between the development roller 41 and photosensitive drum 1. The force bearing surface 44*b* of the protrusion 44*d* is tilted by angle of θ2 relative to the direction perpendicular to the direction (indicated by arrow mark M or N) of the movement of the moving member 62.

There is the following relationship among the angles θ0, θ1, and θ2:

$\theta 1 = \theta 0 + \theta 2$.

The protrusion 44*d* extends downward (indicated by arrow mark H1). That is, the protrusion 44*d* extends in the direction intersectional to the axial line 41*x* of the development roller 41, and also, in the opposite direction from the rotational axis 41*x* of the development roller 41. Further, as the process cartridge P is seen from the direction parallel to the axial line 41*x* of the development roller 41 (at plane perpendicular the axial line 41*x* of development roller 41), the force bearing surface 44*b* of the protrusion 44*d* faces toward the center (axial line 41*x*) of the development roller 41. In other words, referring to FIG. 21 (which is sectional view of process cartridge P at plane perpendicular to axial line 41*x* of development roller 41), the force bearing surface 44*b* of the protrusion 44*d* is on the opposite side of the straight line, which coincides with the force bearing surface of the protrusion 44*d*, from the axial line 41*x* of the development roller 41.

This does not mean that the process cartridge P has to be structured so that the force bearing surface 44*b* squarely faces the development roller 41. That is, the process cartridge P may be structured so that the force bearing surface 44*b* is offset outward from the axial line 41*x* of the development roller 41 as shown in FIG. 13. That is, this means that as the force bearing surface 44*b* is seen from the direction parallel to the axial line 41*x* of the development roller 41 (as force bearing surface 44*b* is seen at plane perpendicular to axial line 41*x*), it is on the side where the development roller 41 is present.

Neither does this mean that the force bearing surface of the protrusion 44*d* has to be flat. That is, as long as at least the force bearing area (surface) of the protrusion 44*d*, which comes into contact with the spacing member 61 faces toward the development roller 41, the force bearing surface 44*b* of the protrusion 44*d* may be in the different shape from the shape in which the surface 44*b* is in this embodiment. For example, it may be curved.

To describe in greater detail, referring to FIG. 21, the straight line Q, which extends from the force bearing surface 44*b* of the protrusion 44*d*, in parallel to the force bearing surface 44*b*, does not coincide with the axial line 41*x* of the development roller 41. Further, the axial line 41*x* of the development roller 41 is on the same side of the straight line Q (side indicated by arrow mark R in FIG. 21).

Further, the force bearing surface 44*b* of the protrusion 44*d* faces toward the rotational axis (pivot) X of the development unit 4. To describe in greater detail, referring to FIG. 21, the straight line Q does not coincide with the rotational axis (pivot) X of the development unit 4. Further, the rotational axis (pivot) X of the development unit 4 is on the opposite side of the straight line Q from the force bearing surface 44*b* of the protrusion 44*d* (arrow mark R side of straight line Q in FIG. 21). Further, the force bearing surface 44*b* is on the opposite side of the tangential line Q, from the photosensitive drum 1.

Further, the protrusion 44*d* has a sub-protrusion 44*a* which extends in a manner to cover the rotational axis (pivot) X and development roller 41. This sub-protrusion 44*a* extends toward the cleaning unit 5 and photosensitive drum 1, creating thereby the recess 44*g*, which recesses in the opposite direction from the cleaning unit 5 and photosensitive drum 1. This recess 44*g* is a space between the force bearing surface 44*b* and development roller 41 (development roller side of development unit contacting surface 44*b* (force bearing surface)). As the leading edge of the spacing member 61 enters this space (recess 44*g*), it becomes possible for the pressing member 6 to engage with the force bearing surface 44*b*.

Further, referring to FIG. 24, the development unit contacting surface 61*b* of the spacing member 61 is tilted by an angle θ3 relative to the direction perpendicular to the direction (indicated by arrow mark M or N) of the movement of the moving member 62.

Shown in FIG. 23 is the state in which the force bearing surface 44*b* and development roller 41 are when the development roller 41 is in contact with the photosensitive drum 1. Shown in FIG. 20 is the relationship between the force bearing surface 44*b* and development roller 4 after the development roller 41 was separated from the photosensitive drum 1.

Referring to FIG. 20, in this embodiment, as the moving member 62 is moved in the direction indicated by the arrow mark M, the development unit contacting surface 61*b* of the spacing member 61 receives a force F1 from the force bearing surface 44*b*. This force F1 is perpendicular to the development unit contacting surface 61*b*. However, the surface 61*b* is tilted by the angle θ3 relative to the direction perpendicular to the direction (indicated by arrow mark M or N) of the movement of the moving member 62. Therefore, the force F1 has a component F1*x* which is parallel to the direction of the movement of the moving member 62, and a component F1*y* which is perpendicular to the direction (indicated by arrow mark M or N) of the movement of the moving member 62. The component F1*y* is directed upward (indicated by arrow mark H2 in FIG. 20). In other words, the component F1*y* functions as such a force that acts in the direction (indicated by arrow mark N2) to move the spacing member 61 from its retreat (FIG. 15, part (a)) to the normal position (action position: FIG. 15, part (c)). Further, the force bearing surface 44*b* is subjected to the reaction force F1*y*' (indicated by arrow mark H1), which is a reaction force attributable to the component F1*y*, by the development unit contacting surface 61*b* of the spacing member 61.

That is, in this embodiment, the component F1*y* which acts in the direction to move the spacing member 61 from its retreat to the normal position (action position) (upward: direction indicated by arrow mark H2) is generated by the force F1 which the developer unit contacting surface 61*b* of the spacing member 61 receives from the force bearing surface 44*b* of the protrusion 44*d*. That is, the development unit contacting surface 61*b* of the spacing member 61 is tilted by the angle θ3 so that the force F1 which the spacing member 61 receives from the force bearing surface 44*b* generates the component F1*y*.

Further, in order to ensure that the development unit contacting surface 61*b* of the spacing member 61 comes into contact with the force bearing surface 44*b* of the development unit 4, the force bearing surface 44*b* is tilted in the same direction as the surface 61*b*. That is, the surface 61*b* and surface 44*b* are tilted relative to the direction of the movement of the moving member 62 in such a manner that their upstream side in terms of the direction indicated by the arrow mark H1, and also, the direction indicated by the arrow mark N, is higher in position than the downstream side.

The direction indicated by the arrow mark H1 is the direction in which the spacing member 61 is moved from the action position (FIGS. 15, part (c), and 16) to the retreat (FIG. 15, part (a)). That is, the direction indicated by the arrow mark H1 is the direction in which the spacing member 61 retracts. Further, the direction indicated by the arrow mark N is the direction in which the spacing member 61 is moved from the action position (FIG. 15, part (c)) to the inaction position (FIG. 15, part (b)). That is, the direction indicated by the arrow mark M is the direction in which the spacing member 61 is moved to allow the development roller 41 to be placed in contact with the photosensitive drum 1.

The development unit contacting surface 61*b* of the spacing member 61, and the pressing member contacting surface of the force bearing surface 44*b* are tilted as described above. Therefore, as the spacing member 61 engages (comes into contact) with the force bearing surface 44*b*, force is generated at their interface in the direction to cause the spacing member 61 and force bearing surface 44*b* to be pulled toward each other. That is, the spacing member 61 is pressed upward (indicated by arrow mark H2), and the force bearing surface 44*b* is pressed downward (indicated by arrow mark H1). Thus, the spacing member 61 and force bearing surface 44*b* behave as if they are pulling each other. Thus, even if the spacing member 61 is attached to the moving member 62 so that the former is allowed to move relative to the latter, it is ensured that when the spacing member 61 engages with the force bearing surface 44*b*, the spacing member 61 is kept in the normal position (action position) by the component F1*y*, and remains engaged with the force bearing surface 44*b*.

In particular, in this embodiment, the image forming apparatus is kept stable in the state of engagement between the force bearing surface 44*b* and spacing member 61, by setting the angle between the force bearing surface 44*b* and the force bearing surface contacting surface 61*b* to satisfy the following mathematical relationship:

$\theta 1 \geq \theta 3$ (FIG. 20), and $\theta 2 \geq \theta 3$ (FIG. 23).

This setting means that the angles (θ1, θ2) of the force bearing surface 44*b* are larger than the angle θ3 of the protrusion contacting surface 61*b* of the spacing member 61, when the development unit 4 is in the separation position or contact position. Thus, it is ensured regardless of the attitude of the development unit 4 that the protrusion contacting surface 61*b* of the spacing member 61 comes into contact with the tip of the force bearing surface 44*b*. Therefore, it is ensured that the force bearing surface 44*b* and the protrusion contacting surface 61*b* of the spacing member 61 remain in contact with each other.

To rearrange the foregoing mathematical formulas:

$\theta 1 \geq \theta 3$, and $\theta 2 = \theta 1 - \theta 0 \geq \theta 3$,

That is, $\theta 1 \geq \theta 3$, and $\theta 1 - \theta 3 \geq \theta 0$.

This means that when the development unit 4 is in the contact position, the angle (θ1-θ3) between the protrusion contacting surface 61*b* of the spacing member 61 and the force bearing surface 44*b* of the protrusion 44*d* is greater than the rotational angle θ0 (angle by which development unit 4 rotationally moves when it moves from contact position to separation position) of the development unit 4.

Embodiment 4

This embodiment is a modification of the second embodiment of the present invention in terms of the shape of the spacing member 71 and protrusion 44*d* with which the development roller disengagement mechanism. The following description of this embodiment is centered around the structural arrangement of the image forming apparatus in this embodiment, which are different from that in the second embodiment; the structural components of the image forming apparatus in this embodiment, and their functions, which are the same as the counterparts of the image forming apparatus in the second embodiment are not described.

Referring to FIG. 25, the spacing member 71 is supported by the spacing member holder 72 so that it is rotationally movable about the pressing member support (pivot) 74 with which the moving member 72 is provided. Further, the spacing member 71 is under the pressure from the spring 73, being thereby kept in a position in which it can engage with the force bearing surface 44*b*. Also in this embodiment, the spacing member 71 is enabled to take three different positions (action position, inaction position, and retreat).

FIG. 25, part (a), shows the states in which the process cartridges P (PY, PM, PC and PK), spacing member 71, moving member 72, etc., are when the process cartridges P are in their proper positions for image formation. The moving member 72 is in the no-image-formation position, and the spacing member 71 supported by the moving member 72 is in the position in which it interferes with the process cartridge P. Thus, as the process cartridge P is moved into the apparatus main assembly 100 (as door 30 is closed), the spacing member 71 interferes with the protrusion 44*d* of the process cartridge P, being thereby pressed downward (indicated by arrow mark H1). Thus, the spacing member 71 rotates clockwise (indicated by arrow mark U1) about the shaft (pivot) 74, into the position in which it allows the process cartridge P to be moved all the way into the apparatus main assembly 100 as shown in FIG. 25, part (a). That is, the spacing member 71 moves into the retreat.

In order for the force bearing surface 44*b* of the protrusion 44*d*, and spacing member 71, which are in the states shown in FIG. 25, part (a), to engage with each other, the moving member 72 has to be moved rightward (indicated by arrow mark N) until the spacing member 71 is moved into the position (image formation position) in which the spacing member 71 does not interfere with the process cartridge P (protrusion 44*d*). As the spacing member 71 is moved into the position in which it does not interfere with the protrusion 44*d* as shown in Figure. part 25(*b*), it is rotationally moved clockwise (indicated by arrow mark U2) about the support shaft (pivot) 74 by the force of the spring 73. That is, the spacing member 71 is made to change in attitude relative to the moving member 72; it rotationally moves upward into the normal position (inaction position) in which it can contact and engage with the force bearing surface 44*b* of the protrusion 44*d*.

As the spacing member holder 72, which is in its image formation position shown in FIG. 25, part (b), is moved leftward (indicated by arrow mark M), it causes the spacing member 71 to engage with the force bearing surface 44*b*. Then, as the spacing member holder 72 is moved further leftward (indicated by arrow mark M), with the spacing member 71 remaining in engagement with the force bearing surface 44*b*, the it reaches its no-image-formation position, and the spacing member 71 moves the development unit 4 to the position (separation position) in which the development roller 41 is kept separated from the photosensitive drum 1. During the period between the ending of an image forming operation and the starting of the next image forming operation, the spacing member 71 keeps the development roller 41 separated from the photosensitive drum 1 (FIG. 25, part (c)). In FIG. 25, part (c), the spacing member 71 is in its action position.

To summarize the foregoing description of this embodiment, as the spacing member holder 72 is made to shuttle between its image formation position, and the no-image-formation position, the spacing member 71 is moved from its retreat (FIG. 25, part (a)) to the action position by way of the inaction position. While it is moved, it engages with the force bearing surface 44*b*, and moves the development unit 4 into the separation position (FIG. 25, part (c)).

Further, in this embodiment, as shown in FIG. 26, the protrusion 44*d* is provided with the sub-protrusion 44*a* and recess 44*g*, which are for ensuring that the spacing member 71 and force bearing surface 44*b* engage with each other, as in the third embodiment. In this embodiment, the force bearing surface 44*b* is a part of the recess 44*g*, and comes into contact with the force bearing surface contacting surface 71*b* of the spacing member 71.

To describe in more detail, referring to FIG. 21, when the development roller 41 and photosensitive drum 1 are in contact with each other, the force bearing surface 44*b* of the protrusion 44*d* is tilted by an angle θ1 relative to the direction perpendicular to the direction (indicated by arrow mark M or N) of the movement of the spacing member holder 72. Further, referring to FIG. 22, after the separation of the development roller 41 from the photosensitive drum 1, the force bearing surface 44*b* is tilted by an angle θ2 relative to the direction perpendicular to the direction (indicated by arrow mark M or N) of the movement of the spacing member holder 72.

Further, referring to FIG. 28, the force bearing surface contacting surface 71*b* of the spacing member 71 is tilted by an angle θ3 relative to the direction (indicated by arrow mark M or N) of the movement of the spacing member holder 72.

FIG. 27 shows the relationship between the force bearing surface 44*b* and spacing member 71 when the development roller 41 and photosensitive drum 1 are in contact with each other. FIG. 26 shows the relationship between the force bearing surface 44*b* and spacing member 71 after the separation of the development roller 41 from the photosensitive drum 1.

The relationship among the force bearing surface 44*b* and the force bearing surface contacting surface 71*b* of the spacing member 71 is made to satisfy the following mathematical formulas to generate such a force that can keep the force bearing surface 44*b* and spacing member 71 engaged with each other:

$\theta 1 \geq \theta 3$, and $\theta 2 \geq \theta 3$ (FIGS. 26 and 27).

That is, the force bearing surface 44*b* and the force bearing surface contacting surface 71*b* of the spacing member 71 are tilted in the same direction. That is, the force bearing surface 44*b* and the force bearing surface contacting surface 71*b* are both tilted in such a direction that in terms of the direction indicated by the arrow mark N, and also, in terms of the direction indicated by an arrow mark H1, their upstream sides are positioned higher than their downstream sides (FIG. 27). The arrow mark U1 is the direction in which the spacing member 71 moves when it retreats (from normal position (action position: FIG. 25, part (c)), to retreat (FIG. 25, part (a)).

Further, both when the development unit 4 is in the contact position and when the development unit 4 is in the separation position, the angles (θ1, θ2) of the force bearing surface 44*b* are greater than the angle θ3 of the force bearing surface contacting surface 71*b* of the spacing member 71.

To rearrange the foregoing mathematical formulas:

θ1≥θ3, and θ1- θ0≥θ3,

That is,

θ1≥θ3, and θ1-θ3≥θ0.

This means that when the development unit 4 is in the contact position, the angle (θ1-θ3) between the force bearing surface contacting surface 71*b* of the spacing member 71 and the force bearing surface 44*b* of the protrusion 44*d* is greater than the rotational angle θ0 of the development unit 4.

To describe in greater detail, referring to FIG. 26, in this embodiment, as the spacing member holder 72 is moved in the direction indicated by the arrow mark M, the force bearing surface contacting surface 71*b* of the spacing member 71 is subjected to a force F1 by the force bearing surface 44*b*. This force F1 is perpendicular to the force bearing surface contacting surface 71*b*. Further, the force bearing surface 44*b* is subjected to a force F1' which is opposite in direction from the force F1, by the force bearing surface contacting surface 71*b* of the spacing member 71.

Next, the force to which the force bearing surface contacting surface 71*b* of the spacing member 71, and the force to which the force bearing surface 44*b* is subjected are described with reference to drawings. FIG. 29 shows the force F1 to which the development roller disengagement mechanism, and the force bearing surface contacting surface 71*b* of the spacing member 71, are subjected. the force bearing surface contacting surface 71*b* of the spacing member 71 is titled by the angle θ3 so that as the spacing member 71 is subjected to the force F1, the spacing member 71 is subjected to such a moment that acts in the direction to make the spacing member 71 rotationally moves about the support shaft (pivot) 74 in the direction indicated by an arrow mark U2. That is, the apparatus main assembly 100 is structured so that the normal line (area F1*a* in FIG. 29) of the force bearing surface contacting surface 71*b* of the spacing member 71 is on the bottom side of the straight line which coincides with the center 74*a* of the support shaft (pivot) 74 and is perpendicular to the surface 71*b*. Therefore, the spacing member 71 is subjected to the moment generated in the direction indicated by the arrow mark U2 by the force F1. That is, it is subjected to the moment which acts in the direction to make the spacing member 71 move toward the force bearing surface 44*b* of the process cartridge P. In other words, the moment is a component of the force F1, which makes the spacing member 71 move from its retreat to the normal position. FIG. 30 shows the force F1' to which the fore bearing surface 44*b* is subjected.

The force F1' can be divided into a component F1*x'* which is parallel to the direction (indicated by arrow mark M or N) of the movement of the spacing member holder 72, and a component F1*y'* which is perpendicular to the direction (indicated by arrow mark M or N) of the movement of the spacing member holder 72. The component F1*y'* is the downward component of the force F1'. In other words, the force bearing surface 44*b* is subjected to such a force that presses the force bearing surface 44*b* toward the spacing member 71.

Further, the force F1 which the force bearing surface contacting surface 71*b* of the spacing member 71 receives from the force bearing surface 44*b* acts in the direction to move the spacing member 71 from the retreat to the normal position, and also, in the direction to move the spacing member 71 toward the force bearing surface 44*b*. Further, the force bearing surface contacting surface 71*b* is tilted so that the force F1' acts in the above described directions. Further, the force bearing surface 44*b* is also tilted in the same direction as the force bearing surface contacting surface 71*b* to ensure that the two surfaces 44*b* and 71*b* remain engaged with each other.

Therefore, in this embodiment, as the spacing member 71 comes into contact with the force bearing surface 44*b*, such a force that acts in the direction to cause the spacing member 71 and force bearing surface 44*b* to be pulled toward each other. Thus, even though the spacing member 71 is rotationally movable relative to the moving member 72, it is ensured that when it is necessary for the spacing member 71 to engage with the force bearing surface 44*b*, it is in the normal position, and remains engaged with the force bearing surface 44*b*.

Embodiment 5

This embodiment is a modification of the first to fourth embodiments in terms of the shape of the protrusion of the process cartridge P. The following description of this embodiment is centered around the features of the structural arrangement of the image forming apparatus in this embodiment, which are different from those in the first to fourth embodiments; the structural components of the image forming apparatus in this embodiment, and their functions, which are the same as the counterparts of the image forming apparatus in the preceding embodiments are not described.

Referring to FIG. 31, in this embodiment, the protrusion 44*e* with which the process cartridge P is provided is roughly rectangular, and is hollow. The direction in which this protrusion 44*e* protrudes from the process cartridge P is perpendicular to the axial line of the development roller 41 as the direction in which the protrusion 44*d* in the preceding embodiments extends. It extends in the opposite direction from the axial line of the development roller 41 and the pivot X of the development unit 4. Further, the protrusion 44*e* has a hole 44*r* and a force bearing section (surface) 44*h*. FIG. 32 shows the process cartridge P and the development roller disengagement mechanism when the process cartridge P is in engagement with the spacing member 71. The force bearing surface contacting surface 71*b* of the spacing member 71 is in engagement with the force bearing surface 44*h* through the hole 44*r* of the protrusion 44*e*.

Referring to FIG. 32, in this embodiment, as the spacing member holder 72 is moved in the direction indicated by an arrow mark M, the force bearing surface contacting 72*b* of the spacing member 71 is subjected to a force F1 by the force bearing surface 44*h*. This force F1 is perpendicular to the force bearing surface contacting surface 71*b*. Further, the force bearing surface 44*h* is subjected to a force F1' which is opposite in direction from the force F1, by the force bearing surface contacting surface 71*b* of the spacing member 71. Further, the spacing member 71 is subjected to such a moment that acts in the direction to make the spacing member 71 moves from its retreat to the normal position. Further, the force bearing surface 44*h* is subjected to such a force that presses the force bearing surface 44*h* toward the spacing member 71.

That is, in this embodiment, the force bearing surface contacting surface 71*b* and force bearing surface 44*h* are structured so that the force F1 which the force bearing surface contacting surface 71*b* of the spacing member 71 receives from the force bearing surface (section) of the protrusion 44*e* acts in the direction (upward) to move the spacing member 71 from its retreat to the normal position.

That is, they are structured so that as the spacing member 71 comes into contact with the force bearing surface 44*h*, such a force that acts in the direction to make the spacing member 71 and force bearing surface 44*h* pull each other. Therefore, even though the spacing member 71 is attached to the spacing member holder 72 so that it is allowed to rotationally move relative to the moving member 72, it is ensured that when it is necessary for the spacing member 71 to engage with the force bearing surface 44*h*, the spacing member 71 will be in the normal position, and remains in engagement with the force bearing surface 44*h*.

Also in this embodiment, the force bearing surface 44*h* is such a surface that faces toward the center (axial line 41*x*) of the development roller 41, and the pivot X of the development unit 4. Further, there is a space between the force bearing surface 44*h* of the protrusion 44*e*, and the development roller 41, because of the presence of the hole 44*r*. The entrance of the spacing member 71 into this space (hole 44*r*) ensures that the spacing member 71 engages with the force bearing surface 44*h*.

Further, the force bearing surface contacting surface 71*b* of the spacing member 71, and the force bearing surface 44*h*, do not need to be flat. That is, the surface 71*b* and surface 44*h* may be curved, or in the form of a small area, such as a ridge or dot.

Embodiment 6

This embodiment is a modification of the preceding embodiments in terms of the structure of the spacing member holder 72. Referring to FIG. 33, part (a), there are two spacing member holders 72. Hereafter, if it is necessary for the two moving members 72 to be individually referred to, they will be referred to as spacing member holders 72L and 72R. Further, the spacing members (engagement components) 71 attached to the moving member 72R will be referred to as spacing member holder 71Y, 71M and 71C, and the spacing member 71 attached to the spacing member holder 72L will be referred to as spacing member 71K.

The spacing member holder 72R is a holder for moving the process cartridge PK in which black toner is stored. The spacing member holder 72L is for moving the process cartridges PY, PM and PC, in which yellow, magenta and cyan toners are stored. Providing an image forming apparatus with multiple (two in this embodiment) moving members 72 makes it possible to move only the development unit 4 in one or more specific process cartridges P (black cartridge PK in this embodiment) among the four process cartridges P, into the development roller engagement position, where keeping the development units 4 of the other process cartridges P (yellow, magenta and cyan process cartridges P in this embodiment) in their development roller disengagement position. The following is the detailed description of this setup.

The image forming apparatus A (FIG. 2) in this embodiment is structured so that it can be switched in operational mode between the monochromatic mode for printing a monochromatic (black-and-white) image, and the full-color mode for printing a full-color image. In the monochromatic mode, only the black process cartridge PK is used. Thus, it is only the spacing member holder 72R that has to be moved; the spacing member holder 72L does not need to be moved. That is, as the spacing member holder 72R is moved rightward in FIG. 33, part (a), the spacing member 71K is disengaged from the force bearing surface 44*b*. Thus, the development roller 41 in the black process cartridge PK comes into contact with the photosensitive drum 1. On the other hand, the spacing member holder 72L does not need to be moved out of the position in which it is in FIG. 33, part (a). In other words, in the monochromatic mode, the yellow, magenta and cyan process cartridges PY, PM and PC may be left in the state in which their development rollers 41 remain disengaged from their photosensitive drums 1.

On the other hand, in the full-color mode, both the spacing member holders 72R and 72L are to be moved rightward from the positions in which they are in FIG. 33, part (a), so that the development rollers 41 in all the cartridges P are placed in contact with the corresponding photosensitive drums 1.

In the case of the image forming apparatus A in this embodiment structured as described above, the spacing member holders 72R and 72L can be independently moved from each other. Thus, when it is necessary to print only monochromatic images, the development rollers 41 in the yellow, magenta and cyan process cartridges PY, PM and PC can be left separated from the photosensitive drums 1. Thus, it is ensured that the development rollers 41 in the yellow, magenta and cyan process cartridges PY, PM and PC are prevented from deforming, and also, that the toner on the development rollers 41 are prevented from adhering to the photosensitive drums 1. Further, since the photosensitive drum 1 and development roller 41 in each of the yellow, magenta and cyan process cartridges PY, PM and PC do not rub against each other. Therefore, the photosensitive drums 1, development rollers 41, and toner in these process cartridges P are prevented from being deteriorated by the friction between the photosensitive drum 1 and development roller 41.

FIG. 33, part (b), shows a modification of this embodiment. In the case of the image forming apparatus shown in FIG. 33, part (b), the spacing member 71 attached to the spacing member holder 72R, and the pressing members 71Y, 71M and 71C attached to the moving member 72, are different in terms of the positioning of the center (pivot) of their rotational movement. For example, in the case of the spacing member 71Y (development unit engaging section A), the support shaft (pivot) 74Y about which the spacing member 71Y rotationally moves is on the right side of the force bearing surface contacting section (surface) 71Yb. In comparison, the support shaft (pivot) 74K about which the spacing member 71K (developer unit engaging section B) is on the left side of the section (surface) 71Kb. Therefore, the width W7*b* of the development roller disengaging mechanism 70 in the FIG. 33, part (b) is less than the width W7*a* of the development roller disengagement mechanism 70 in FIG. 33, part (a). That is, the development roller disengagement mechanism 70 structured as shown in FIG. 33, part (b), is more compact than that shown in FIG. 33, part (a).

One of the methods for reducing the width W7*b* is to reduce the distance between the support shaft (pivot) 74Y of the spacing member 71Y (development unit engaging component A) (rightmost of multiple pressing members 71 aligned in parallel), and the support (pivot) 74K of the spacing member 71K (development unit engaging component B) of the spacing member 71K (leftmost of multiple pressing members 71). In the case of the image forming apparatus structured as shown in FIG. 33, part (b), the center (support shaft (pivot) 74Y) of the rotational movement of the spacing member 71Y, and the center (support (pivot) 74K) of the rotational movement of the spacing member 71K are between the development unit contacting section (surface) 71Yb and the development unit contacting section (surface) 71Kb. That is, the width W7*b* was reduced by positioning the support shafts (pivots) 74Y and 74K within an area Z which is between the development unit contacting sections (surfaces) 71Yb and 71Kb.

Next, the spacing member 71Y shown in FIG. 33, part (b), is described in greater detail with reference to FIG. 34, which shows the state of engagement between the spacing member 71 and process cartridge PY. As the spacing member 71Y comes into contact (engages) with the force bearing surface 44*b*, it presses the force bearing surface 44*b*, which in turn subjects it to a force F1 from the force bearing surface 44*b*.

This force F1 generates such a moment that acts in the direction to rotationally move the spacing member 71Y about the support shaft (pivot) 74Y in the direction indicated by arrow mark s2. Thus, the spacing member 71Y is retained by this moment, the direction of which is indicated by the arrow mark s2, in the position (normal position) in which it can come into contact (engage) with the force bearing surface 44*b*. That is, the spacing member 71Y is prevented from retracting in the direction indicated by the arrow mark s1.

In this embodiment, the elastic member (spring 73) for pressing the spacing member 71 is a compression spring. However, this embodiment is not intended to limit the present invention in terms of the choice of the elastic component. For example, the elastic component may be a torsion spring 75 fitted as shown in FIG. 35. Not only can the torsion spring 75 be effectively used for the development roller disengagement mechanism in this embodiment, but also, for development roller disengagement mechanism structured to rotationally move the spacing member 71 as those in the second and fourth embodiments, for example.

Lastly, to summarize the effects of the first to sixth embodiments described above, the present invention can simplify an image forming apparatus in terms of the structure of the mechanism for separating the developer bearing component in a process cartridge, from the image bearing component in the process cartridge.

Further, the present invention can ensure that when process cartridges are installed into the main assembly of an image forming apparatus, the process cartridge engaging components of the main assembly of the image forming apparatus retract. Thus, it can ensure that the process cartridges are properly installed into the main assembly of the image forming apparatus.

While the invention has been described with reference to the structures disclosed herein, it is not confined to the details set forth, and this application is intended to cover such modifications or changes as may come within the purposes of the improvements or the scope of the following claims.

INDUSTRIAL APPLICABILITY

The present invention is capable of simplifying in structure the mechanism for separating (disengaging) the developer carrying component and image bearing component of a process cartridge, to provide a combination of an image forming apparatus and a process cartridge, which is substantially more inexpensive and smaller in size than the combination in accordance with the prior art.

The invention claimed is:

1. A process cartridge comprising:

a photosensitive drum;

a first frame rotatably supporting the photosensitive drum to permit rotation of the photosensitive drum about a rotational axis of the photosensitive drum;

a developing roller for developing a latent image on the photosensitive drum;

a second frame rotatably supporting the developing roller to permit rotation of the developing roller about a rotational axis of the developing roller, the second frame being pivotable about a pivot axis between (i) a first position in which the developing roller contacts the photosensitive drum such that the developing roller can develop the latent image formed on the photosensitive drum and (ii) a second position in which the developing roller is spaced apart from the photosensitive drum; and a protrusion having a surface configured to receive a force to move the second frame from the first position to the second position, wherein the process cartridge is configured such that, when the second frame is in the first position and the process cartridge is oriented with the photosensitive drum and the protrusion positioned at a bottom side of the process cartridge, (i) the rotational axis of the photosensitive drum is lower than the rotational axis of the developing roller, and (ii) as viewed in a direction of the rotational axis of the photosensitive drum, the surface of the protrusion extends in a direction that is perpendicular to a part of a surface of the first frame at the bottom side of the process cartridge that extends away from the photosensitive drum and away from the protrusion.

2. A process cartridge according to claim 1, wherein, when the second frame is in the first position and the process cartridge is oriented with the photosensitive drum and the protrusion positioned at the bottom side of the process cartridge, the pivot axis of the second frame, the rotational axis of the developing roller, and the rotational axis of the photosensitive drum are located in this order in a horizontal direction, and an imaginary line extending along the surface of the protrusion extends between the pivot axis of the second frame and the rotational axis of the photosensitive drum.

3. A process cartridge according to claim 1, wherein, when the second frame is in the first position and the process cartridge is oriented with the photosensitive drum and the protrusion positioned at the bottom side of the process cartridge, (i) the pivot axis of the second frame, the rotational axis of the developing roller, and the rotational axis of the photosensitive drum are located in this order in a horizontal direction, and (ii) the rotational axis of the photosensitive drum and the rotational axis of the developing roller are on one side of an imaginary line that extends along the surface of the protrusion and through a top side of the process cartridge, and the pivot axis of the second frame is on the other side of the imaginary line.

4. A process cartridge according to claim 1, wherein, when the second frame is in the first position and the process cartridge is oriented with the photosensitive drum and the protrusion positioned at the bottom side of the process cartridge, the position of the protrusion is fixed relative to the second frame.

5. A process cartridge according to claim 1, further comprising a spring that urges the second frame toward the first position, wherein, when the second frame is in the first position and the process cartridge is oriented with the photosensitive drum and the protrusion positioned at the bottom side of the process cartridge, the spring is located above the pivot axis of the second frame in a vertical direction.

6. A process cartridge according to claim 1, further comprising a coupling exposed to outside of the process cartridge and configured to transmit a driving force to the developing roller, wherein the coupling is coaxial with the pivot axis of the second frame.

7. A process cartridge according to claim 1, further comprising a coupling exposed to outside of the process cartridge and configured to transmit a driving force to the developing roller, wherein the coupling is positioned at the same side of the process cartridge as the protrusion in a direction of the pivot axis of the second frame.

8. A process cartridge according to claim 1, further comprising:

a coupling exposed to outside of the process cartridge and configured to transmit a driving force to the developing roller, and a spring that urges the second frame toward the first position, wherein the coupling is positioned at an opposite side of the process cartridge from a side at which the spring is positioned in a direction of the pivot axis of the second frame.

9. A process cartridge comprising:

a photosensitive drum;

a first frame rotatably supporting the photosensitive drum to permit rotation of the photosensitive drum about a rotational axis of the photosensitive drum;

a developing roller for developing a latent image on the photosensitive drum;

a second frame rotatably supporting the developing roller to permit rotation of the developing roller about a rotational axis of the developing roller, the second frame being pivotable about a pivot axis between (i) a first position in which the developing roller contacts the photosensitive drum such that the developing roller can develop the latent image formed on the photosensitive drum and (ii) a second position in which the developing roller is spaced apart from the photosensitive drum; and a protrusion having a surface configured to receive a force to move the second frame from the first position to the second position, wherein the process cartridge is configured such that, when the second frame is in the first position and the process cartridge is oriented with the photosensitive drum and the protrusion positioned at a bottom side of the process cartridge, (i) the rotational axis of the photosensitive drum is lower than the rotational axis of the developing roller, and (ii) as viewed in a direction of the rotational axis of the photosensitive drum, the surface of the protrusion extends in a direction that is parallel to at least a part of an edge of a sidewall of the first frame, with the surface of the protrusion and the sidewall facing the same direction.

10. A process cartridge according to claim 9, wherein, when the second frame is in the first position and the process cartridge is oriented with the photosensitive drum and the protrusion positioned at the bottom side of the process cartridge, the pivot axis of the second frame, the rotational axis of the developing roller, and the rotational axis of the photosensitive drum are located in this order in a horizontal direction, and an imaginary line extending along the surface of the protrusion extends between the pivot axis of the second frame and the rotational axis of the photosensitive drum.

11. A process cartridge according to claim 9, wherein, when the second frame is in the first position and the process cartridge is oriented with the photosensitive drum and the protrusion positioned at the bottom side of the process cartridge, (i) the pivot axis of the second frame, the rotational axis of the developing roller, and the rotational axis of the photosensitive drum are located in this order in a horizontal direction, and (ii) the rotational axis of the photosensitive drum and the rotational axis of the developing roller are on one side of an imaginary line that extends along the surface of the protrusion and through a top side of the process cartridge, and the pivot axis of the second frame is on the other side of the imaginary line.

12. A process cartridge according to claim 9, wherein, when the second frame is in the first position and the process cartridge is oriented with the photosensitive drum and the protrusion positioned at the bottom side of the process cartridge, the position of the protrusion is fixed relative to the second frame.

13. A process cartridge according to claim 9, further comprising a spring that urges the second frame toward the first position, wherein, when the second frame is in the first position and the process cartridge is oriented with the photosensitive drum and the protrusion positioned at the bottom side of the process cartridge, the spring is located above the pivot axis of the second frame in a vertical direction.

14. A process cartridge according to claim 9, further comprising a coupling exposed to outside of the process cartridge and configured to transmit a driving force to the developing roller, wherein the coupling is coaxial with the pivot axis of the second frame.

15. A process cartridge according to claim 9, further comprising a coupling exposed to outside of the process cartridge and configured to transmit a driving force to the developing roller, wherein the coupling is positioned at the same side of the process cartridge as the protrusion in a direction of the pivot axis of the second frame.

16. A process cartridge according to claim 9, further comprising:

a coupling exposed to outside of the process cartridge and configured to transmit a driving force to the developing roller, and a spring that urges the second frame toward the first position, wherein the coupling is positioned at an opposite side of the process cartridge from a side at which the spring is positioned in a direction of the pivot axis of the second frame.

17. A process cartridge comprising:

a photosensitive drum;

a first frame rotatably supporting the photosensitive drum to permit rotation of the photosensitive drum about a rotational axis of the photosensitive drum;

a developing roller for developing a latent image on the photosensitive drum;

a second frame rotatably supporting the developing roller to permit rotation of the developing roller about a rotational axis of the developing roller, the second frame being pivotable about a pivot axis between (i) a first position in which the developing roller contacts the photosensitive drum such that the developing roller can develop the latent image formed on the photosensitive drum and (ii) a second position in which the developing roller is spaced apart from the photosensitive drum; and a protrusion having a surface configured to receive a force to move the second frame from the first position to the second position, wherein the process cartridge is configured such that, when the second frame is in the first position and the process cartridge is oriented with the photosensitive drum and the protrusion positioned at a bottom side of the process cartridge, (i) the rotational axis of the photosensitive drum is lower than the rotational axis of the developing roller, and (ii) as viewed in a direction of the rotational axis of the photosensitive drum, the surface of the protrusion extends in a direction that is parallel to a part of a surface of a sidewall of the first frame, with the surface of the protrusion and the part of the surface of the sidewall facing the same direction.

18. A process cartridge according to claim 17, wherein, when the second frame is in the first position and the process cartridge is oriented with the photosensitive drum and the protrusion positioned at the bottom side of the process cartridge, the pivot axis of the second frame, the rotational axis of the developing roller, and the rotational axis of the photosensitive drum are located in this order in a horizontal direction, and an imaginary line extending along the surface of the protrusion extends between the pivot axis of the second frame and the rotational axis of the photosensitive drum.

19. A process cartridge according to claim 17, wherein, when the second frame is in the first position and the process cartridge is oriented with the photosensitive drum and the protrusion positioned at the bottom side of the process cartridge, (i) the pivot axis of the second frame, the rotational axis of the developing roller, and the rotational axis of the photosensitive drum are located in this order in a horizontal direction, and (ii) the rotational axis of the photosensitive drum and the rotational axis of the developing roller are on one side of an imaginary line that extends along the surface of the protrusion and through a top side of the process cartridge, and the pivot axis of the second frame is on the other side of the imaginary line.

20. A process cartridge according to claim 17, wherein, when the second frame is in the first position and the process cartridge is oriented with the photosensitive drum and the protrusion positioned at the bottom side of the process cartridge, the position of the protrusion is fixed relative to the second frame.

21. A process cartridge according to claim 17, further comprising a spring that urges the second frame toward the first position, wherein, when the second frame is in the first position and the process cartridge is oriented with the photosensitive drum and the protrusion positioned at the bottom side of the process cartridge, the spring is located above the pivot axis of the second frame in a vertical direction.

22. A process cartridge according to claim 17, further comprising a coupling exposed to outside of the process cartridge and configured to transmit a driving force to the developing roller, wherein the coupling is coaxial with the pivot axis of the second frame.

23. A process cartridge according to claim 17, further comprising a coupling exposed to outside of the process cartridge and configured to transmit a driving force to the developing roller, wherein the coupling is positioned at the same side of the process cartridge as the protrusion in a direction of the pivot axis of the second frame.

24. A process cartridge according to claim 17, further comprising:

a coupling exposed to outside of the process cartridge and configured to transmit a driving force to the developing roller, and a spring that urges the second frame toward the first position, wherein the coupling is positioned at an opposite side of the process cartridge from a side at which the spring is positioned in a direction of the pivot axis of the second frame.

* * * * *